(12) United States Patent
Dorn et al.

(10) Patent No.: US 8,010,294 B2
(45) Date of Patent: Aug. 30, 2011

(54) EXTRACTION OF DEPOSITIONAL SYSTEMS

(75) Inventors: Geoffrey A. Dorn, Broomfield, CO (US); William S. Hammon, III, Boulder, CO (US); James A. Carlson, Boulder, CO (US)

(73) Assignee: Terraspark Geosciences, LLC, Wilmington, DE (US)

( * ) Notice: Subject to any disclaimer, the term of this patent is extended or adjusted under 35 U.S.C. 154(b) by 0 days.

(21) Appl. No.: 12/772,634

(22) Filed: May 3, 2010

(65) Prior Publication Data

US 2010/0250210 A1  Sep. 30, 2010

Related U.S. Application Data

(62) Division of application No. 11/766,287, filed on Jun. 21, 2007.

(60) Provisional application No. 60/815,630, filed on Jun. 21, 2006, provisional application No. 60/815,625, filed on Jun. 21, 2006, provisional application No. 60/815,961, filed on Jun. 21, 2006.

(51) Int. Cl.
*G01V 1/00* (2006.01)

(52) U.S. Cl. ......................................................... 702/14

(58) Field of Classification Search ...................... 702/14
See application file for complete search history.

(56) References Cited

U.S. PATENT DOCUMENTS

| | | | |
|---|---|---|---|
| 3,638,178 A | 1/1972 | Stephenson |
| 3,931,609 A | 1/1976 | Anstey |
| 4,357,660 A | 11/1982 | Hepp |
| 4,359,766 A | 11/1982 | Waters et al. |
| 4,403,312 A | 9/1983 | Thomason |
| 4,467,461 A | 8/1984 | Rice |
| 4,672,545 A | 6/1987 | Lin et al. |
| 4,745,550 A | 5/1988 | Witkin et al. |
| 4,799,201 A | 1/1989 | Nelson |
| 4,870,580 A | 9/1989 | Lang et al. |
| 4,894,807 A | 1/1990 | Alam et al. |
| 5,038,302 A | 8/1991 | Kaufman |
| 5,038,378 A | 8/1991 | Chen |
| 5,056,066 A | 10/1991 | Howard |
| 5,079,703 A | 1/1992 | Mosher et al. |
| 5,416,750 A | 5/1995 | Doyen et al. |

(Continued)

OTHER PUBLICATIONS

Zeng, Hongliu, et al., "Stratal slicing of Miocene-Pliocene sediments in Vermilion Block 50—Tiger Shoal Area, Offshore Louisiana", 2001, The Leading Edge.*

(Continued)

*Primary Examiner* — Drew A Dunn
*Assistant Examiner* — Stephen Cherry
(74) *Attorney, Agent, or Firm* — Jason H. Vick; Sheridan Ross P.C.

(57) ABSTRACT

A process that assists with the identification of potential hydrocarbon deposits that includes performing a structural interpretation of a three-dimensional seismic volume, transforming the three-dimensional seismic volume into a stratal-slice volume, performing a stratigraphic interpretation of the stratal-slice volume which includes the extracting of bounding surfaces and faults and transforming the stratal-slice volume into the spatial domain. As illustrated in FIGS. 24*a*, b and c, an exemplary seismic volume before Domain Transformation is presented in FIG. 24*a*, interpreted horizons and faults used in the transformation are presented in FIG. 24*b*, and the Domain Transformed stratal-slice volume is presented in FIG. 24*c*. The input seismic volume in FIG. 24*a* has deformations associated with syn- and post-depositional faulting. The output Domain Transformed volume (FIG. 24*c*) is substantially free of deformations.

8 Claims, 37 Drawing Sheets

U.S. PATENT DOCUMENTS

| | | | |
|---|---|---|---|
| 5,537,365 | A | 7/1996 | Sitoh |
| 5,563,949 | A | 10/1996 | Bahorich et al. |
| 5,586,082 | A | 12/1996 | Anderson et al. |
| 5,671,344 | A | 9/1997 | Stark |
| 5,838,564 | A | 11/1998 | Bahorich et al. |
| 5,894,417 | A | 4/1999 | Dorn |
| 5,930,730 | A | 7/1999 | Marfurt et al. |
| 5,987,388 | A | 11/1999 | Crawford et al. |
| 6,092,026 | A | 7/2000 | Bahorich et al. |
| RE38,229 | E | 8/2003 | Marfurt et al. |
| 6,708,118 | B2 | 3/2004 | Stark |
| 6,771,800 | B2 | 8/2004 | Keskes et al. |
| 6,850,845 | B2 | 2/2005 | Stark |
| 6,853,922 | B2 | 2/2005 | Stark |
| 7,006,085 | B1 | 2/2006 | Acosta et al. |
| 7,024,021 | B2 | 4/2006 | Dunn et al. |
| 7,069,149 | B2 | 6/2006 | Goff et al. |
| 7,098,908 | B2 | 8/2006 | Acosta et al. |
| 7,203,342 | B2 | 4/2007 | Pedersen |
| 7,356,414 | B2 | 4/2008 | Cacas |
| 2005/0171700 | A1 | 8/2005 | Dean |
| 2007/0014457 | A1 | 1/2007 | Jolly et al. |
| 2008/0015784 | A1 | 1/2008 | Dorn et al. |
| 2008/0059074 | A1 | 3/2008 | Wei et al. |
| 2009/0122061 | A1 | 5/2009 | Hammon |
| 2010/0211363 | A1 | 8/2010 | Dorn et al. |
| 2010/0245347 | A1 | 9/2010 | Dorn et al. |
| 2011/0115787 | A1 | 5/2011 | Kadlec |

OTHER PUBLICATIONS

"AMD 'Close to Metal'™ Technology Unleashes the Power of Stream Computing," AMD Press Release, Nov. 14, 2006, 1 page.

"AMD Delivers First Stream Processor with Double Precision Floating Point Technology," AMD Press Release, dated Nov. 8, 2007, 2 pages.

"Direct Voice Input," Eurofighter Typhoon webpage, 2008, available at http://www.eurofighter.com/et_as_vt_dv.asp, 1 page.

"Drilling Visualization Research Consortium 2003 Annual Report," BP Center for Visualization, BP Center for Visualization, University of Colorado, May 17, 2004, 24 pages.

"International Energy Outlook 2009," U.S. Energy Information Administration, Report #:DOE/EIA-0484(2009) Release Date: May 27, 2009, http://www.eia.doe.gov/oiaf/ieo/highlights.html, 8 pages.

"International Energy Outlook 2010—Highlights," U.S. Energy Information Administration, 2010, 8 pages.

"Physical and Motor Skills," Apple Computer Speakable Items, available at http://www.apple.com/accessibility/macosx/physical.html, 2008, 3 pages.

Adalsteinsson, J.A. et al., "A Fast Level Set Method for Propagating Interfaces," Lawrence Berkeley Laboratory and Department of Mathematics, University of California, LBL-34893, Sep. 1994, pp. 1-21.

Al-Dossary et al., "3-D edge preserving smoothing for seismic edge detection", SEG Int'l Exposition and 72nd Annual Meeting, Oct. 6-11, 2002, 4 pages.

Amdahl, G., "Validity of the Single Processor Approach to Achieving Large-Scale Computing Capabilities," AFIPS Conference Proceedings, 1967, vol. 30, pp. 483-485.

Bakker, P. et al., "Confidence and curvature of curvilinear structures in 3D," Proceedings of the Eighth IEEE International Conference on Computer Vision, Vancouver, Canada, Jul. 2001, pp. 139-144.

Bakker, P. et al., "Edge preserving orientation adaptive filtering," Proceedings of the IEEE Conference on Computer Vision and Pattern Recognition, Jun. 1999, 7 pages.

Blum, H., "A Transformation for Extracting New Descriptors of Shape," In W. Walthen-Dunn, editor, Models for the Perception of Speech and Visual Form, MIT Press, 1967, pp. 362-380.

Bouix, S. et al., "Divergence-Based Medial Surfaces," ECCV 2000 (D. Vernon, ed.), LNCS 1842, pp. 603-618, 2000.

Bradley, E. et al., "Feature Characterization in Scientific Data," Proceedings of the Fourth International Symposium on Intelligent Data Analysis (F. Hoffmann et al., eds.), LNCS 2189, pp. 1-12, 2001.

Brown, M. et al., "Knowledge-based segmentation of pediatric kidneys in CT for measurement of parenchymal volume," in Medical Imaging 2000: Image Processing (Kenneth M. Hanson, ed.), Proceedings of SPIE, 2000, vol. 3979, pp. 204-211.

Bruckstein, A. M. et al., "Evolutions of Planar Polygons," Int. J. Pattern Recognition, 1995, vol. 9(6), pp. 991-1014.

Bruckstein, A. M. et al., "On Projective Invariant Smoothing and Evolutions of Planar Curves and Polygons," J. Math. Imaging Vision, 1997, vol. 7(3), pp. 225-240.

Buades, A., et al., "A non-local algorithm for image denoising," CVPR, 2005, 6 pages.

Buades, A., et al., "Image enhancement by non-local reverse heat equation," Technical report, CMLA Preprint N 2006-22, 2006, 13 pages.

Buck, I., "Stream Computing on Graphics Hardware," Sep. 2006, Ph.D. Dissertation, Stanford University, UMI Order No. AAI3162314.

Chopra, S., "Coherence cube and beyond," First Break, vol. 20, Jan. 2002, pp. 27-33.

Clark, D., "SEG's 2006 Member Compensation Survey," The Leading Edge, May 2007, vol. 26(5), pp. 578-581.

Cohen, E., et al., "Errata for Geometric Modeling with Splines," AK Peters, 2001, 2 pages.

Cohen, I. et al., "Local Discontinuity Measures for 3-D Seismic Data," Geophysics, Nov.-Dec. 2002, vol. 67, No. 6, pp. 1933-1945.

Cole, R., et al., eds., "Survey of the state of the art in human language technology," vol. XII-XIII, Cambridge Studies in Natural Language Processing, Cambridge University Press, ISBN 0-521-59277-1, 1997.

Cornea, N., et al., "Computing Hierarchical Curve-Skeletons of 3D Objects," The Visual Computer, Oct. 2005, 18 pages.

Dargay, J., et al., "Vehicle ownership and income growth, Worldwide: 1960-2030," ESRC Transport Studies Unit, University College, London, UK, Jan. 2007, pp. 1-32.

De Graaf, et al., "A Methodology for the Validation of Image Segmentation Methods," Fifth Annual IEEE Symp Comput Based Med Syst, 1992, pp. 17-24.

Dodgson, N.A., "Autostereoscopic 3D Displays," IEEE Computer, Aug. 2005, vol. 38(8), pp. 31-36.

Donnelly, J., "Second IPTC Addresses Challenges of Project Execution, Talent Shortage," JPT, Feb. 2008, pp. 40-43.

Dorn et al., "Drilling Visualization Research Consortium (DVRC) 2004 Annual Research Report," BP Center for Visualization, University of Colorado, Boulder, Jun. 24, 2005, 46 pages.

Dorn et al., "Drilling Visualization Research Consortium (DVRC) 2005 Annual Research Report," BP Center for Visualization, LP, University of Colorado, Boulder, Mar. 11, 2006, 64 pages.

Dorn et al., "Prototype AHAA User's Documentation," ARCO Oil and Gas Co., 1995 (released by ARCO management in Mar. 2000), pp. 64-67.

Dorn, "Modern 3-D Seismic Interpretation," The Leading Edge, Sep. 1998, pp. 1262-1272.

Englund, C., et al., "Speech Recognition in the JAS 39 Gripen aircraft—adaption to speech at different G-loads," Master Thesis in Speech Technology, Dept of Speech, Music and Hearing, Royal Institute of Technology, Stockholm, Mar. 11, 2004, 57 pages.

Feddern, C., et al., "Curvature-Driven PDE Methods for Matrix-Valued Images" International Journal of Computer Vision, vol. 69(1), 2006, 15 pages.

Fehmers et al., "Fast structural interpretation with structure-oriented filtering," Geophysics, vol. 68(4), Jul.-Aug. 2003, pp. 1286-1293.

Frangi, A., et al., "Multiscale Vessel Enhancement Filtering," Lecture Notes in Computer Science, vol. 1496, Germany 1998, pp. 130-137.

Gage, M., et al., "The heat equation shrinking convex plane curves" J. Differential Geometry, vol. 23(1), 1986, pp. 69-96.

Gage, M.E., "Curve shortening makes convex curves circular," Inventiones Mathematica, vol. 76, 1984, pp. 357.

General-Purpose Computation on Graphics Hardware, webpage 2010, 7 pages, available at http://www.GPGPU.org.

Gomes, J., et al., "Reconciling Distance Functions and Level Sets," Institut National De Recherche en Informatique et en Automatique, No. 3666, Apr. 1999, pp. 1-15.

Grayson, M., "The heat equation shrinks embedded plane curves to round points," J. Differential Geometry, vol. 26, 1987, pp. 285-314.

Gruchalla, K., "Immersive Well-Path Editing: Investigating the Added Value of Immersion," IEEE Virtual Reality, Mar. 27-31, 2004, pp. 157-164.

Hansan, K., et al., "Analytical computation of the eigenvalues and eigenvectors in DT-MRE," Journal of Magnetic Resonance, vol. 152, 2001, pp. 41-47.

Harders et al. "New Metaphors for Interactive 3D Volume Segmentation," EuroHaptics, Jul. 2001, pp. 129-134.

Harris M., "Parallel Prefix Sum (Scan) with CUDA," Nvidia, Apr. 2007, pp. 1-18.

Hassouna, M. S., et al., "Robust Centerline Extraction Framework Using Level Sets," IEEE Computer Society Conference on Computer Vision and Pattern Recognition (CVPR '05), 2005, pp. 8 pages.

Henry, S., "Pitfalls in Synthetics," The Leading Edge, Jun. 2000, pp. 604, 606.

Hocker, C., et al., "Fast structural interpretation with structure-oriented filtering" The Leading Edge, Mar. 2002, pp. 238, 240, 242-243.

Huisken, G., "Flow by Mean Curvature of Convex Surfaces Into Spheres," J. Differential Geometry, vol. 20, 1984, pp. 237-266.

Huisken, G., et al., "Mean curvature flow singularities for mean convex surfaces" Calc. Vat. Partial Differential Equations, 1999, pp. 1-14.

Huttenlocher, D., et al., "Comparing images using the Hausdorff distance," IEEE Transactions on Pattern Analysis and Machine Intelligence, vol. 15, No. 9, Sep. 1993, pp. 850-863.

Ibanez, et al., Insight Segmentation and Registration Toolkit (ITK), ITK Software Guide 2.4.0, Nov. 2005, 836 pages.

Imhof, "Enhancing Seismic Images using Anisotropic Nonlinear Diffusion," 73rd Annual International Meeting, Society of Exploration Geophysicists, 2003, pp. 1763-1766.

Jeong, W.K., et al., "A Fast Iterative Method for a Class of Hamilton-Jacobi Equations on Parallel Systems," University of Utah Technical Report UUCS-07-010, Apr. 18, 2007, pp. 1-25.

Jeong, W.K., et al., "A Fast Iterative Method for Eikonal Equations," Scientific Computing and Imaging Institute, School of Computing, University of Utah, 2007, 23 pages.

Jeong, W.K., et al., "Interactive 3D Seismic Fault Detection on the Graphics Hardware," Volume Graphics, 2006, 8 pages.

Jervis, "Edge preserving filtering on 3-D seismic data using complex wavelet transforms," SEG/New Orleans 2006 Annual Meeting, pp. 2872-2876.

Johansson, "Local Level Set Segmentation with Topological Structures", Master of Media Technology, Linkoping University, 2006 (retrieved from: http://www.diva-portal.org/diva/getDocument?urn_nbn_se_liu_diva-6904-1_fulltext.pdf) entire document.

Johansson, G., et al., "Accelerating Marching Cubes with Graphics Hardware," Proceedings of the 2006 Conference of the Center for Advanced Studies on Collaborative Research, 2006.

Junqua, J.C., et al., "Robustness in Automatic Speech Recognition: Fundamentals and Applications," Kluwer Academic Publishers, ISBN 978-0792396468, 1995.

Kadlec et al., "Medial Surface Guided Level Sets for Shape Exaggeration," IASTED Visualization, Imaging, and Image Processing (VIIP), Special Session on Applications of Partial Differential Equations in Geometric Design and Imaging, Sep. 2008, 5 pages.

Kadlec, B.J., "Channel Segmentation using Confidence and Curvature-Guided Level Sets on Noisy Seismic Images," IEEE Workshop on Applications of Computer Vision, Jan. 2008.

Kadlec, B.J., et al., "3D Semi-Automated Fault Interpretation in CASI Using Evolving Surfaces," AAPG Annual Meeting, Apr. 20-23, 2008.

Kadlec, B.J., et al., "Confidence and Curvature-Guided Level Sets for Channel Segmentation," SEG Annual Meeting, Nov. 12, 2008, 4 pages.

Kadlec, B.J., et al., "Interactive 3-D Computation of Fault Surfaces Using Level Sets," Visual Geosciences, Springer, 2008, 6 pages.

Kadlec, B.J., et al., "Knowledge-Assisted Visualization and Segmentation of Geologic Features," IEEE Computer Graphic and Applications, vol. 30, No. 1, Jan./Feb. 2010, pp. 29-39.

Kass et al., "Snakes: Active Contour Models," International J. of Computer Vision, 1988, pp. 321-331.

Kimmel, R. et al., "Analyzing and Synthesizing Images by Evolving Curves with the Osher-Sethian Method," International Journal of Computer Vision, 1997, vol. 24(1), pp. 37-55.

Kobbelt et al., "A Shrink Wrapping Approach to Remeshing Polygonal Surfaces," Eurographics, 1999, vol. 18, No. 3, pp. 119-130.

Koo et al., "Shrink-Wrapped Boundary Face Algorithm for Mesh Reconstruction from Unorganized Points," ETRI Journal, Apr. 2005, vol. 27, No. 2, pp. 235-238.

Lomask et al., "Flattening without picking," Geophysics, Jul.-Aug. 2006, vol. 71, No. 4, pp. P13-P20.

Luo et al., "Edge detection and statigraphic analysis using 3D seismic data," 1996, 4 pages.

Mahe, "Solving a problem involving geobody extraction," Business Bottom Line, The Leading Edge, Jan. 2007, pp. 22-23.

Mortensen et al., "Intelligent Scissors for Image Composition," SIGGRAPH, 1995, pp. 191-198.

Posamentier, H. W. et al., "Imaging Elements of Depositional Systems with 3-D Seismic Data: A Case Study," Proceedings of the 17th Annual SEPM Gulf Coast Section Research Conference, 1996, pp. 213-228.

Schenk et al., "Efficient Semiautomatic Segmentation of 3D Objects in Medical Images," MICCAI—Medical Image Computing and Computer-Assisted Intervention, Oct. 2000, pp. 186-195.

Sethian et al., "A Fast Marching Level Set Method for Monotonically Advancing Fronts," Proc. Nat. Acad. Sci., Feb. 1996, vol. 93(4), pp. 1591-1595.

Sethian et al., "Curvature and the Evolution of Fronts," Commun. Math. Phys, 1985, vol. 101(4), 1985, pp. 487-499.

Sethian et al., "Crystal Growth and Dendritic Solidification," J. Comp Phys., 1992, vol. 98(2), pp. 231-253.

Stark, T. J., "Relative Geologic Time (Age) Volumes—Relating Every Seismic Sample to a Geologically Reasonably Horizon," The Leading Edge, 2004, vol. 23, pp. 928.

Stark, T., "Visualization techniques for enhancing stratigraphic inferences from 3D seismic data volumes," First Break, Apr. 2006, vol. 24, pp. 75-85.

Touysinhthiphonexay et al., "Drilling Visualization Research Consortium 2002 DVRC Research Report," BP Center for Visualization, University of Colorado, 2002, 23 pages.

Zeng et al., "Stratal Slicing and Seismic Facies Imaging; Bureau of Economic Geology," The University of Texas at Austin, AAPG Bulletin vol. 82 (1998c), No. 13 (Supplement), 2 pages.

Zeng et al., "Stratal Slicing, Part II: Real 3-D Seismic Data," Geophysics, 1998b, vol. 63, pp. 514-522.

Zeng et al., "Stratal Slicing, Part 1: Realistic 3-D Seismic Model," Geophysics, 1998a, vol. 63, pp. 502-513.

Zeng et. al., "Interpretive advantages of 90 degree-phase wavelets: Part 2—Seismic applications," Geophysics, SEG., vol. 70, No. 3, May 2005, pp. C17-C24, XP002469790.

Zhao, H. "A Fast Sweeping Method for Eikonal Equations," Mathematics of Computation, 2004, vol. 74, No. 250, pp. 603-627.

International Search Report for International (PCT) Patent Application No. PCT/US2007/071733, mailed May 15, 2008.

Written Opinion for International (PCT) Patent Application No. PCT/US2007/071733, mailed May 15, 2008.

International Preliminary Report on Patentability for International (PCT) Patent Application No. PCT/US2007/071733, mailed Jan. 8, 2009.

Examination Report for European Application No. 07840274.0, mailed Jun. 3, 2009.

International Search Report for International (PCT) Application No. PCT/US08/83637, mailed Jan. 16, 2009.

Official Action for U.S. Appl. No. 11/766,287, mailed Mar. 31, 2010.

Official Action for U.S. Appl. No. 11/766,287, mailed Sep. 15, 2010.

Posamentier et al., "Seismic geomorphology: imaging elements of depositional systems from shelf to deep basin using 3D seismic data: implications for exploration and development," Geological Society, London, Memoirs 2004, vol. 29, pp. 11-24.

Abstract for Zeng et al., "Stratal Slicing and Seismic Facies Imaging," 1998 AAPG Annual Convention Abstract, Salt Lake City, Utah, May 17-28, 1998, 2 pages.

Written Opinion for International (PCT) Application No. PCT/US08/83637, mailed Jan. 16, 2009, 7 pages.

International Preliminary Report on Patentability for International (PCT) Application No. PCT/US08/83637, mailed May 27, 2010, 9 pages.
International Search Report for International (PCT) Patent Application No. PCT/US2009/040331, mailed Jun. 10, 2009, 2 pages.
Written Opinion for International (PCT) Patent Application No. PCT/US2009/040331, mailed Jun. 10, 2009, 5 pages.
International Preliminary Report on Patentability for International (PCT) Application No. PCT/US2009/040331, mailed Oct. 21, 2010, 7 pages.
"Geoscience Interpretation Visualization Consortium (GIVC)," TerraSpark Geosciences, printed May 11, 2006, http://terraspark.com/GIVC.consort, 5 pages.
Stark, T. J., "Relative Geologic Time (Age) Volumes—Relating Every Seismic Sample to a Geologically Reasonably Horizon," The Leading Edge, Sep. 2004, vol. 23, pp. 928-932.
"International Energy Outlook 2007," Energy Information Administration, Report #:DOE/EIA-0484(2007) Release Date: May 2007, http://www.eia.doe.gov/oiaf/ieo/highlights.html, May 2007, 230 pages.
Blum, H. et al., "Shape description using weighted symmetric axis features," Pattern Recognition, No. 10, 1978, pp. 167-180.
Carlson, J., et al., "Surface Draping and Surface Wrapping in CASI: User-Guided Automated Techniques for Rapid Interpretation of Structural and Stratigraphic Features," AAPG Annual Meeting, Apr. 20-23, 2008, 1 page.
Cormen, T.H., et al., "Section 24.3: Dijkstra's Algorithm," Introduction to Algorithms, Second Edition, MIT Press and McGraw-Hill, 2001, pp. 595-601 (ISBN 0-262-03293-7).
Dailey, et al., "Dip and azimuth displays for 3D seismic interpretation", First Break, vol. 7, No. 3 (1989), pp. 86-95.
Dorn et al., "A Case Study of Semi-Automatic True Volume Interpretation in CASI of Both Structure and Stratigraphy from a 3D Survey in the Gulf of Mexico," AAPG Annual Meeting, Apr. 20-23, 2008, 1 page.
Dorn, "Advanced 3-D Seismic Interpretation," pre-press, to be published jointly by the SEG and the AAPG, Tulsa, OK., 2009, Oct. 15, 2008, 50 pages.
Dorn, "Detection and Mapping of Faults in 3-D Seismic Surveys," ARCO Oil and Gas Co., Research Report RR88-0044, Sep. 1988 (released by ARCO management in Mar. 2000) 80 pages.
Dorn et al. "Visualization in 3-D seismic interpretation," The Leading Edge, Oct. 1995, pp. 1045-1049.
Finn, et al., "Estimation of Three-Dimensional Dip and Curvature from Reflection Seismic Data", Expanded Abstracts of the Technical Programm of the 56th Annual International Meeting and Exposition, Paper S3.1 (SEG, 1986), pp. 355-358.
Gurney, "Threshold Selection for Line Detection Algorithms", Trans. on Geoscience and Remote Sensing, vol. GE-18, No. 2 (IEEE, 1980), pp. 204-211.
Hammon, W.S., et al., Domain Transformation in CASI: Building a Volume of Paleo-Depositional Surfaces, AAPG Annual Meeting, Apr. 20-23, 2008, 10 pages.
Harris, M., et al., "Parallel Prefix Sum (Scan) in CUDA," GPU Gems 3, 2007, 16 pages.
Henry, S., "Understanding Seismic Amplitudes," AAPG Explorer, Jul. and Aug. 2004, 7 pages.
"NANO" © 2010, http://www.tatanano.com, 1 page.
Hutchinson, "FZAP! 1.0 Offers Automated Fault Picking", Internet document (Landmark Graphics Corporation, May/Jun. 1997) 4 pages.
Kadlec, B.J., et al., "3D Structure Tensor Approach to Medial-Surface Extraction and Segmentation Using Level Sets," IASTED Visualization, Imaging, and Image Processing (VIIP), Special Session on Applications of Partial Differential Equations in Geometric Design and Imaging, Sep. 2008, 6 pages.
Karlsen, K.H., et al., A fast level set method for reservoir simulation, Computational Geosciences, Jun. 13, 2000, vol. 4, No. 2, pp. 185-206.
Khronos Group, The Khronos Group Releases OpenCL 1.0 Specification, Dec. 8, 2008, 6 pages.
Kimmel, R., et al., Skeletonization via distance maps and level sets, Computer Vision and Image Understanding, v.62 n. 3, p. 382-391, Nov. 1995.
Kiryati, N., et al., Estimating shortest paths and minimal distances on digitized three-dimensional surfaces. Pattern Recognition, Nov. 1993, vol. 26, pp. 1623-1637.
Kovasznay et al. "Image processing," Proceedings of the IRE, May 1955, 43, pp. 560-570.
Lalonde, K., Investigations into the analysis of remote sensing images with a growing neural gas pattern recognition algorithm, IEEE International Joint Conference on Neural Networks, Jul. 31-Aug. 4, 2005, vol. 3, Issue 31, pp. 1698-1703.
Latecki, L. J., et al., Skeletonization using SSM of the Distance Transform. IEEE Int. Conf. on Image Processing (ICIP), San Antonio, Texas, Sep. 2007, 4 pages.
Lee, T., et al., Building skeleton models via 3-D medial surface/axis thinning algorithms, CVGIP: Graphical Models and Image Processing, Nov. 1994, vol. 56, Issue 6, pp. 462-478.
Lefohn, A. E., et al., A Streaming Narrow-Band Algorithm: Interactive Computation and Visualization of Level Sets, IEEE Transactions on Visualization and Computer Graphics, Jul./Aug. 2004, vol. 10, No. 4, 15 pages.
Lewis, C., et al., Task-centered user interface design: A practical guide, http://hcibib.org/tcuid, 1993, 190 pages.
Lorensen et al. "Marching Cubes: a high resolution 3D surface reconstruction algorithm," Computer Graphics, Jul. 1987, vol. 21, No. 4, pp. 163-169 (Proc. of SIGGRAPH).
Malladi et al. "A Unified Approach to Noise Removal, Image Enhancement, and Shape Recovery," IEEE Transactions on Image Processing, Nov. 1996, vol. 5, No. 11, pp. 1554-1568.
Malladi et al. "A unified framework for Shape Segmentation, Representation and Recognition," LBL-36039, Lawrence Berkeley Laboratory, UC-Berkeley, Aug. 1994, 34 pages.
Malladi et al. "Shape modeling with front propagation: A level set approach." IEEE Trans. On Pattern Analysis and Machine Intelligence, Feb. 1995, vol. 17, No. 2, pp. 158-175.
Microsoft Windows Vista Speech Recognition, http://www.microsoft.com/enable/products/windowsvista/speech.aspx, 2008, 3 pages.
Mikereit, et al., "Multiattribute Processing of Seismic Data: Application to Dip Displays", Canadian Journal of Exploration Geophysics, Dec. 1990, vol. 26, No. 1 and 2, pp. 47-53.
Montanari, U., A Method for Obtaining Skeletons Using a Quasi-Euclidean Distance, Journal of the ACM (JACM), Oct. 1968, vol. 15 No. 4, pp. 600-624.
Mulder et al. "A survey of computational steering environments." Future Gener. Comput. Syst., Feb. 1999, vol. 15, No. 1, pp. 119-129.
Mulligan et al. "Topological mapping from image sequences," Proceedings of the IEEE Workshop on Learning in Computer Vision and Pattern Recognition (with CVPR05), Jun. 2005, 8 pages.
Mullins et al. "Morphological stability of a particle growing by diffusion or heat flow," J. Appl. Math, Feb. 1963, vol. 34, No. 2, pp. 321-332.
K. Museth, D. Breen, R. Whitaker and A. Barr, "Level Set Surface Editing Operators", ACM Transactions on Graphics, proceedings of ACM SIGGRAPH '02 (San Antonio, TX), vol. 21(3), pp. 330-338, Jul. 2002.
Niblack et al. "Generating Skeletons and Centerlines from the Medial Axis Transform," Pattern Recognition, Jun. 1990, pp. 881-885.
NVIDIA CUDA Compute Unified Device Architecture, Programming Guide, Version Beta 2.0, Apr. 2, 2008, 107 pages.
NVIDIA Tesla S1070, http://www.nvidia.com/object/product_tesla_s1070_us.html, Dec. 2008, 2 pages.
Osher et al. "Fronts propagating with curvature-dependent speed-Algorithms based on Hamilton-Jacobi formulations," Journal of Computational Physics, Nov. 1988, vol. 79, No. 1, pp. 12-49.
Osher et al. "Level Set Methods and Dynamic Implicit Surfaces," Springer, Oct. 2002, 288 pages.
Osher et al. "Level Set Methods: An Overview of Some Recent Results," Journal of Computational Physics, May 2001, vol. 169, No. 2, pp. 463-502.

Owens et al. "A Survey of General-Purpose Computation on Graphics Hardware." In Eurographics 2005, State of the Art Reports, Aug. 2005, pp. 21-51.

Palagyi "A 3-subiteration 3D thinning algorithm for extracting medial surfaces," Pattern Recognition Letters, Apr. 2002, vol. 23, No. 6, pp. 663-675.

Jin "The Finite Element Method in Electromagnetics 2nd Edition." Wiley-IEEE Press, May 2002, Chapter 1 Basic Electromagnetic Theory, 18 pages.

Parker et al. "Computational Steering Software Systems and Strategies." IEEE Comput. Sci. Eng., Oct. 1997, vol. 4, No. 4, pp. 50-59.

Perona et al. "Scale-Space and Edge Detection Using Anisotropic Diffusion," IEEE Transactions on Pattern Analysis and Machine Intelligence, Jul. 1990, vol. 12, No. 7, pp. 629-639.

RealD CrystalEyes, http://reald-corporate.com/scientific/crystaleyes.asp, 2008, 1 page.

Reniers et al. "Skeleton-based Hierarchical Shape Segmentation." In Proceedings of the IEEE international Conference on Shape Modeling and Applications 2007 (Jun. 13-15, 2007). SMI. IEEE Computer Society, Washington, DC, 179-188.

Riazanoff, "Ridge and valley line extraction from digital terrain models", Int. J. Remote Sensing, 1988, vol. 9, No. 6, pp. 1175-1183.

Richardsen, S. K., et al., Mapping 3D Geo-Bodies Based on Level Set and Marching Methods, Mathematical Methods and Modelling in Hydrocarbon Exploration and Production, pp. 247-265, Springer, 2005.

Robins, V., et al., Computing Connectedness: An Exercise in Computational Topology, Nonlinearity, Jul. 1998, vol. 11, No. 4, pp. 913-922.

Robins, V., et al., Computing Connectedness: Disconnectedness and discreteness, Physica, May 2000, vol. 139, pp. 276-300.

Robins et al. "Topology and intelligent data analysis," Intelligent Data Analysis, Oct. 2004, vol. 8, No. 5, pp. 505-515.

Robins et al. "Topology-Based Signal Separation," Chaos, Feb. 2004, vol. 14, No. 2, pp. 305-316, 21 pages.

Roksandic "Seismic Facies Analysis Concepts," Geophys Prospect, Jun. 1978, vol. 26 Issue 2, pp. 383-398.

Rumpf et al. "A continuous skeletonization method based on level sets," Proceedings of the symposium on Data Visualisation 2002, May 27-29, 2002, Barcelona, Spain, 7 pages.

Saha et al. "Detection of 3-D simple points for topology preserving transformations with application to thinning," IEEE Transactions on Pattern Analysis and Machine Intelligence, vol. 16, No. 10, pp. 1028-1032, Oct. 1994.

Sapiro "Vector (self) snakes: A geometric framework for color, texture and multiscale image segmentation." In Proc. IEEE International Conference on Image Processing, vol. 1. Lausanne, Switzerland, Sep. 1996, 4 pages.

Sato et al. "3D Multi-scale line filter for segmentation and visualization of curvilinear structures in medical images," Lecture Notes in Computer Science, Issue 1205, pp. 213-222, Springer, 1997.

Scharsach "Advanced GPU Raycasting," In Proceedings of CESCG 2005, 2005, 8 pages.

Showerman et al. "QP: A Heterogeneous Multi-Accelerator Cluster," NCSA Technical Report, 2008, 8 pages.

Siddiqi et al. "Hamilton-Jacobi Skeletons," International Journal of Computer Vision, Jul. Aug. 2002, vol. 48, No. 3, pp. 215-231.

Stark "Surface slice generation and interpretation: A review", The Leading Edge, Jul. 1996, vol. 15, No. 7, pp. 818-819.

Stark "Surface slices: Interpretation using surface segments instead of line segments", Expanded Abstracts of the 1991 Society of Exploration Geophysicists Annual Meeting, Nov. 14, 1991, Paper CH5.1, pp. 259-262.

Steeghs et al. "Extraction of Attributes from 3D Seismic Data" 58th Conference and Technical Exhibition, Jun. 1996, Paper X032, 1 page.

Steiner et al. "Planar Shape Enhancement and Exaggeration," Graphics Models and Image Processing, Mar. 1998, vol. 60, No. 2, pp. 112-124.

Tatarchuk, N., et al., "Real-Time Isosurface Extraction Using the GPU Programmable Geometry Pipeline," International Conference on Computer Graphics and Interactive Techniques, 2007, 16 pages.

Tufo et al. "Hairpin Vortex Formation, a Case Study for Unsteady Visualization," Proceedings of the 41st CUG Conference, Jul. 1999, 12 pages.

Tufo et al. "Numerical Simulation and Immersive Visualization of Hairpin Vortex Generation," Proceedings of SC99, Aug. 1999, 16 pages.

Udupa et al. "A framework for evaluating image segmentation algorithms," Computerized Medical Imaging and Graphics, Mar. 2006, vol. 30, No. 2, pp. 75-87.

Vanderbrug, "Line Detection in Satellite Imagery", Trans. on Geoscience Electronics, Jan. 1976, vol. GE-14, No. 1, pp. 37-44.

Visible Human Project, National Library of Medicine, National Institutes of Health, http://vvww.nlm.nih.gov/research/visible/visible_human.html, 3 pages.

Walton "Three-dimensional seismic method," Geophysics, Jun. 1972, vol. 37, No. 3, pp. 417-430.

Wang et al. "Volume-Sampled 3D Modeling," IEEE Computer Graphics and Applications, Sep. 1994, vol. 14, No. 5, pp. 26-32.

Weickert "Anisotropic diffusion in image processing." ECMI Series, Teubner, Stuttgart, 1998, 184 pages.

Weickert "Coherence-enhancing diffusion filtering." International Journal of Computer Vision, Apr. 1999, vol. 31, No. 2-3, pp. 111-127.

Weinstein, C.J., Opportunities for Advanced Speech Processing in Military Computer-Based Systems, Lincoln Laboratory, MIT, Lexington, MA, 1991, 20 pages.

Whitaker "Volumetric deformable models: Active blobs." Visualization in Biomedical Computing, SPIE, Sep. 1994, vol. 2359, pp. 122-134.

Whitaker "A level-set approach to 3D reconstruction from range data." International Journal of Computer Vision, Sep. 1998, vol. 29, No. 3, 203-231.

Wyvill et al. "Extending the CSG Tree. Warping, Blending and Boolean Operations in an Implicit Surface Modeling System," Computer Graphics Forum, Jun. 1999, vol. 18, No. 2, pp. 149-158.

Yuen et al. "Clustering and Visualization of Earthquake Data in a Grid Environment," Visual Geosciences, Jan. 2005, 25 pages.

Yuille et al. "Feature Extraction from Faces Using Deformable Templates," International Journal of Computer Vision, Aug. 1992, vol. 8, No. 2, pp. 99-111.

Zhang et al. "Retrieving Articulated 3-D Models Using Medial Surfaces and Their Graph Spectra," EMMCVPR 2005, LNCS 3757, pp. 285-300, 2005.

Zhou et al. "Efficient Skeletonization of Volumetric Objects," IEEE TVCG, Jul.-Sep. 1999, vol. 5, No. 3, pp. 196-209.

Zhukov et al. "Level set modeling and segmentation of DT-MRI brain data," 2003, 14 pages.

Official Action for Chinese Patent Application No. 200780031318.4, issued Jan. 31, 2011 2 pages.

Official Action for European Patent Application No. 07840274.0, dated Apr. 21, 2011 4 pages.

Official Action for U.S. Appl. No. 12/772,687, mailed Nov. 9, 2010 9 pages.

Official Action for U.S. Appl. No. 12/772,663, mailed Nov. 15, 2010 6 pages.

Official Action for Australia Patent Application No. 2009234284, dated May 19, 2011 2 pages.

Official Action for U.S. Appl. No. 12/772,663, mailed May 26, 2011, 10 pages.

* cited by examiner

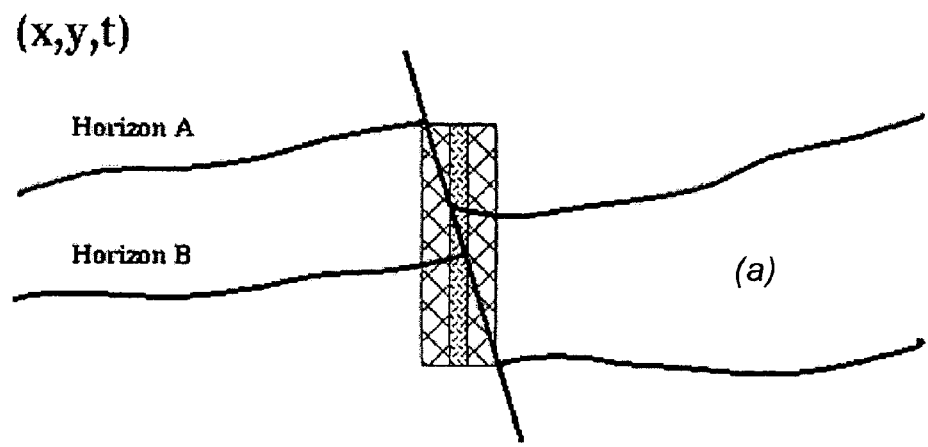
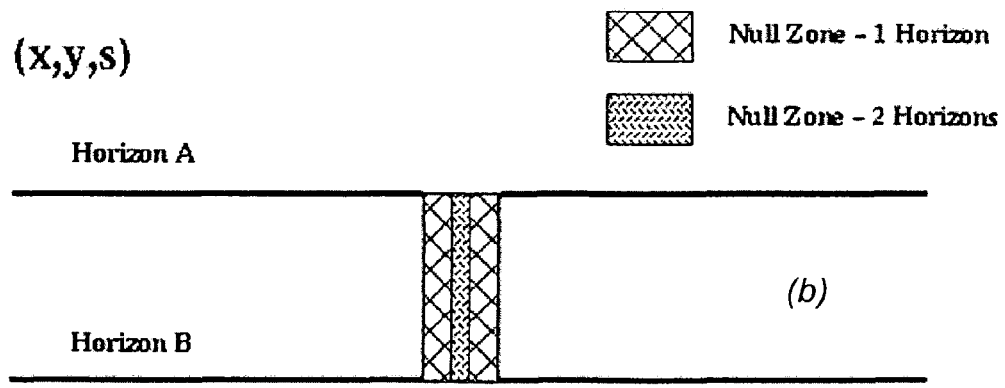
Fig. 1

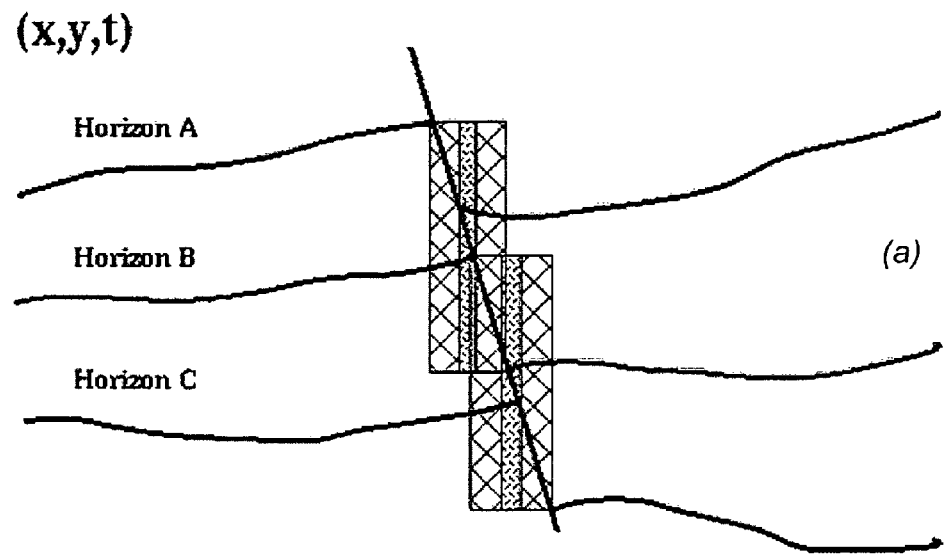
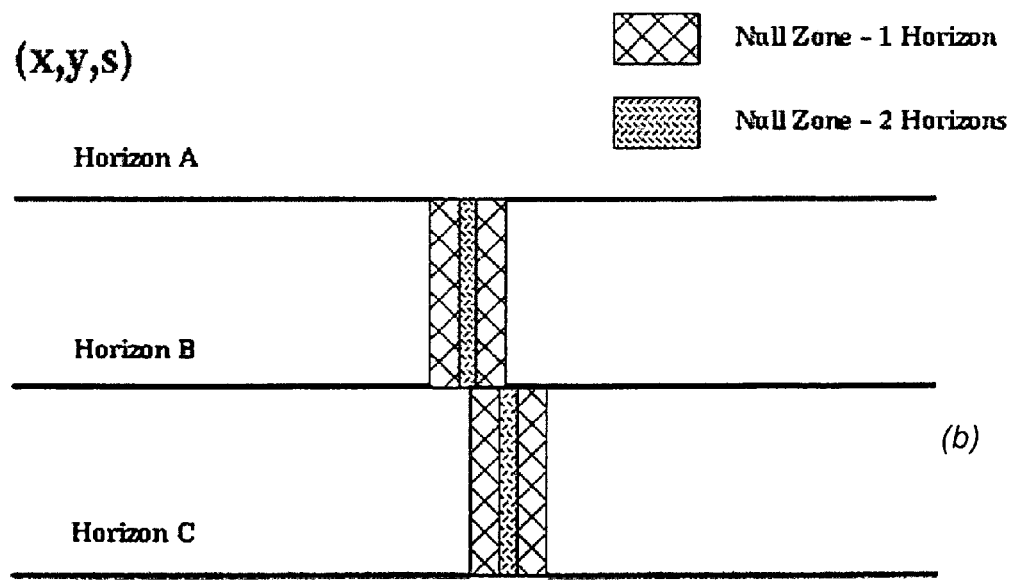
Fig. 2

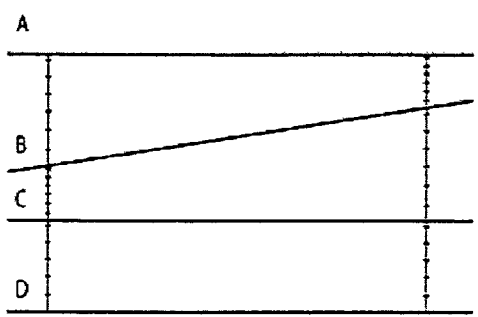 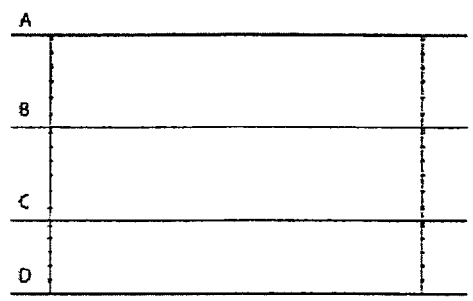
*Fig. 8A*  *Fig. 8B*

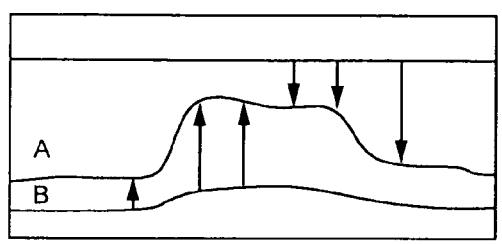 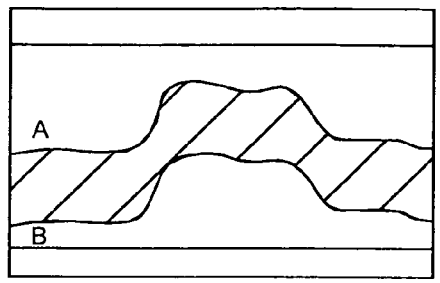
*Fig. 11A*  *Fig. 11B*
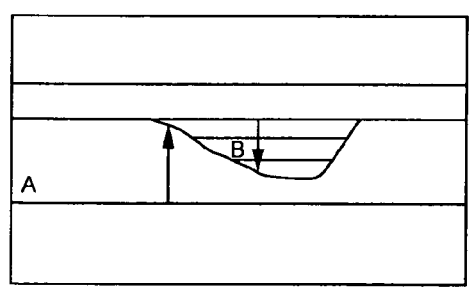 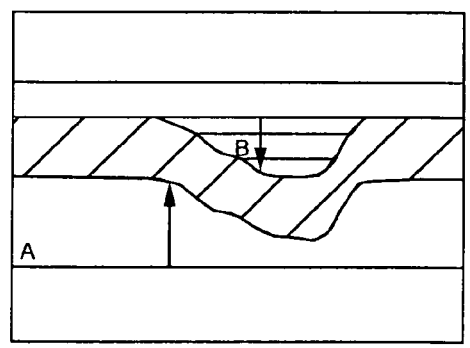
*Fig. 12A*  *Fig. 12B*

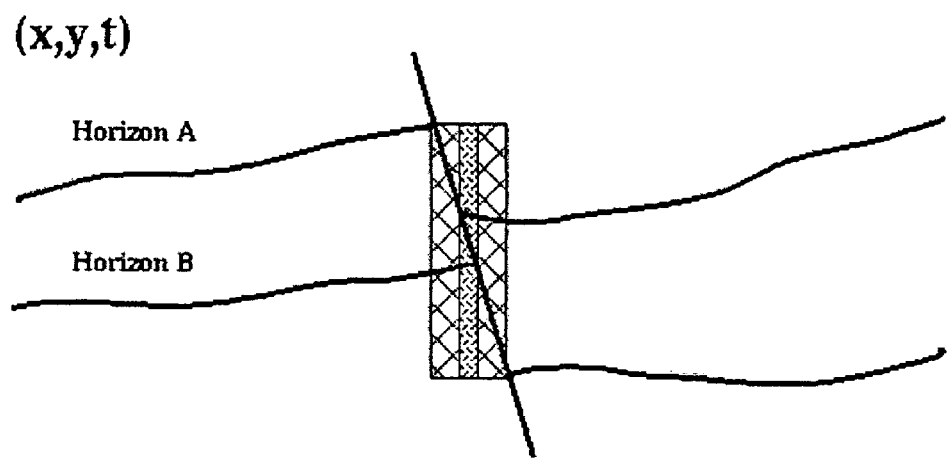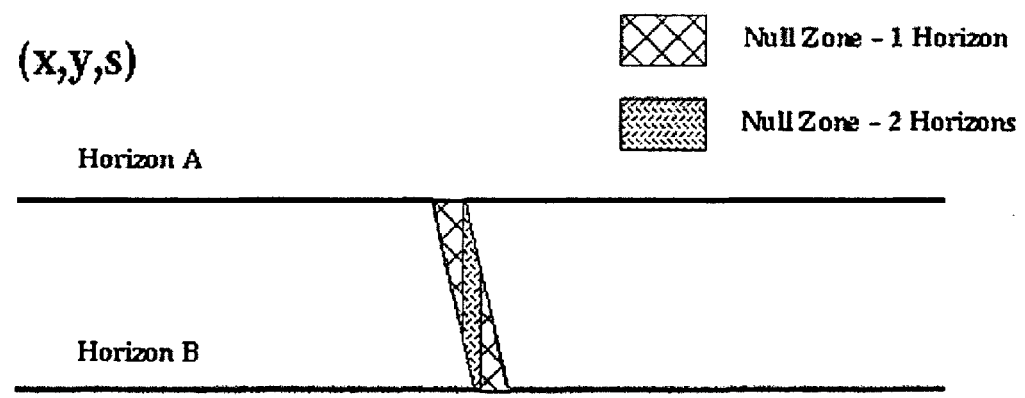
Fig. 13

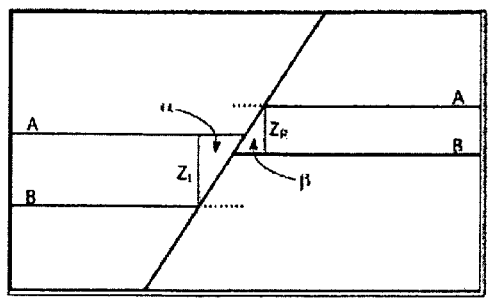 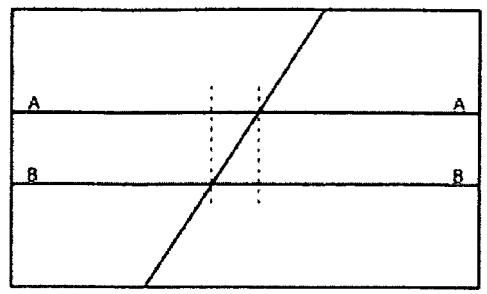
Fig. 16A    Fig. 16B
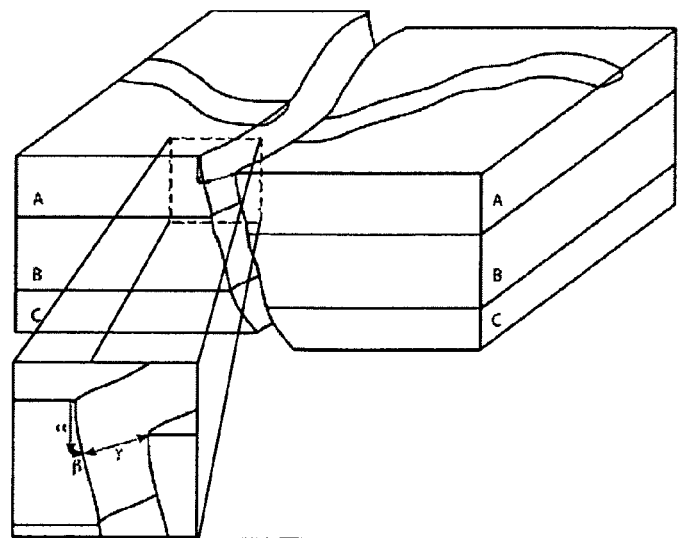
Fig. 17A
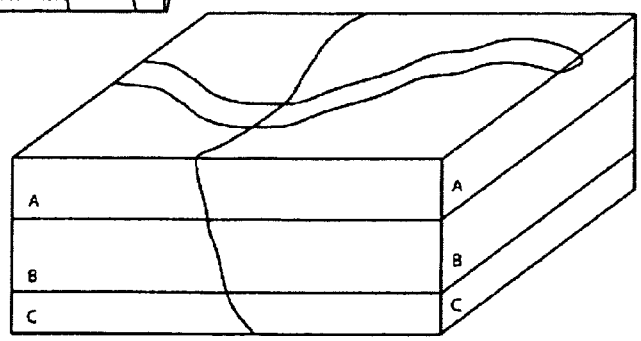
Fig. 17B

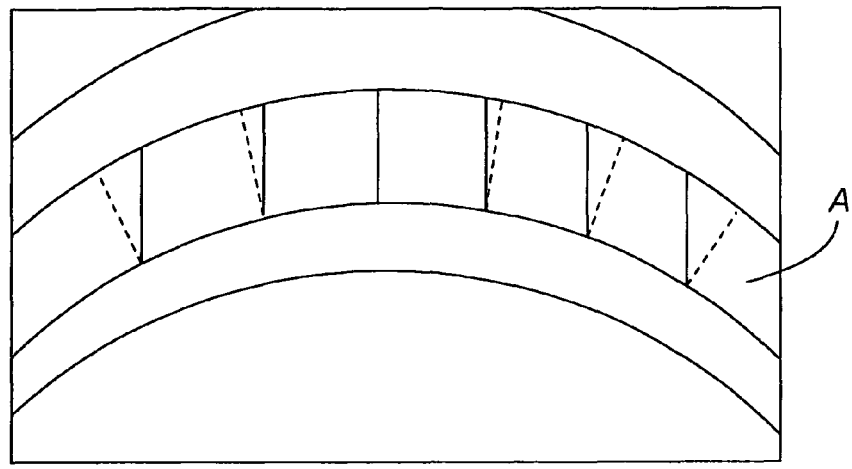
Fig. 18
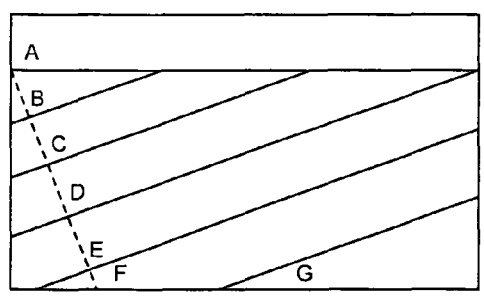
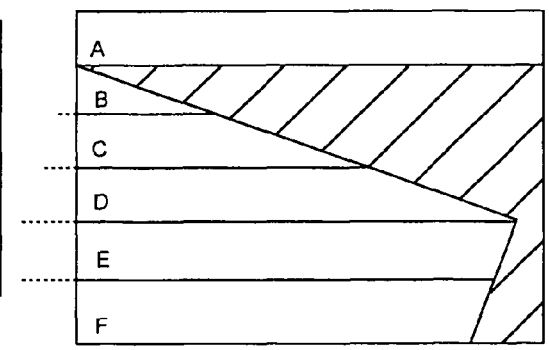
Fig. 19A  Fig. 19B

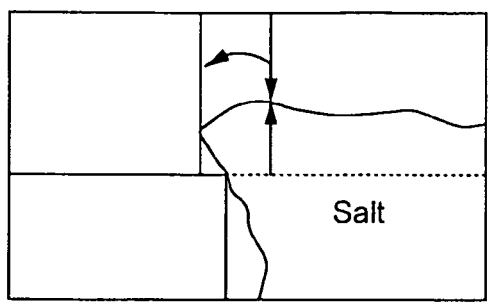 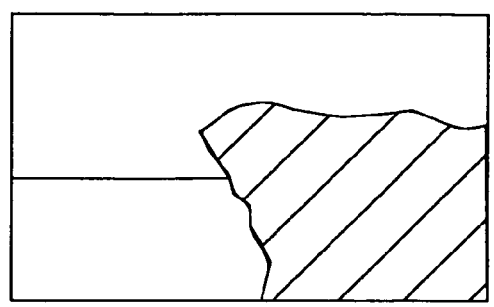
Fig. 20A  Fig. 20B

 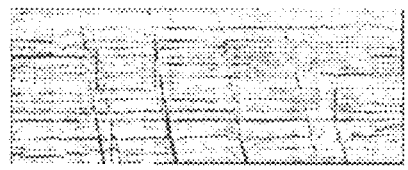
Fig. 28A  Fig. 28B
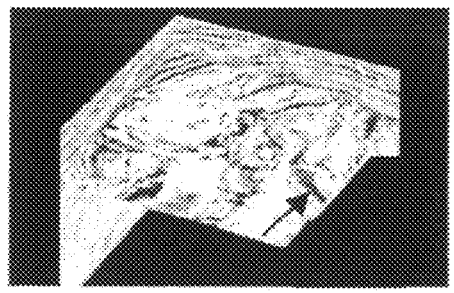 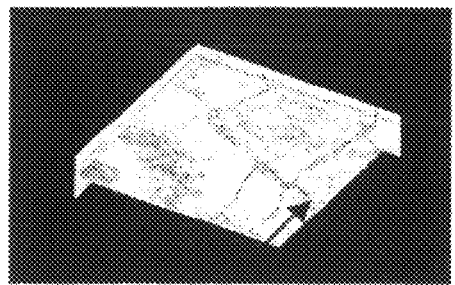
Fig. 28C  Fig. 28D

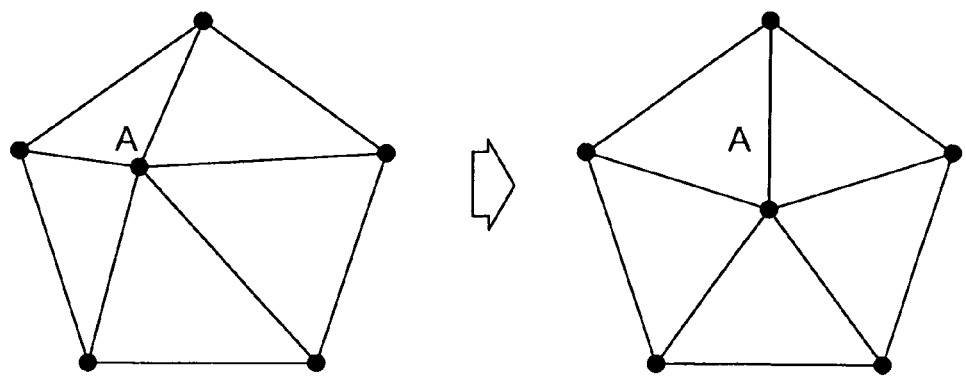
*Fig. 35*
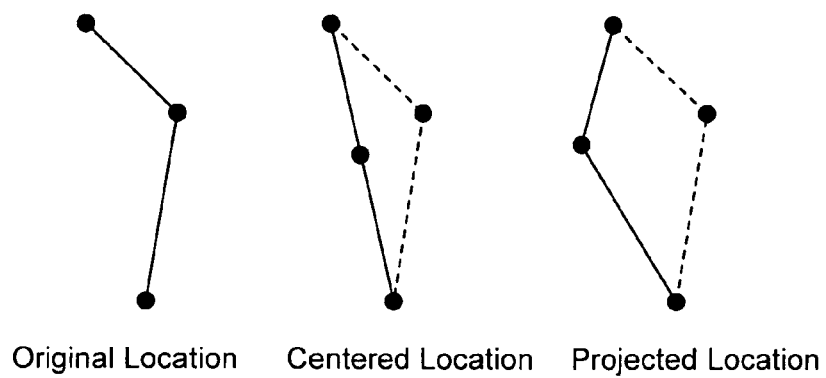
Original Location    Centered Location    Projected Location
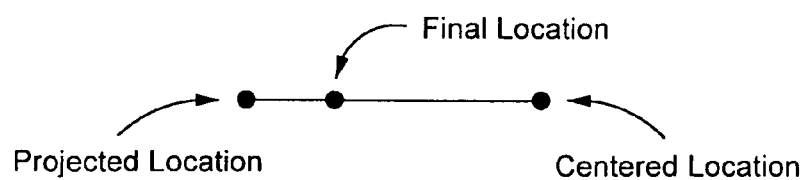
*Fig. 36*

EXTRACTION OF DEPOSITIONAL SYSTEMS

RELATED APPLICATION DATA

This application is a divisional of U.S. application Ser. No. 11/766,287 filed 21 Jun. 2007, which claims the benefit of and priority under 35 U.S.C. §119(e) to U.S. Patent Application Nos. 60/815,630, filed 21 Jun. 2006, entitled "Algorithm and Process to Create Geobody Bounding Surfaces," 60/815,625, filed 21 Jun. 2006, entitled "Computed Aided and Automatic Extraction of Depositional Systems," and 60/815,961, filed 21 Jun. 2006, entitled "Stratal-Slice Domain Transformation of a Seismic Volume," all of which are incorporated herein by reference in their entirety.

BACKGROUND

An exemplary embodiment of this invention is in the field of 3-D interpretation, and more particularly to 3-D seismic interpretation. More specifically, an exemplary embodiment includes a workflow, including two new processes, implemented as software that is designed to enable automatic or semi-automatic interpretation of paleo-depositional features in three-dimensional seismic data for exploration, development and, for example, production of hydrocarbons.

The need for computer-aided, semi-automatic and automatic interpretation of depositional systems derives from a combination of factors. Energy resources are becoming steadily more difficult to find and develop. It has been recognized for many years that the majority of new oil and gas reserves are a function of a complex combination of geological, structural and stratigraphic elements. While the problems of exploration and the efficient development of hydrocarbon reserves have become more difficult, the volume of data to be interpreted for each project has become orders of magnitude greater over the past 20 years. Simultaneously, both the number of interpreters and the time allowed for interpretation have been substantially reduced. This drives the need for more advanced computer-aided processes that can support the interpreter by enabling more efficient, precise and effective interpretation of 3-D seismic data volumes.

Computer-aided structural interpretation of 3-D seismic data volumes has been embodied in tools in interactive seismic interpretation for a number of years. Since the early 1980s, horizon autotracking tools have been available to help increase the speed and consistency of horizon interpretation in 3-D seismic surveys (Dorn, 1998). More recently, techniques have been developed to provide computer-aided interpretation of faults and automatic fault interpretation (e.g., Crawford and Medwedeff, 1999, U.S. Pat. No. 5,987,388; Pederson, S. I., 2002, U.S. Pat. No. 7,203,342), as well as techniques beyond event autotracking to automatically interpret horizons (Dorn, 1999, U.S. Pat. No. 5,894,417; Stark, 1997, U.S. Pat. No. 5,671,344).

Computer tools to aid in stratigraphic interpretation of seismic volumes have developed much more slowly. Elements of depositional systems can most readily be identified by an interpreter when the morphology of the paleo-depositional system can be viewed. Similarly, it is most likely that a computer algorithm can be written to recognize, image, and extract elements of depositional systems if the computer algorithm is able to operate on the data in a domain where the paleo-depositional system's morphology is most readily imaged. In both of these cases, the optimal environment is the stratal-slice domain, where the slices through the volume of seismic data are close approximations of paleo-depositional surfaces.

In an undeformed data volume, horizontal slices (planar slices parallel to the (x,y) plane in the volume) may accurately represent depositional surfaces. However, in volumes with structural deformation, horizontal slices do not represent depositional surfaces for more than a small portion of the total volume. Faulting, folding, and velocity anomalies prevent the complete representation of such a surface by a simple horizontal slice.

Horizon-slicing is defined as creating a slice through a 3-D seismic volume in the shape of an interpreted seismic reflection in that volume. Horizon slicing (as opposed to horizontal slicing) has provided better images of depositional systems since the mid-to-late 1980s.

A continuous interval is a package of sediments that represent the same span of geologic age, but were deposited at different sedimentation rates in different parts of the volume. The result is an interval that represents that same amount of geologic time, but does not exhibit the same thickness. In such an interval, growth is caused by spatially variable rates of sedimentation. If we assume that sedimentation rates between a pair of bounding horizons are variable only in space (i.e., not vertically variable in a given location), stratal slices may be extracted by interpolating trace values vertically, where the interpolated sample interval at each (x,y) location is controlled by the upper and lower bounding surfaces and the number of samples desired in the interval on the output trace. This type of stratal slice has been referred to as a proportional slice.

Proportional slicing or stratal slicing developed in the mid 1990s (Posamentier, et. al., 1996; Zeng, et. al. 1998a,b,c) provides even better imaging of depositional systems, and better discrimination between stacked channel systems in the seismic data because these surfaces are typically a better approximation of paleo-depositional surfaces than either horizon slices or horizontal slices.

Zeng, et. al. (1998 a, b, c) describes the first instance of extracting slices based on geologic age. They reasoned that seismic reflectors do not always follow depositional surfaces. Thus, they interpolated seismic slices between surfaces judged to be time-equivalent. They referred to these interpolated slices as 'stratal' slices. Stark (2004) describes a similarly motivated effort. He used unwrapped phase as a proxy for user-interpreted age horizons. Slices were extracted from the data volume by drawing data from points of equal unwrapped phase. Stark's approach assumes that unwrapped phase closely approximates geologic age, but this is an assumption that is often in error.

Both horizon slicing and proportional slicing generally suffer from substantial limitations in that they do not accommodate and compensate for generalized 3-D structural deformation subsequent to deposition, nor do they properly account for the wide variety of depositional environments. Horizon slicing is only appropriate for a conformable sequence of horizons in the seismic volume (i.e., a spatially uniform depositional environment over time). Proportional slicing is only appropriate for an interval that exhibits growth (i.e., a spatially gradational change in depositional thickness over an area, often due to spatially differential subsidence). Horizon and proportional slicing do not properly reconstruct paleo-depositional surfaces in other depositional environments, nor do they account for post-depositional structural changes (particularly faulting) or post-depositional erosion.

Among the situations that the proportional or stratal slice volume (as defined by Zeng, et. al, 1998 a,b,c) does not handle properly are:

Angular unconformities

Non-linear growth in the interval between two horizons

Carbonate platform intervals

Faulting

For example, both proportional slicing and stratal slicing (as defined by Zeng, et. al., 1998 a, b, c) produce volumes that have gaps or undefined zones where the volume is cut by a dipping fault surface. FIG. 1 shows, in a 2-D cross-section, the effects of dipping faults on this simple type of proportional slice for a pair of horizons. The output proportional slice volume is null or indeterminate at all (x,y) positions where one or both horizons is missing (e.g., Null Zone—1 Horizon in FIG. 1). The proportional slice volume is also indeterminate for (x,y) positions where both horizons are present but on opposite sides of a dipping fault surface (e.g., Null Zone—2 Horizons in FIG. 1).

The situation for more than one pair of horizons is shown in FIG. 2. In this case, there are null or indeterminate zones for each pair of horizons. These indeterminate zones are in different (x,y) positions for each pair of horizons.

In most previous attempts to solve this problem, where this simple form of proportional slicing is implemented, the indeterminate zones are filled with input seismic data rather than nulls, which can be quite misleading. Lomask et. al. (2006) have developed an approach that attempts to create a stratal volume without requiring interpreted horizons, faults or other surfaces to define and constrain the transformation. The lack of interpreted structural control in their approach produces poor results for seismic volumes that contain any significant structural deformation.

One exemplary embodiment of the Domain Transform method of this invention explicitly requires interpreted horizons, faults, and other geologic surfaces as input, and, as a result, does not suffer the limitations of the method proposed by Lomask.

Seismic-Wheeler Volumes (e.g., Stark, 2006) represent interpreted depositional systems tracts as well as hiatuses in deposition based on horizon interpretations of system boundaries in 3-D. This approach requires recognition of the system tract by the interpreter as a starting point, and does not take into account the effects of post-depositional structural deformation and faulting. The implementations of Seismic-Wheeler Volumes described by Stark (2006) also depend on association of each seismic sample in the volume with a relative geologic time (Stark, 2004; Stark 2005a, U.S. Pat. No. 6,850,845; Stark 2005b, U.S. Pat. No. 6,853,922). This constraint is not present in the process described here.

By transforming seismic data from the (x,y,time/depth) domain to the (x,y,stratal-slice) domain, data in a deformed volume can be interpreted in stratal-slice view. One exemplary goal is to reconstruct the data volume along stratal surfaces in an undeformed state using user-interpreted surfaces and user-supplied information on geologic relationships in the volume as a guide. Seismic data in this undeformed state is more easily and accurately interpreted for stratigraphy, depositional systems, and depositional environments.

Finally, a lightweight representation of volumetric data is often necessary for real-time rendering, for the segmentation of interpreted data, and for reducing visual clutter. A new Surface Wrapping technique has also been developed in accordance with an exemplary embodiment of this invention, and is described herein. For example, it allows, for example, the user to create a 3-D polygonal mesh that conforms to the exterior boundary of geobodies (such as stream channels) that offers significant improvements over existing techniques.

An inspiration for this Surface Wrapping approach was the Surface Draping algorithm (Dorn, 1999, U.S. Pat. No. 5,894, 417), which allows a polygonal mesh to be defined that reflects the geometry of an interpreted horizon. The surface draping algorithm is based on the metaphor of laying an elastic sheet over a contoured surface: gravity pulls the sheet down, causing it to conform to the surface beneath it, and the tension of the elastic material allows the sheet to smoothly cover small gaps in the surface while preserving the important features.

Dorn's Surface Draping allows the user to view seismic data and define a series of points slightly above the desired horizon. These points define the initial shape of the 3-D mesh, which corresponds to the elastic sheet described above. When the user has completed this stage, the actual mesh is computed, generally using one vertex per voxel. These vertices are then iteratively "dropped" onto the horizon. At each step, the value of the voxel at each vertex's position is compared to a range that corresponds to the values found in an interpreted horizon. If the value falls within that range, the vertex is fixed in place.

The Surface Draping concept would have benefits if adapted to work on geobodies and other 3-D volumes. Other approaches have been used to define a mesh that surrounds and conforms to the shape of a volume. Acosta et. al. (2006a and b; U.S. Pat. Nos. 7,006,085 and 7,098,908) propose a technique where the bounding surface is defined slice-by-slice by a user as a set of spline curves or general polylines that are then connected in 3-D. Kobbelt et. al. (1999) describes a technique based on successive subdivision of an initially simple mesh that completely surrounds the volume. The technique described by Koo et. al. (2005) improves on the same idea by allowing the user to define an arbitrarily shaped grid around a point cloud, allowing holes in the volume to be interpreted properly. Both of the above algorithms work by moving each vertex to the nearest point in the volume.

SUMMARY

It is an aspect of the present invention to provide a workflow and automated or semi-automated method and system for identifying and interpreting depositional environments, depositional systems and elements of depositional systems from 3-D seismic volumes.

It is a further aspect of this invention to provide such a method and system in which noise in the seismic volume after acquisition and seismic processing is removed or minimized at each step in the workflow.

It is a further aspect of this invention to provide a technique whereby the original 3-D seismic volume is transformed to a volume where every horizontal slice through the volume represents a paleo-depositional (stratal) surface, such that the effects of structural deformation are effectively removed from the volume.

It is a further aspect of this invention to provide a means of imaging, recognizing and obtaining the bounding surfaces of depositional systems or elements of depositional systems in the transformed seismic volume.

It is a further aspect of this invention to provide a technique whereby the imaging or attribute volumes created from the transformed seismic volume may be inverse-transformed to the coordinate space of the original seismic volume.

It is a further aspect of this invention to provide a technique whereby the bounding surfaces obtained for depositional systems or elements of depositional systems obtained in the transformed seismic volume may be inverse-transformed to the coordinate space of the original seismic volume.

In accordance with an exemplary embodiment of this invention, an approach including a unique new workflow that includes a combination of existing and new novel processes is presented for computer-aided interpretation of depositional systems in 3-D seismic volumes. In this discussion, channels are used as the example of a depositional system, but the approach will work for the full range of depositional systems and environments recorded in 3-D seismic data volumes.

This unique workflow includes the following general steps, illustrated in FIG. 3a:

Load (Input) 3-D Seismic Volume
Structural Interpretation
Domain Transformation
Optional Structural Refinement
Stratigraphic Interpretation
Inverse Domain Transformation
Output Stratigraphic Volumes and Bodies Individual steps and series of steps of this workflow may be applied recursively to the data volume to improve the results of the overall process.

Structural Interpretation refers to the interpretation of horizons and faults imaged in the 3-D seismic volume. The original seismic volume and its structural interpretation is typically described in an orthogonal cartesian coordinate system indicated by (x,y,z) or (x,y,t), where x and y represent horizontal distance, z represents vertical distance, and t typically represents vertical composite (also called two-way) reflection time. The proposed workflow can be applied to volumes that have been processed into either (x,y,z) or (x,y,t) volumes.

Domain Transformation refers to a novel process of changing the coordinate space of the seismic volume from (x,y,z or t) to (x,y,s) where s represents "stratal-slice." A stratal-slice is defined as a slice along an approximate paleo-depositional surface, that is, a surface upon which at some time in the past, geologic deposition (e.g., sedimentation or erosion) was occurring. The Domain Transformation creates a stratal-slice volume—a volume where every horizontal slice in the volume represents a stratal-slice or paleo depositional surface. This stratal-slice volume, created by the Domain Transformation process, is a volume that is substantially free of deformation. This Domain Transformation process is unique in that it removes the effects of deformation that has occurred both during and subsequent to the deposition, and will properly construct a stratal-slice volume for all types of geologic surfaces and intervals.

The Domain Transformation not only produces an ideal volume for the interpretation or extraction of elements of depositional systems, it also provides a valuable tool to highlight errors or omissions in the structural interpretation. Such errors or omissions are highlighted in the domain-transformed volume. Using the transformed volume to image problems in the structural interpretation, Optional Structural Refinement uniquely enables the interpreter to correct these errors and omissions in either the (x,y,s) volume or the (x,y,z or t) volume and improve both the structural interpretation and the results of the Domain Transformation.

Stratigraphic Interpretation, as used here, encompasses both the processing of the Domain Transformed volume to improve the imaging of elements of depositional systems (herein referred to as attribute calculation), and the process of extracting the bounding surfaces of those elements of depositional systems. The bounding surface extraction process (herein referred to as Surface Wrapping) is a unique process that provides numerous advantages over processes currently practiced by individuals with ordinary skill in the art to obtain the bounding surfaces of elements of depositional systems. Surface Wrapping's applicability extends to the extraction of the bounding surfaces of bodies or aspects imaged in any type of volumetric data from any discipline.

Inverse Domain Transformation refers to a process of changing the coordinate space of the seismic volume, any attribute volumes, the refined structural interpretation, and bounding surfaces from (x,y,s) to (x,y,z or t).

As mentioned, individual steps and series of steps may be applied recursively to the data volume to improve the results of the overall process. For example, initial Structural Interpretation of key horizons and major faults followed by Stratal-slice Domain Transformation of the Seismic Volume may highlight secondary horizons or smaller faults (additional structural interpretation) that must be interpreted and honored in the Domain Transformation process to achieve higher quality results.

Numerous exemplary benefits derive from the workflow and processes contained therein.

Domain Transformation creates a stratal-sliced volume for any seismic volume of any structural complexity. Structural effects can be removed from the volume.

An optimized view of stratigraphic features provides improved recognition and interpretation of depositional features.

Stratigraphic features that are obscured by structural deformation in the input seismic volume are clearly imaged, recognizable, and interpretable in the transformed volume.

A unique check and refinement of the structural interpretation is provided by the transformed volume (stratal-sliced volume), refinement of the structural interpretation (e.g., horizons and faults) in the stratal domain, and inverse Domain Transformation of the refined structural surfaces.

This unique workflow integrates the structural and stratigraphic interpretations of the data in an internally self-consistent manner, not possible previously, thereby improving the quality of the interpretation.

A novel Surface Wrapping technique provides a tool to obtain a connected, closed bounding surface for a 3-D object (geobody, stratigraphic feature, or any other arbitrary 3-D body) even where portions of the body are poorly imaged in the data volume.

This Surface Wrapping technique has wide application to the extraction of complex 3-D bodies from any form of volumetric data. Applications would also include, but are not limited to, obtaining the bounding surfaces of complex 3-D salt bodies and canyons in seismic data, and obtaining the bounding surfaces of tissue structures imaged in 3-D medical imaging volumes (e.g., CT, MRI, MRA, PET volumes, and the like).

Seismic attributes that are determined using the Domain Transformed volume show a significant improvement both qualitatively and quantitatively when compared to the same attributes calculated using the original input seismic volume. The workflow of first transforming the volume, determining the attribute, and then inverse transforming the attribute volume produces markedly improved results when compared to directly determining the attribute on the input seismic volume.

Attributes determined using the Domain Transformed volume improve the quality of the imaging of stratigraphy when compared to the same attributes determined using the input seismic volume:

Improves the imaging of depositional systems
Improves the correlation of attributes with well data for improved geophysical reservoir characterization.

Since stratigraphic features are better imaged, more complete and more easily interpreted in the transformed domain, the workflow improves the efficiency, accuracy, and completeness of the interpretation of depositional systems when compared to other approaches.

This Summary of the Invention is neither intended nor should it be construed as being representative of the full extent and scope of the present invention. While various embodiments of the present invention have been described in detail, it is apparent that modifications and alterations of those embodiments will occur to those skilled in the art. However, it is to be expressly understood that such modifications and alterations are within the scope and spirit of the present invention.

These and other features and advantages of this invention are described in, or are apparent from, the following detailed description of the exemplary embodiments.

BRIEF DESCRIPTION OF THE DRAWINGS

The exemplary embodiments of the invention will be described in detail, with reference to the following figures. It should be understood that the drawings are not necessarily shown to scale. In certain instances, details which are not necessary for an understanding of the invention or which render other details difficult to perceive may have been omitted. It should be understood, of course, that the invention is not necessarily limited to the particular embodiments illustrated herein.

FIG. 1 shows simple proportional slicing for two horizons and a dipping fault surface: (a) data prior to proportional slicing; (b) data after proportional slicing. The null zones are regions where data is not properly handled by the simple proportional slice algorithm.

FIG. 2 shows simple proportional slicing for three horizons and a dipping fault surface: (a) data prior to proportional slicing; (b) data after proportional slicing. Note that the null data zones shift laterally between pairs of horizons due to the dip of the fault surface.

FIG. 8 shows a schematic cross-section of four intervals (A-D), two of which have laterally varying thickness (C and D) in (x,y,z) space in (a), and in the transformed domain (x,y,s) in (b). The "tick" marks illustrate the repositioning of input samples from the input volume to the output volume.

FIG. 11 is a schematic cross-section through a simple carbonate reef. A section through the input (x,y,z) space in shown in (a) including a velocity "pull-up" of a horizon at the base of the reef. The domain transformed equivalent is shown in (b) with the horizon at the base of the reef flattened, and the top reef retained. The shaded area in (b) represents null points in the transformed volume.

FIG. 12 illustrates a schematic cross-section through a canyon. A section through the input (x,y,z) space is shown in (a). A section through the (x,y,s) domain transformed space is shown in (b). Note that the canyon fill B and the layers above it are younger than the country rock A, and the paleo-depositional surfaces through the canyon fill are different that those in the surrounding country rock. The shaded area in (b) represents null points in the transformed volume.

FIG. 13 shows proportional slicing honoring dipping faults in 2-D for two horizons: (a) data prior to proportional slicing; (b) data after proportional slicing. By projecting slices in toward their intersection with the fault surface, the null zones are reduced to a narrower dipping zone centered on the fault surface.

FIG. 16 shows a schematic drawing of a simple faulted interval: (a) shows the interval in the input (x,y,z) space; (b) shows the interval in the transformed domain (x,y,s). The triangular regions adjacent to the fault require special handling in the transform.

FIG. 17 shows a schematic 3-D drawing of a faulted geologic volume with three layers in (x,y,z) space in (a); and the domain transformed version of the volume in (b). The fault has displacement down the fault surface (dip-slip) as well as a small amount of horizontal (strike-slip) displacement. The components of displacement are shown in the inset to (a) where $\alpha$ is the vertical dip-slip, $\beta$ is the horizontal dip-slip, and $\gamma$ is the strike-slip component of displacement.

FIG. 18 shows a schematic drawing of a folded structure in a section in (x,y,z) space. The solid lines show the path for a vertical interpolation. The geologic interval may be better represented by an interpolation that is normal to the interval bounding surfaces, shown by the dashed lines.

FIG. 19 illustrates a schematic drawing of an angular unconformity (base of interval A) in (x,y,z) space in (a), and in the domain transformed volume in (b). The shaded area in (b) represents null space.

FIG. 20 illustrates a schematic drawing of a section through a salt body in (x,y,z) space in (a), and the corresponding section in the domain transformed space in (b). The shaded area in (b) represents null space.

FIG. 28 illustrates a comparison of vertical and horizontal slices extracted from seismic volumes before and after domain transformation: (a) a vertical section and interpreted horizons and faults from the input seismic volume; (b) the corresponding vertical section from the domain transformed volume; (c) a horizontal slice from the input seismic volume showing a small portion of a stream channel (arrow in the lower right corner); (d) a horizontal slice from the domain transformed volume showing the full extent of the stream channel.

FIG. 35 illustrates an exemplary method of determining the centralized vertex position in the Surface Wrapping algorithm.

FIG. 36 illustrates an exemplary method of determining the final vertex position based on the projected vertex position and centralized vertex position, using an elasticity factor of 0.8.

DETAILED DESCRIPTION

The exemplary embodiments of this invention will be described in relation to interpretation of data. However, it should be appreciated, that in general, the systems and methods of this invention will work equally well for any type of 3-D data (such as seismic data) from any environment.

The exemplary systems and methods of this invention will also be described in relation to seismic interpretation. However, to avoid unnecessarily obscuring the present invention, the following description omits well-known structures and devices that may be shown in block diagram form or otherwise summarized.

For purposes of explanation, numerous details are set forth in order to provide a thorough understanding of the present invention. However, it should be appreciated that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a telecommunications network and/or the Internet, or within a dedicated secure, unsecured and/or encrypted system. Thus, it should be appreciated that the components of the system can be combined into one or more devices or collocated on a particular node of a distributed network, such as a telecommunications network. As will be appreciated from the following description, and for reasons of computational efficiency, the components of the system can be arranged at any location within a distributed network without affecting the operation of the system.

Furthermore, it should be appreciated that various links can be used to connect the elements and can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique, including those performed by a system, such as an expert system or neural network.

Additionally, all references identified herein are incorporated herein by reference in their entirety.

Figure 3A:
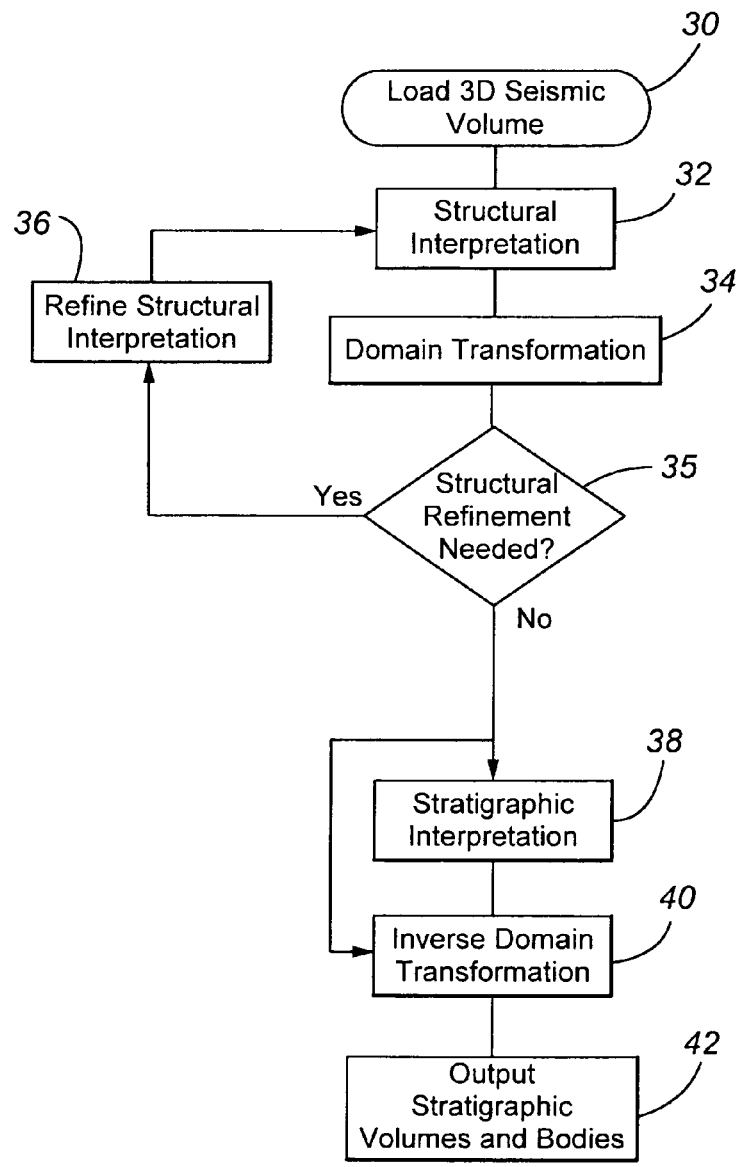
FIG. 3a is a flow diagram illustrating the exemplary general workflow and processes in performing automatic or semi-automatic interpretation of depositional systems in 3-D seismic data according to this invention.
Figure 3B:
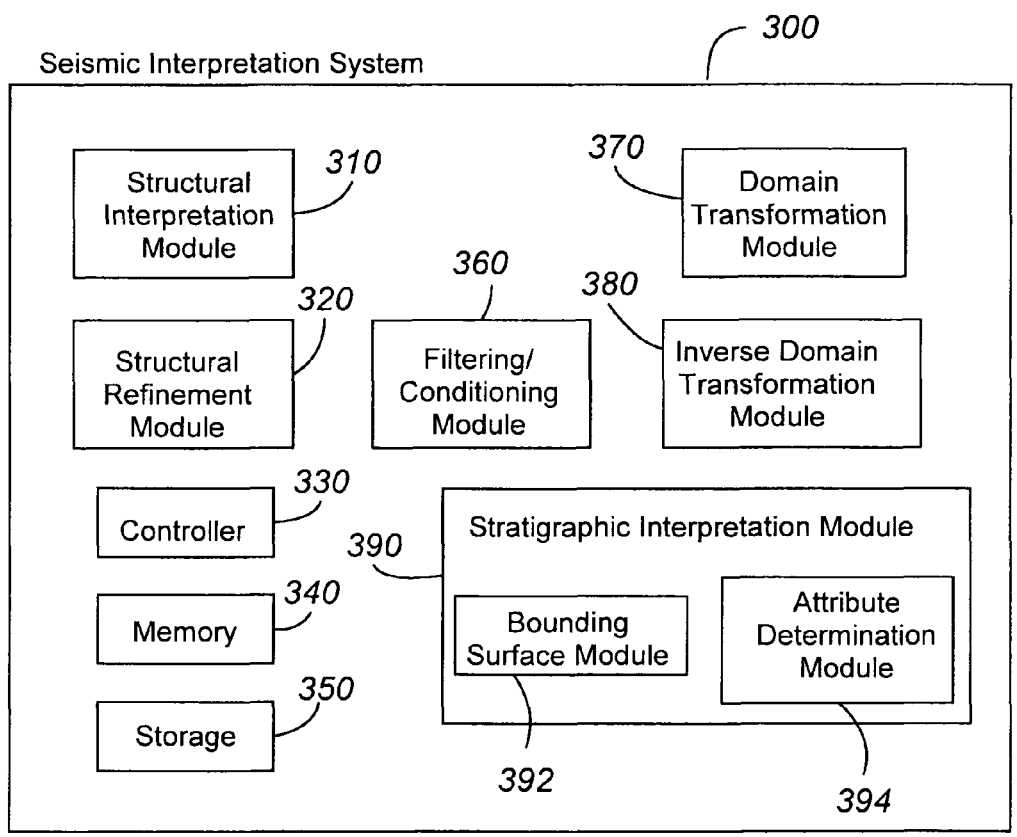
FIG. 3b illustrates an exemplary system capable of performing automatic or semi-automatic interpretation of depositional systems in 3-D seismic data according to this invention.

FIG. 3a shows an overall view of the CASI Workflow, the novel workflow proposed in this patent and FIG. 3b an architecture capable of performing the method. The seismic interpretation system 300 comprises a structural interpretation module 310, a structural refinement module 320, a controller 330, a memory 340, storage 350, a filtering/conditioning module 360, a domain transformation module 370, an inverse domain transformation module 380 and a stratigraphic interpretation module 390 which includes a bounding surface module 392 and an attribute determination module 394. The functions of the various components of the seismic interpretation system 300 will be discussed in relation to the following figures.

In this exemplary embodiment illustrated in FIG. 3a, a processed seismic data volume is loaded (30) into the computer for processing. This input seismic volume may have coordinate axes that are (x,y,z) or (x,y,t), where x, y, and z are spatial dimensions (e.g., with units of distance), where t is the measured one-way or two-way reflection time for the recorded seismic data, or where x, y, and z are simply indices incrementing or decrementing from initial values at the position defined as the origin of the volume.

Philosophically, the approach is based on presenting the data to an interpreter and the computer processes in a manner that optimizes the imaging of depositional systems. For example, an interpreter can best recognize the existence of elements of depositional systems by looking at slices through the data that closely approximate paleo-depositional surfaces. The depositional elements are recognized in these slices from their characteristic morphology or shape, and can be readily recognized even if their presence is difficult or impossible to interpret from vertical sections of seismic data.

Figures 4A, 4B:
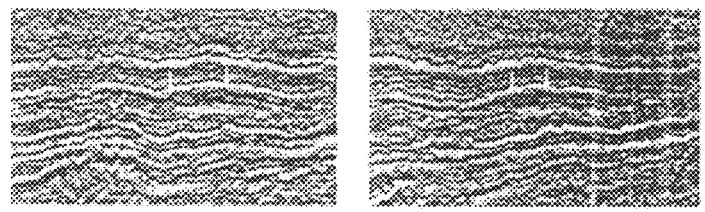
FIG. 4 shows cross-sections of the Balmoral 3-D survey cutting across a 1 km wide deepwater turbidite channel. The section in (a) cuts the channel at an angle of 45°. The section in (b) cuts the channel at an angle of 90°. The edges of the channel are indicated by the vertical yellow arrows.

For example, FIGS. 4a and 4b show two vertical cross-sections taken from the 3-D survey. The sections cut across a 1 km wide deepwater turbidite channel. The section in FIG. 4a is oriented at an angle of about 45 degrees to the direction of the channel. The section in FIG. 4b is oriented at an angle of about 90 degrees to the channel. Even experienced interpreters might miss this large channel on vertical sections.

Figure 5:
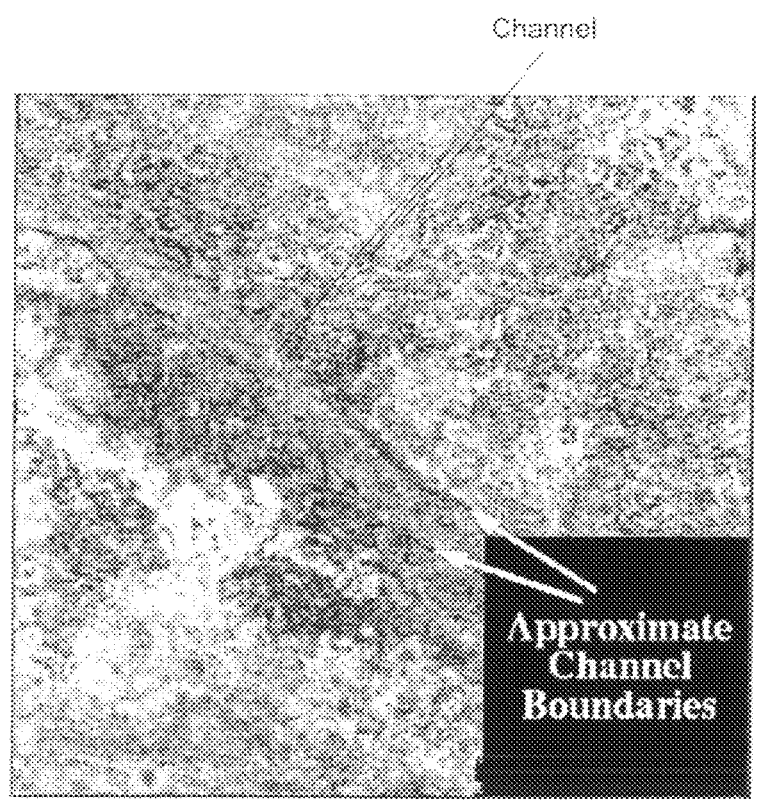
FIG. 5 is a horizon slice of seismic amplitude from the Balmoral 3-D survey. The 1 km wide deepwater turbidite channel cut by the channels in FIGS. 4a and 4b is readily visible in this slice.

FIG. 5 is a horizon slice of seismic reflection amplitude through the channel. The existence, location, and direction of the channel are obvious from the horizon slice (in this case it is close to a stratal-slice), and it is readily identified based on the morphology (shape) of the channel.

Structural Interpretation

Figure 6:
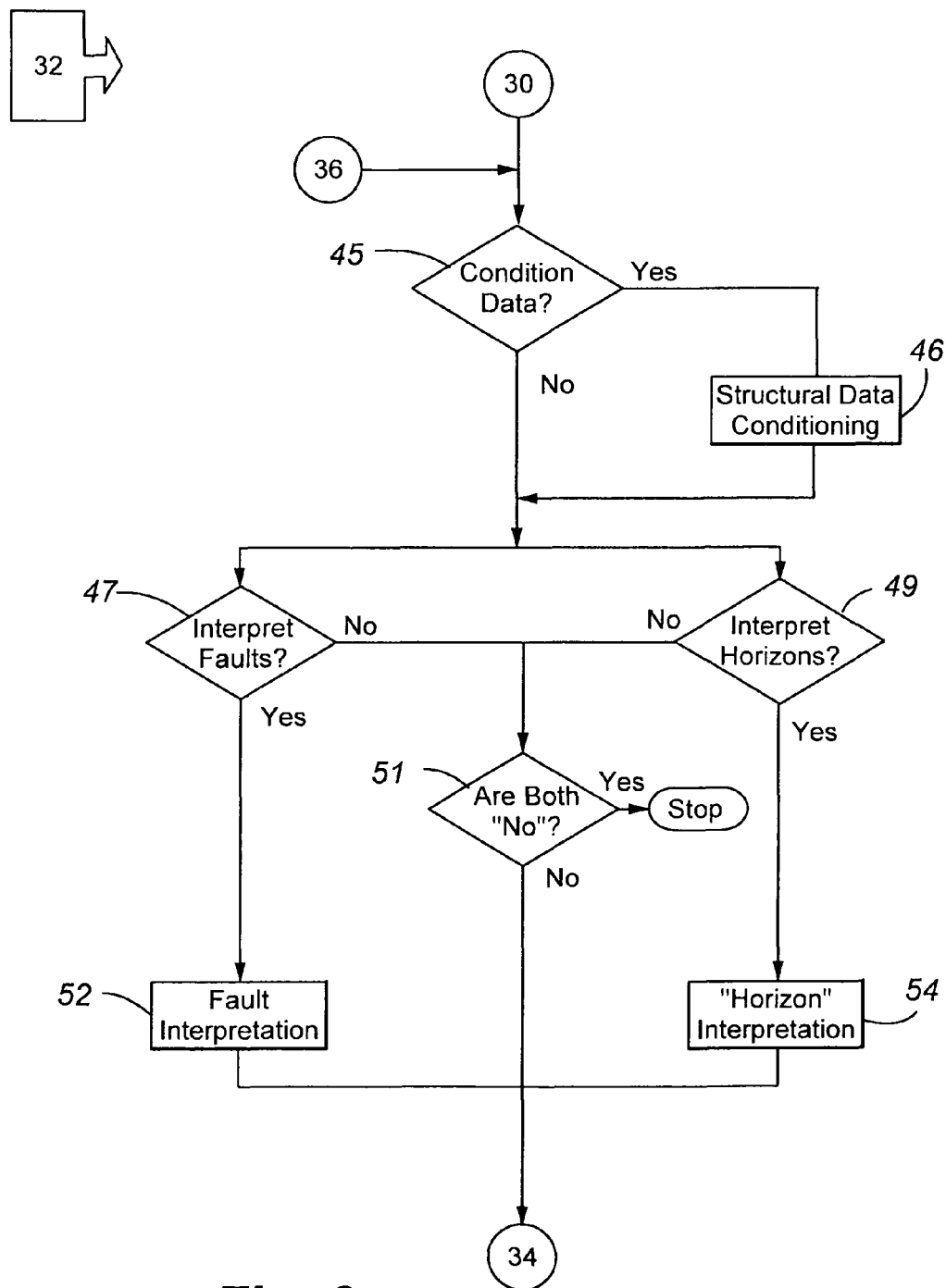
FIG. 6 is a flow diagram illustrating the process of structural interpretation of 3-D seismic data in accordance with an exemplary embodiment of the invention.

FIG. 6 depicts a typical structural interpretation workflow (32). The input seismic volume from 30 is examined by the interpreter to determine if any additional data conditioning is required to achieve a reliable structural interpretation (decision 45). If decision 45 is "Yes", then the input data volume may be filtered to remove or minimize a variety of types of noise which may improve the structural interpretation (process 46, Structural Data Conditioning). This may include processes to remove random noise, coherent noise, or any artifacts from the volume that were introduced into or resulted from the seismic acquisition, and any processing steps preceding interpretation.

Examples of such processes would include, but are not limited to, noise filtering of the data along the z or t axis (1-D filtering), spatial filtering along the (x,y) planes (2-D filtering), 3-D filter operators, and any combinations of these processes. Temporal (z or t axis 1-D filtering) includes, but is not limited to, high, low and band pass filtering, spectral shaping filters, and other trace filters commonly known to individuals schooled in the art of seismic processing and interpretation. Spatial (2-D) filters include, but are not limited to, mean and median filters, spatial wavelet filtering (e.g., using a Daubechies wavelet filter), and edge preserving filtering (Al-Dossary, et. al., 2002; Jervis, 2006), and non-linear diffusion filtering (Imhof, 2003). 2-D spatial filters may operate on the volume along horizontal slices, or may be guided by local estimates of structural dip in the volume. In certain instances, the 2-D spatial filter operators may be extended into 3-D operators, depending on the type of data volume being filtered.

The above filters are all designed to reduce the level of random noise in the seismic volume. Coherent noise in the volume (e.g., "acquisition footprint"—remnant features associated with the geometry used to acquire and process the seismic data) may also need to be reduced by using a variety of coherent noise filtering techniques commonly know in the industry.

Once the input seismic volume (30) has been conditioned (46), or if no conditioning was necessary (i.e., the answer to decision 45 was "No"), then the interpreter proceeds to the interpretation of horizons and faults in the volume of data. The interpretation of horizons and faults may be conducted manually, accomplished using automatic processes, or by any combination of manual and automatic techniques. The interpretation of horizons and faults may be conducted by interpreting horizons first, faults first, or by intermingling the interpretation of horizons and faults. Thus, the process of interpreting horizons and faults are shown in parallel in FIG. 6.

Decision 47 represents the decision by the interpreter to interpret faults ("Yes") or not interpret faults ("No"). Decision 49 represents the decision by the interpreter to interpret horizons ("Yes") or not interpret horizons ("No"). If both decisions 47 and 49 are "No", then decision 51 is "Yes" and the entire process and workflow is stopped. The workflow described here requires that either faults, or horizons, or both faults and horizons, be interpreted in the input seismic volume (30) or in the conditioned seismic volume (46), or some combination of the two volumes.

Figure 7:
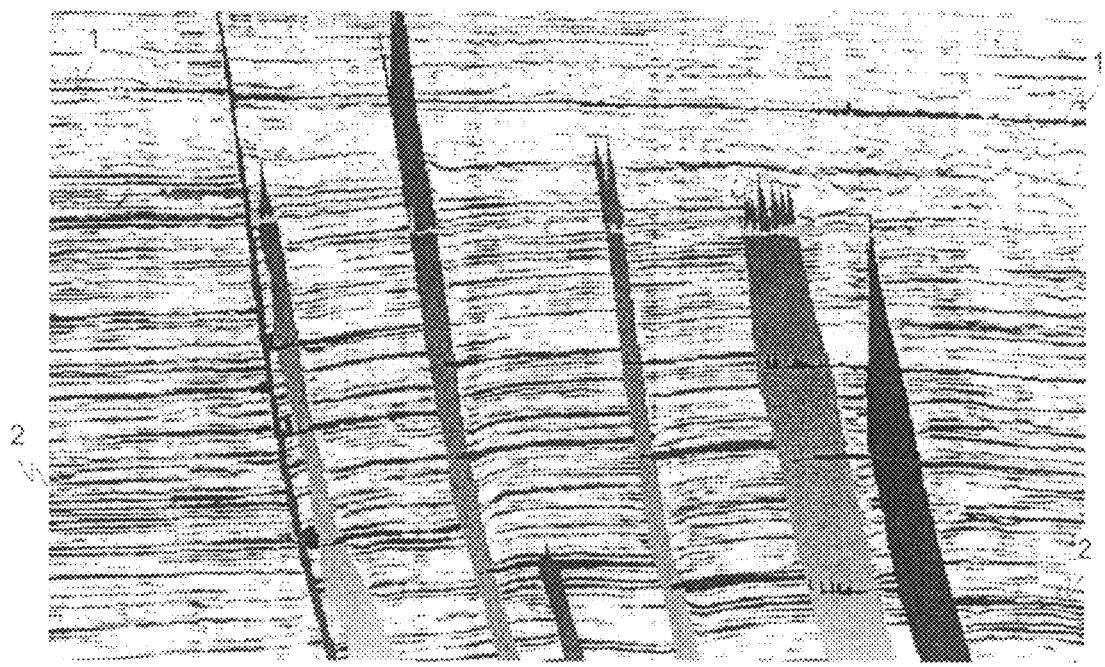
FIG. 7 shows a vertical section extracted from a 3-D seismic volume showing two interpreted horizons (labeled 1 and 2), and seven steeply dipping fault surfaces.

If decision 47 is "Yes", then faults are interpreted from the seismic volumes (30 and/or 46) using any fault interpretation technique of the interpreter's choosing—either manual, automatic, or a combination of manual and automatic. If decision 49 is "Yes", then horizons are interpreted from the seismic volumes (30 and/or 46) using any horizon interpretation technique of the interpreter's choosing—either manual, automatic, or a combination of manual and automatic. FIG. 7 shows a typical vertical seismic section extracted from a 3-D seismic survey with two interpreted horizons (labeled 1 and 2 in FIG. 7) and seven steeply dipping interpreted fault surfaces.

Once the interpreter has completed the interpretation of the horizons and faults of interest in process 32 shown in FIGS. 3a and 6, then the seismic volume, and the interpreted structure (horizons and faults) are then passed into the Domain Transformation (process 34, FIG. 3a).

Domain Transformation

Domain Transformation is a trace-by-trace approach to undoing the deforming effects of syn-depositional and post-depositional geologic processes. Syn-depositional processes take place at the same time, or as a result of, sediment deposition. Some examples of deformation resulting from these processes are differential deposition and differential compaction. The term "differential" implies variation in the horizontal direction. Post-depositional processes deform the rocks present after deposition of sediments has finished. Examples of these processes are faulting and folding of sediment layers, or the rock layers that eventually are formed by the aforementioned sediments.

All types of geologic intervals and surfaces can be accommodated including, but not limited to:

Continuous conformable intervals

Continuous intervals that exhibit growth

Intervals with reefs or carbonate platforms
Unconformities (including angular unconformities) and disconformities
Intervals with differential compaction The process may also account for post-depositional structural geologic deformation including, but not limited to:
3-D fault surfaces and displacement
Folding
Salt tectonics The domain-transformation algorithm requires several types of data to be input. These include the seismic data volume, interpreted horizons and faults, and user input regarding horizon types and interval types. All transform changes to be performed are stored for each trace segment in the volume. These stored parameters consist of the starting time and sampling rate in the original volume, as well as the storage location in the stratal-volume and the number of sample to be interpolated during the forward transform process (62).

The data volume is broken into several pieces for the purpose of Domain Transformation. There are two subdivisions used. The first is that each pair of user-supplied horizons defines an Interval. Each Interval may then contain one or more trace segments per trace location (an inline and crossline intersection). The trace segments are bounded by a user-supplied horizon and either a fault or another horizon (if no fault is present in that interval), or by two faults.

The Domain Transformation is performed interval-by-interval through the volume. The calculation could proceed through the interpreted intervals in any order. In its preferred implementation, the calculations proceed from the shallowest interval to the deepest interval. Within each interval, the Domain Transformation interpolates the input seismic data following a set of geometric rules. The geometric rules are a function of the type of geologic interval on which the Domain Transformation is operating.

Example Intervals and Geometric Rules

The set of intervals included below is intended as a set of examples and is not inclusive of all the possible intervals that can be handled using the Domain Transformation approach. This subset is chosen for illustrative purposes. All types of geologic intervals can be handled using the approach presented for Domain Transformation.

Proportional Intervals:

Proportional intervals include conformable intervals and growth intervals, with or without post-depositional folding and differential compaction. For continuous unfaulted proportional intervals, such as in FIG. 8, three steps are performed. First, a global search is performed for all trace segments contained between the two bounding horizons. This search is meant to locate the thickest portion of the interval ($Z_M$). The number of samples in this interval (N) at its maximum thickness is calculated by dividing this maximum time thickness by the sample rate (S) of the input data volume.

$$N=Z_M/S$$

In the case of FIG. 8, the maximum thickness for interval C is at the right edge, and the maximum thickness for interval B is at the left edge.

For relatively shallow dips, and vertical re-sampling of the volume, the desired sample rate for every other trace in the interval is equal to the local thickness ($Z_L$) divided by the maximum number of samples (N).

$$S_L=Z_L/N$$

This resampling of the input seismic volume may be accomplished by interpolation between the existing samples. The simple equations for determining the local desired sample rate $S_L$ guarantee that if a volume is forward transformed and then inverse transformed, none of the frequency content of the original volume will have been lost (i.e., the output sample rate is everywhere at least as frequent as the input sample rate, thereby preserving the frequency content, and avoiding aliasing problems).

This resampling will result in thinner sections of the interval having a higher sample rate in the input (x,y,z) domain than in the thicker sections. The "tick" marks on the right and left side of FIG. 8*a* show schematically the relationship between thickness of the input interval and the desired relative locations in z and the sample rate to produce the output volume with stratal slices shown in FIG. 8*b*. Note that the intervals in FIG. 8*b* are constant in thickness, and that all samples are evenly spaced vertically in the output stratal slice domain.

All other intervals involve a generalization of this process described here for the proportional intervals.

Figure 9:
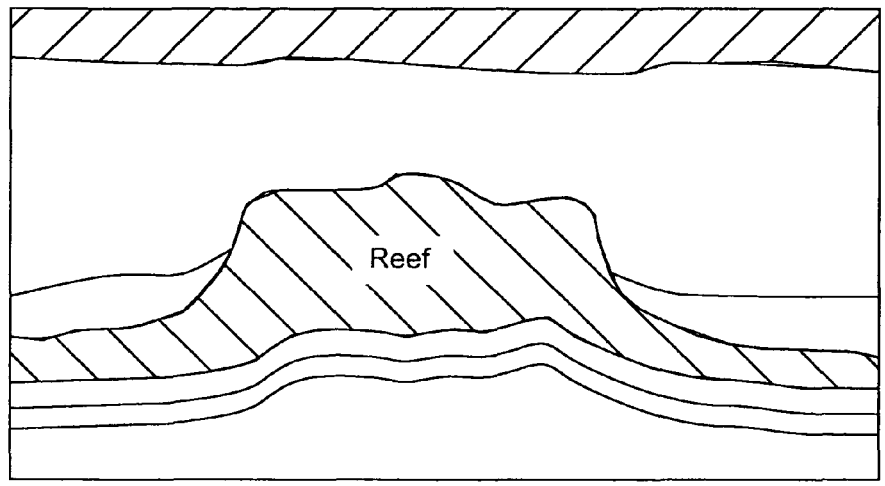
FIG. 9 shows the effects of the reefs presence as: (1) 'pull-up' of underlying horizons, and (2) truncation of horizontally adjacent horizons (not illustrated).

Carbonate Platform Interval:

Carbonate reefs and the intervals that are immediately overly them require special handling. Intervals that contain carbonate reefs represent a two-fold problem. The first problem is that they represent a velocity anomaly that results in a velocity 'pull-up' of the underlying strata. The second problem is that they interrupt the horizontal continuity of adjacent intervals (FIG. 9). The transform algorithm must correct both of these issues.

The first problem of a velocity pull-up is corrected by handling the strata immediately below the reef as if they were continuous flat surfaces. The second problem is corrected by assuming that the top reef structure should remain constant in the transformation (i.e., the shape of the top reef structure should be the same in the output stratal sliced volume as it is in the original input volume). The net result of these two corrections (shown in FIG. 10) is that the base of the carbonate platform is flattened, eliminating velocity pull-ups, and the top structure is unchanged. The truncations of the clastic sedimentary layers against the top of the reef are maintained, and the reflections in the clastic section around the top reef structure are flattened.

The manner of data extraction is demonstrated in FIG. 11*a*. The overlying interval has trace segments extracted from the top down. The actual reef has trace segments extracted from the base upward. For both intervals, the maximum number of samples is calculated from the global maximum thickness (interval A+B). The maximum number of samples for the overlying interval A is equal to the maximum thickness of A divided by the sample rate of the input volume. The maximum number of samples for the reef interval B is calculated in a similar manner, with the additional step of multiplying the initial number of samples by a velocity-contrast correction factor. This velocity-contrast correction factor is the ratio of the seismic velocity of the carbonate reef divided by the seismic velocity of the overlying sediment. If this ratio is unknown, an assumed contrast (or no contrast at all) may be used. The local number of samples for each trace segment (above or below the top reef surface) is then calculated by multiplying that interval's maximum number of samples by the ratio of the local time thickness divided by the maximum time thickness of the interval. The resulting output section is shown FIG. 11*b*. The shaded region represents a combination of the null regions output by both intervals, and is included in the Domain Transform output volume because the clastic sediments in interval A are geologically younger than the reef structure, interval B.

Figure 10:
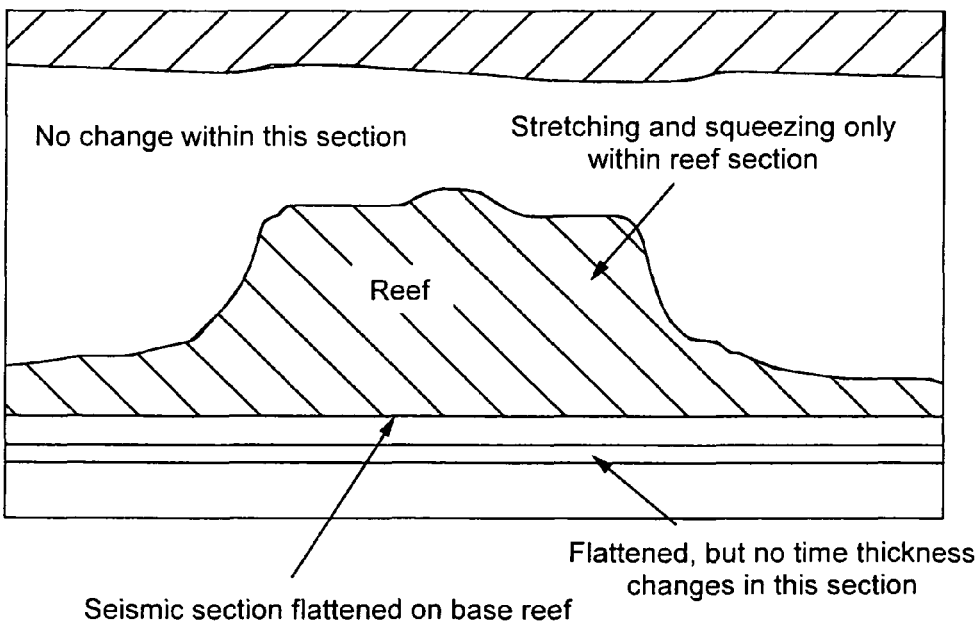
FIG. 10 shows that the velocity pull-up associated with the reef has been corrected.

The result of reef correction is that continuous stratal slices can be output even when they are 'cut' by a reef Data within the reef are stretched vertically in order to correct for the anomalous velocities within the reef (FIGS. 10 and 11b). This technique also works for other types of velocity anomalies (such as a gas zone).

Canyon Intervals:

Like carbonate reefs, intervals that include canyons require special handling. Although there typically is no velocity anomaly associated with the canyon, the sediment fill in the canyon is significantly younger, and belongs to different stratal slices than the "country rock" around the canyon.

FIG. 12a shows a schematic cross-section through a canyon in a seismic data volume. FIG. 12b shows the same section through a Domain Transformed volume of the canyon. The stratal slices in the country rock (A) around the canyon and below the top of the canyon are handled independently of the stratal slices in the fill rock (B) in the canyon and above the top of the canyon. Because erosion had to occur to create the canyon, followed by later deposition of (B) the stratal slices are also separated by null data values in the domain transformed volume.

The manner of data extraction begins by retaining the shape of the canyon unchanged in the transform. The overlying interval (B) has trace segments extracted from the top down, including the canyon fill. The country rock through which the canyon was cut by erosion (A) has trace segments extracted from bottom up. For both intervals, the maximum number of samples is calculated from the global maximum thickness (interval A+B). The maximum number of samples for the overlying interval A is equal to the maximum thickness of A divided by the sample rate of the input volume. The maximum number of samples for the canyon fill B is calculated in a similar manner. The local number of samples for each trace segment (above or below the top reef surface) is calculated by multiplying that interval's maximum number of samples by the ratio of the local time thickness divided by the maximum time thickness of the interval. The resulting output section is shown FIG. 12b. The shaded region represents a combination of the null regions output by both intervals, and is included in the Domain Transform output volume because the clastic sediments in interval A are geologically older than the sediments in interval B. The result of canyon correction is that continuous stratal slices can be output even when they are 'cut' by a canyon.

Figure 14:
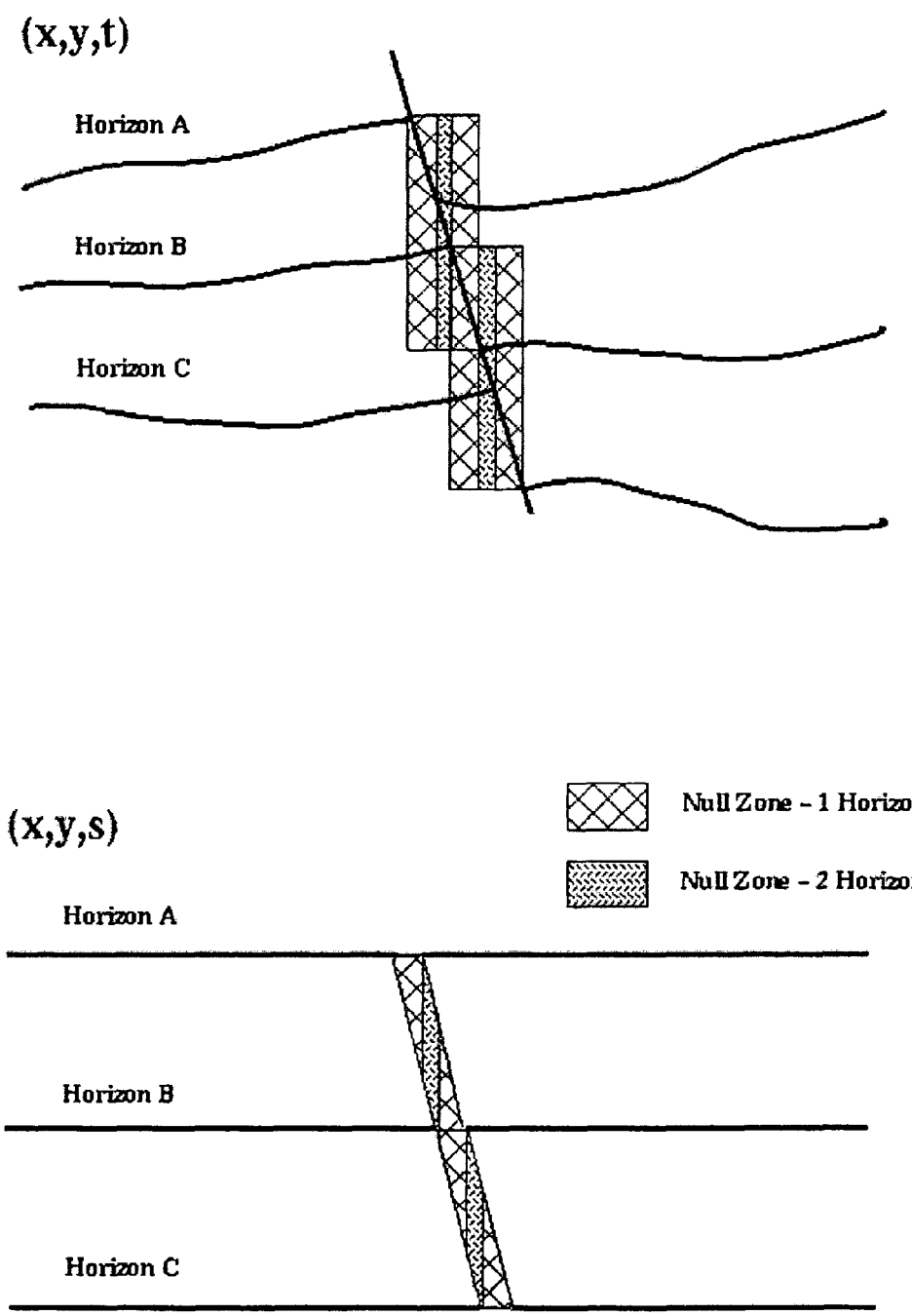
FIG. 14 shows proportional slicing honoring dipping fault in 2-D for three horizons: (a) prior to proportional slicing; (b) data after proportional slicing. The narrow null data zone is continuous between intervals and is centered on the dipping fault surface.

Faulted Intervals:

A faulted interval can be treated as a continuous interval where both the upper and lower bounding surfaces are present. However, difficulties arise in the vicinity of the fault where only one bounding surface is defined on either side of the fault (FIGS. 1 and 2). In these fault zones, it becomes necessary to project the missing horizon inward to fill the fault zone with data points (FIGS. 13 and 14).

Figure 15:
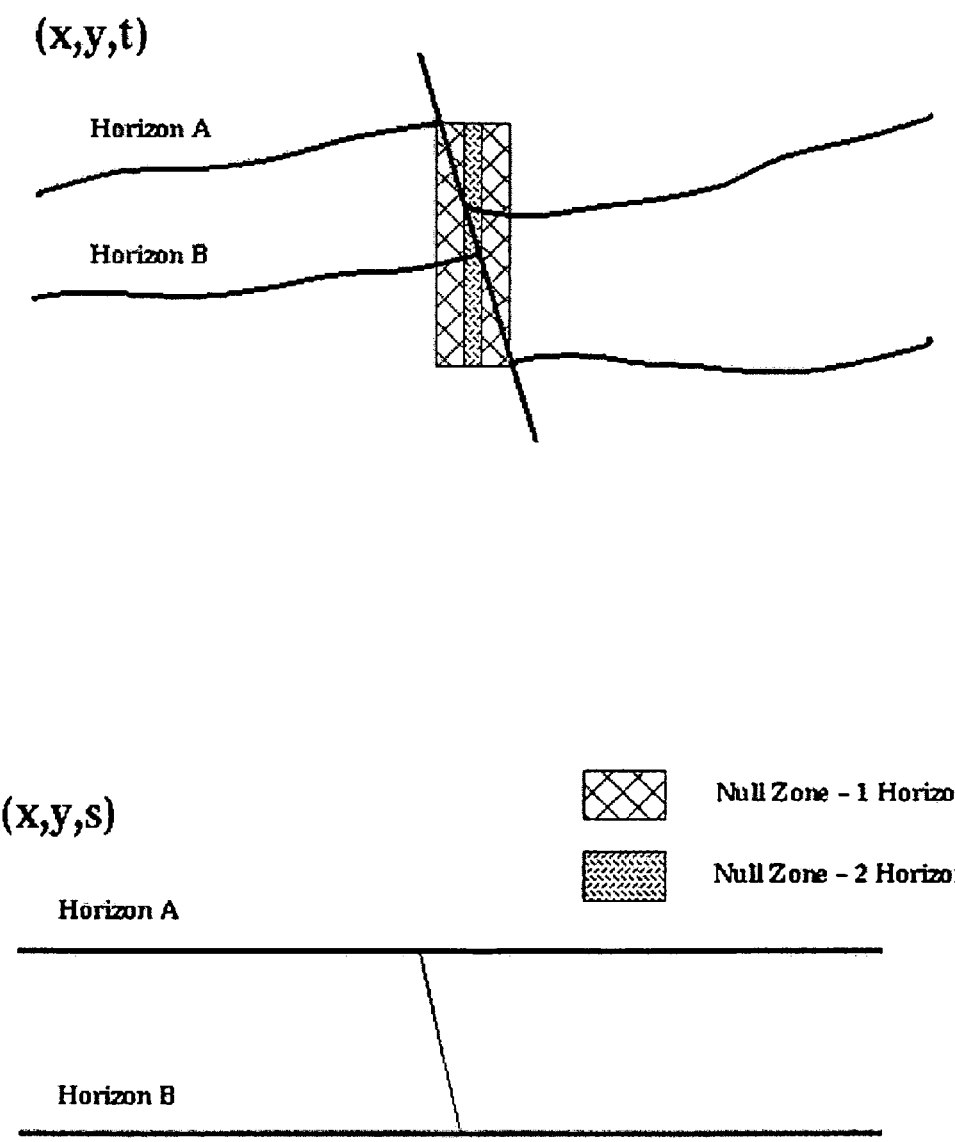
FIG. 15 shows proportional slices honoring dipping faults in 3-D for two horizons: (a) data prior to proportional slicing; (b) data after proportional slicing. A final step, a horizontal shift, is added in (b) to account for the horizontal displacement along the fault surface.

Conceptually, projection of the missing horizon is achieved by assuming that the time thickness in the fault zone is equal to the time thickness derived from the closest fully bound trace. This procedure takes place in two steps. First, an increasing radius search is performed in the (x,y) plane until the nearest trace is located that is bound by both horizons. Next, the time thickness is then calculated for this full trace, and assumed to be the same for the fault zone trace. This results in a projection where the missing horizon is assumed to be equidistant from the existing horizon in the fault zone. Honoring the horizontal component of dip-slip requires that data traces be shifted laterally in the (x,y) plane (FIG. 15).

The manner of data extraction is illustrated in FIG. 16 for a normal-offset fault. Other types of faults (e.g., reverse-offset faults, thrust faults, and growth faults) may be processed in a similar fashion. Outside of the fault zone, all trace segments may be handled as normal proportional interval trace segments. However, in the fault zone, it is not possible to calculate the local time thickness in a normal manner as one horizon is missing (or exists on the other side of the fault). In these cases, the local vertical thickness is estimated by finding the closest fully-bounded trace segment on the same side of the fault (solid vertical lines between horizons A and B in FIG. 16a). The vertical thicknesses of the proximal complete trace segments ($Z_L$ and $Z_R$) are then used as estimates of the local vertical thicknesses that would be present in the zones α and β were the fault not present. A number of samples which is less than the maximum number of samples for the interval is then output for the local trace segment for traces in the triangular shaped regions (α and β) in FIG. 16a. The local number of samples ($N_L$) is calculated by multiplying the maximum number of samples (N) by the ratio of the thickness from the horizon to the fault ($Z_\alpha$ and $Z_\beta$), divided by the local estimated vertical thickness.

$$N_L = N \times (Z_\alpha / Z_L) \text{ and } N_R = N \times (Z_\beta / Z_L)$$

These samples are interpolated from the top down for the hanging wall of the fault, and from the bottom up for the foot wall. The output interval in FIG. 16b has the same total thickness throughout. The vertical dashed lines in FIG. 16b indicate the section of the interval that received special fault handling.

The estimation of the local vertical thickness that would be present in the zones α and β were the fault not present described above assumes a constant thickness of the interval AB in the region of the fault. A refinement of this approach is to determine both the vertical thickness of the proximal complete trace segment, and the gradient (rate of change or first derivative) of this thickness as the interval approaches the fault. Then, instead of projecting a constant thickness from the proximal trace toward the fault, the estimated thickness in zones α and β would be calculated from the thickness of the proximal trace segment plus a constant gradient of that thickness.

Real faulting is commonly more complex than 2-D diagrams would imply. FIG. 17 is a 3-D diagram of a channel being cut by a fault. The fault exhibits both dip-slip (motion perpendicular to the long axis of the fault) and strike-slip (motion parallel to the long axis of the fault). Full closure of the fault requires handling both types of motion on the fault.

The algorithm described for faults above, compensates for the dip-slip component of fault motion. The strike-slip component of motion is handled by a horizontal adjustment of the voxels in the transformed volume on one side of the fault relative to the other. The amount of the adjustment may be calculated based on a number of criteria. In its simplest form, the strike slip adjustment, if required, is the lateral displacement along the fault required to minimize the difference in amplitude across the fault on any given output stratal slice. This type of operation is demonstrated in FIG. 17b. After transformation, the channel is continuous and unbroken.

Interpolation for Steeply Dipping Intervals

The interpolation that has been described above (interpolation of traces vertically) works well for all cases except those that involve steeply dipping intervals. In steeply dipping intervals, extracting data vertically from the input volume is not a sufficient approximation of the geology present in the volume. Correct handling of steeply dipping intervals requires the use of non-vertical data traces, as can be seen in FIG. 18. This figure represents a folded interval that contains a flat top and dipping flanks. The solid lines indicate vertical traces. The dashed lines indicate traces that are correctly oriented perpendicularly to the interval's bounding horizons. The difference between the two methods of data extraction becomes greater as dip increases on the flanks of the structure. Thus, these types of intervals require interpolation through the volume along paths that are non-vertical.

The path through the volume for any point in the interval A in FIG. 18 may be determined by several methods. Surface normals may be calculated for either the upper or lower bounding surfaces of interval A. If normals are calculated for the upper surface, then these normals would be projected down to their intersection with the lower surface at every point. If normals are calculated for the lower surface, then these normals would be projected up to their intersection with the upper surface at every point. A third, and perhaps better alternative, is to create a surface that is mid-way between the upper and lower interval bounding surfaces, calculate the surface normals to that intermediate surface, and extend those normals in each direction to the upper and lower bounding surfaces at every point.

Whichever method is used to calculate and project the surface normals, the projected normals define the path of interpolation in 3-D in the interval.

Unconformities:

FIG. 19 demonstrates the modified handling of an interval containing an unconformity. The unconformity is the horizon at the base of interval A in the cross-section. The use of non-vertical traces (perpendicular to the bounding horizons) is shown in the pre-transform section on the left side of the figure by the dashed line. Intervals overlying an unconformity (e.g., Interval A) are treated in the normal proportional manner. Beneath the unconformity, intervals (e.g., B-E) are also handled in the normal proportional manner away from the unconformity surface where both bounding horizons for each interval are present.

In the presence of the unconformity, the unconformity interval is handled in a manner similar to the foot wall of a fault. A search is performed to find the closest complete trace segment (both vertical and bed normal thickness are indicated in FIG. 19*a*). This trace segment is then used to calculate the approximate local thickness. As with fault handling, the local number of output samples is calculated by multiplying the maximum number of samples by the ratio of the thickness from the horizon to the fault divided by the local approximate thickness. In the output section (shown on the right side of the figure), this results in the tapered configuration of the output interval. The shaded areas represent null regions, which are not represented in the input volume.

Salt Boundaries:

Many seismic volumes contain complex 3-D salt bodies. Intervals that are partially bounded by salt are handled in a manner similar to faults and to reef top boundaries. As with faults, trace segments that are fully bounded by non-salt horizons are handled in the normal proportional manner. Where a trace segment is bounded by the salt boundary and a non-salt horizon, a search must be made for the closest full non-salt bounded trace segment. As with fault handling, the thickness from this proximal fully-bounded trace segment is used to determine the number of samples to be output in the local trace segment. This number of samples is equal to the maximum number of samples multiplied by the ratio of the thickness between the salt and non-salt horizons divided by the thickness of the fully-bounded trace segment. The resulting output of this interval is demonstrated in FIG. 20. The shape of the salt horizon is preserved, while removing complexities and growth that exist due to the non-salt horizons.

Domain Transformation Specification and Determination

Figure 21:
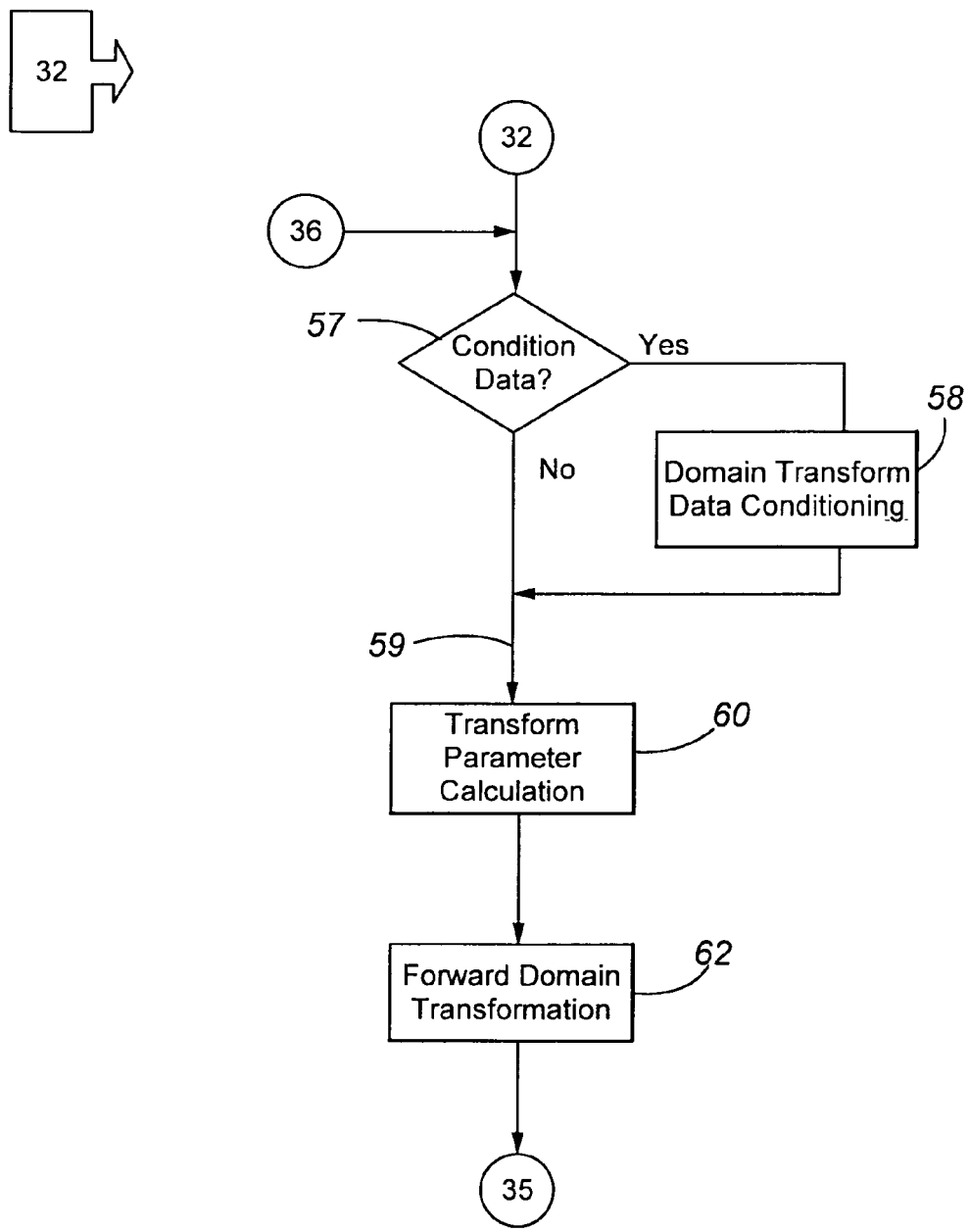
FIG. 21 illustrates a flow diagram illustrating a high level view of the exemplary process of domain transformation of the seismic volume from the (x,y,z or t) domain to the (x,y,s) domain.
Figure 22:
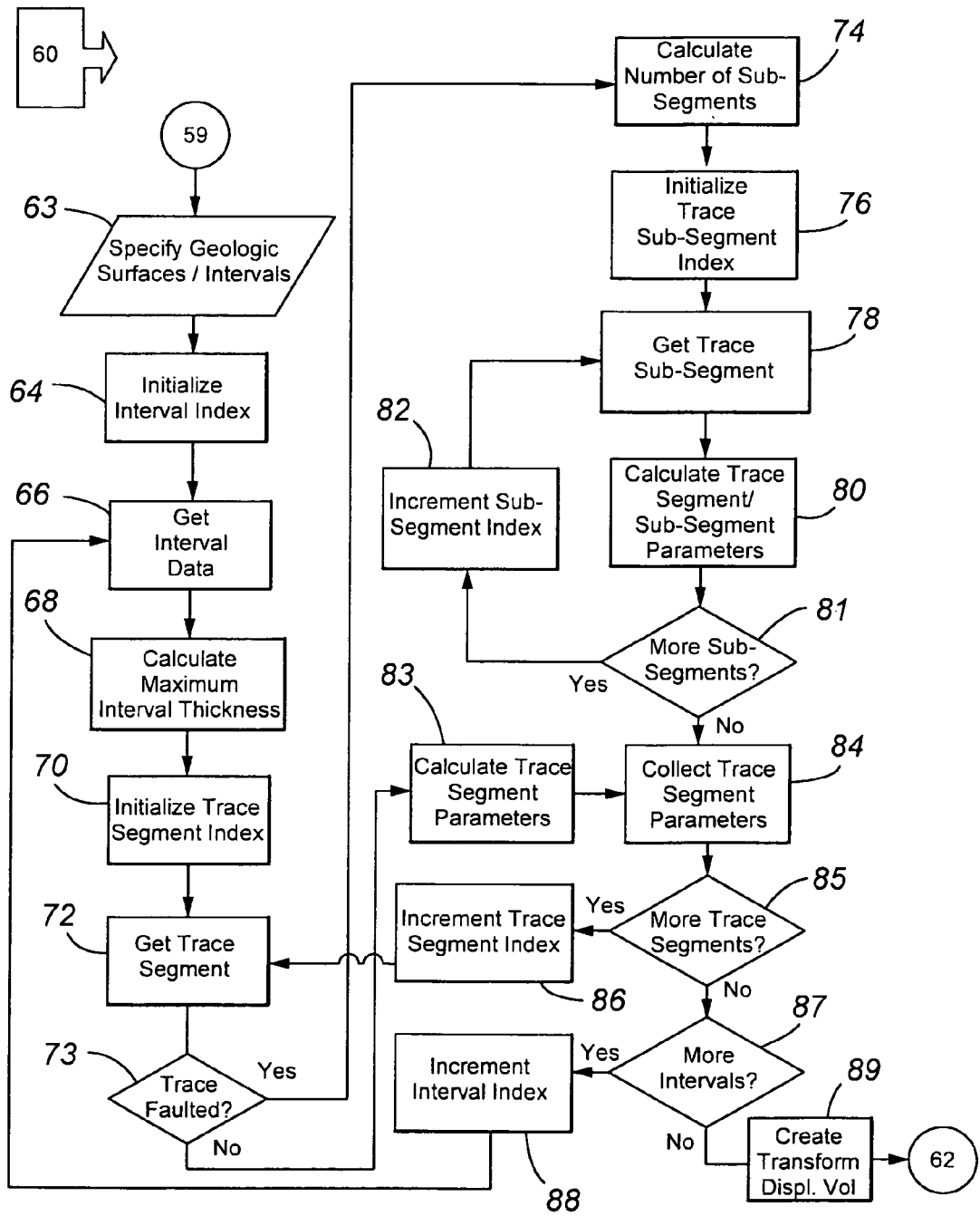
FIG. 22 illustrates a flow diagram illustrating the exemplary process of transform parameter calculation, a part of the domain transformation of seismic volumes.
Figure 23:
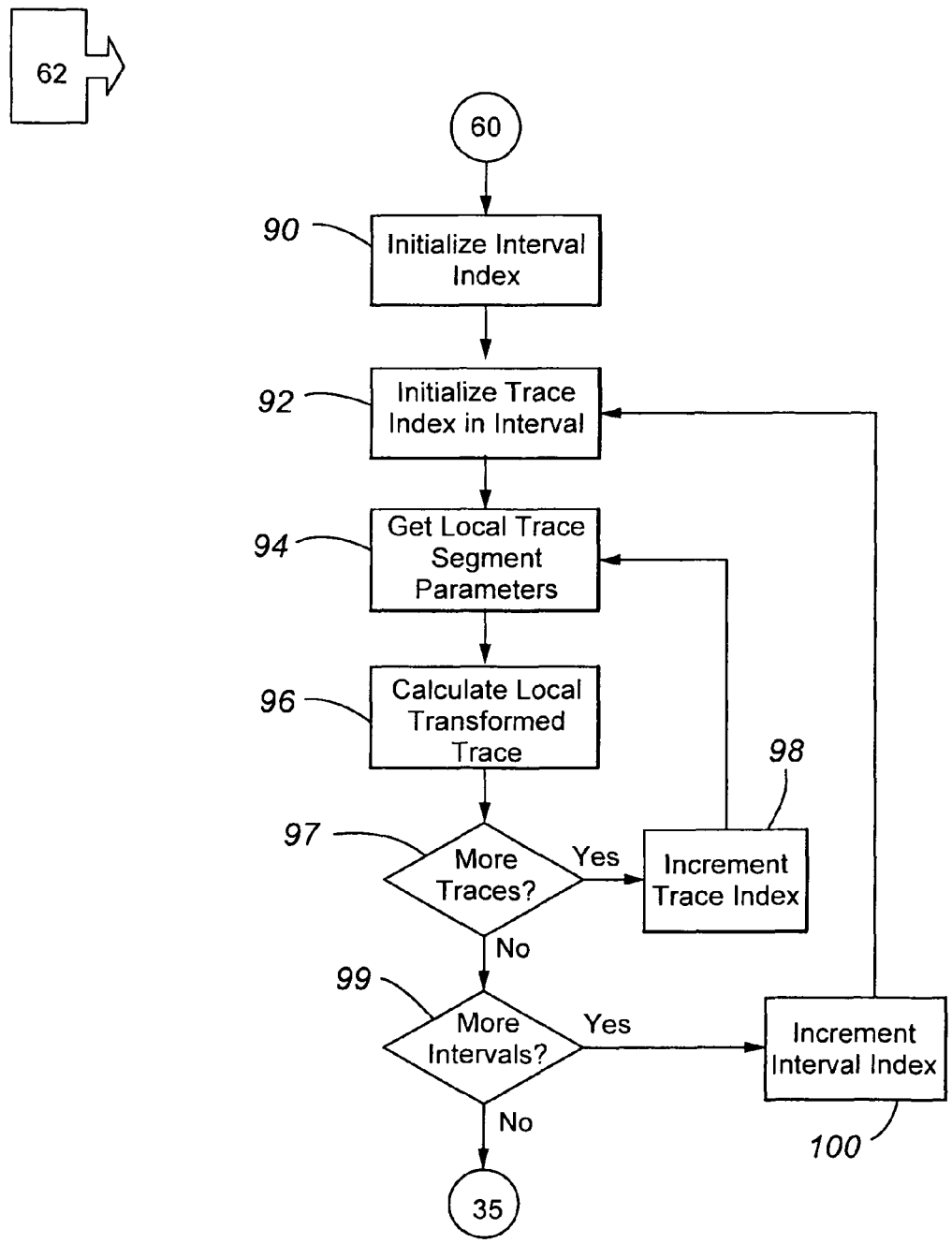
FIG. 23 illustrates a flow diagram illustrating the exemplary process of forward domain transformation, a part of the domain transformation of seismic volumes.

The Domain Transformation process described above is implemented as process 34 (FIG. 3*a*) and is shown in detail in FIGS. 21, 22 and 23. FIG. 21 shows an overview of the Domain Transform process 34. FIG. 22 shows the detailed flow of process 60, Transform Parameter Calculation, which is part of process 34. FIG. 23 shows the detailed flow of process 62, Forward Domain Transformation, which is also part of process 34.

In Domain Transformation, the structural surfaces and geologic information provided by the interpreter regarding the types of geologic surfaces and intervals represented by the data are used to transform the seismic volume of data into a stratal-sliced volume. The Domain Transformation ideally removes all of the effects of structural deformation of the portion of the earth represented by the seismic volume. This results in a new seismic volume where each horizontal slice represents a paleo-depositional surface—a surface upon which deposition occurred at some time in the geologic past.

The inputs to the Domain Transformation process (34) are the interpreted structure and seismic volume(s) (conditioned or not conditioned) from process 32. There may or may not be additional input to process 34 from process 36, Refine Structural Interpretation. Process 36 is shown in detail in FIG. 26 and is described in detail below, after the description of process 34.

Upon input of data to process 34, decision 57 (Condition Data) is made regarding conditioning of the input data (horizons, faults, and volumes) prior to process 60 (Transform Parameter Calculation). If decision 57 is "Yes", then the input data volume(s) and surfaces may be filtered to remove or minimize a variety of types of noise, thus improving the results of the Transform Parameter Calculation (process 60) and the results of the Forward Domain Transform (62). This may include processes to remove random noise, coherent noise, or any artifacts from the volume that were introduced or resulted from the seismic acquisition and processing steps preceding interpretation. Examples of such processes would include, but are not limited to, mean, median or wavelet filtering to the volume, and acquisition footprint removal. It is important to note that the actual techniques used to Condition Data in process 58 may differ from those used in process 46 to condition data for Structural Interpretation.

Once the input volume(s) and surfaces (32) have been conditioned (58), or if no conditioning is necessary (i.e., the answer to decision 57 was "No"), then these data (represented in FIG. 21 by 59) are input into process 60, Transform Parameter Calculation, which is described in detail in FIG. 22. The Transform Parameter Calculation process (60) also requires geologic information as input from the interpreter in 63. The interpreter should provide information regarding the types of geologic surfaces that are being input to process 60 and the types of geologic intervals that exist between the surfaces. This "geologic knowledge" is input into the algorithm in terms commonly used by individuals knowledgeable in the practice of seismic interpretation and geologic modeling. Such surfaces would include, but are not limited to, horizons, faults, unconformities, angular unconformities, and tops or bases of carbonate platforms. Intervals should include, but are not limited to, conformable intervals, growth intervals, and carbonate intervals.

Once all of the requisite input has been supplied, the Interval Index is initialized (64), the data for the first interval is obtained from the computer's memory (66, Get Interval Data), and the Maximum Interval Thickness is calculated (68). A Trace Segment is the portion of a seismic trace between the bounding surfaces that define an interval. The Trace Segment Index is initialized (70), and the Trace Segment is obtained from the volume.

All Domain Transformation operations are performed once per trace segment present in the volume. For example, in a 3-D seismic volume with two interpreted horizons bounding one interval with no faults present, the number of trace segments will be equal to the number of inlines present in the volume multiplied by the number of cross-lines present in the volume. If there are three horizons present that define two unique intervals, the number of trace segments will be twice the single-interval case. Furthermore, if the same volume had faults present in the intervals to be Domain Transformed, the number of trace segments would increase by one for each fault at each inline and cross-line intersection that has a fault present inside a Domain Transformation interval.

Any seismic Trace Segment in an interval between may be cut into one or more Sub-Segments by faults. Thus, once the Trace Segment has been obtained, decision 73 is made to determine if the trace is faulted in the interval. If the result of decision 73 is "Yes", then process 74 determines the Number of Sub-Segments into which the trace segment is cut by faults. The Trace Sub-Segment Index is initialized (76), and the Initial Trace Segment is obtained (78). Trace Sub-Segment Transform Parameters are calculated for each Sub-Segment in process 80. Decision 81 is evaluated to determine if there are More Sub-Segments on that Trace Segment in the interval. If the result of decision 81 is "Yes", the Sub-Segment Index is incremented in process 82, the next Trace Sub-Segment is obtained (78), and its Trace Sub-Segment Transform Parameters are calculated (80). This continues until all sub-segments of the trace have been processed.

If the result of decision 73 is "No", then the Trace Segment is input to process 83, and the Trace Segment Parameters are calculated. The Trace Segment and Trace Sub-Segment Transform Parameters are collected in process 84. These Transform Parameters define how each Trace Segment and Trace Sub-Segment must be processed in the Domain Transformation process to properly transform that segment or sub-segment given the definitions of the bounding geologic surfaces and the geologic interval containing that sub-segment.

Decision 85 is evaluated to determine if there are more Trace Segments in the interval being processed. If the result of decision 85 is "Yes", then the Trace Segment Index is incremented (86), the next Trace Segment is obtained (72), and decision 73 is evaluated for this new Trace Segment. If the result of decision 85 is "No", then decision 87 is evaluated to determine if there are more intervals to process. If the answer to decision 87 is "Yes", then the Interval Index is incremented (88), and the Interval Data for the next interval is retrieved (66).

These processes continue until Transform Parameters have been calculated for all Trace Sub-Segments and Trace Segments in all Intervals. While calculating the trace segments the Transform Displacement Volume is also created (89). This volume has the same dimensions as the output (re-sampled) Stratal Volume. Whereas the Stratal Volume stores the Domain Transformed version of the input data volume, the Transform Displacement Volume stores the x, y, and z coordinates of each data point in the Domain Transformed (x,y,s) volume. With this volume, the position of any interpretation produced from the Stratal Volume can be inverse transformed from (x,y,s) to the original (x,y,z) coordinates of the survey. Moreover, attribute volumes calculated from the stratal sliced volume can also be inverse transformed back to the original (x,y,z) coordinates as new 3-D attribute volumes.

Forward Domain Transformation

Once process 60 is complete, the data (including the seismic volume, horizons, faults, Transform Parameters, and Transform Displacement Volume) are passed from process 60 to process 62 (FIG. 23). The Transform Parameters stored by process 60 comprise the starting time and sample rate for each trace segment in the original input volume, as well as the number of samples to be interpolated and the location to store them in the Domain Transformed (stratal) output volume. These Transform Parameters are used to build the Stratal Volume by interpolating data points from the original input volume.

In process 62 (FIG. 23), the Transform Parameters calculated in process 60 are applied to the seismic volume, horizons and faults to transform the seismic volume and the surfaces from the (x,y,z) or (x,y,t) domain into the (x,y,s) domain, where s, the vertical dimension of the transformed data signifies "stratal-slice." The first two steps in process 62 are Initialize the Interval Index (90) and Initialize the Trace Index in the Interval (92). Process 94 then retrieves the Local Trace Segment Parameters. Process 96 then calculates the Local Transformed Trace segment. Decision 97 is then made to determine if there are More Traces to be processed in the Interval. If the result of decision 97 is "Yes", then the Trace Index is incremented (98) and the Transform Parameters are retrieved for the next Local Trace Segment (94). If the result of decision 97 is "No", then decision 99 is evaluated to determine if there are more intervals to be processed. If the result of decision 99 is "Yes", the Interval Index is incremented (100), and the Trace Index in the Interval is initialized (92). Process 62 continues in this manner until all trace segments in all intervals have been transformed to the (x,y,s) domain.

The type of interpolation performed by process 96 may be one of many established interpolation techniques. These techniques include, but are not limited to, linear interpolation, spline interpolation, and "sinc function" interpolation (also known as "(sin x)/x" interpolation). If interpolation is being performed in the trace (z or t) direction, the preferred implementation would use sinc interpolation. In the case of interpolation along a 3-D path in the volume (e.g., because of steep dips), some combination of techniques may be used with the horizontal and vertical parts of the interpolation operation handled separately.

The Transform Parameter Calculation process (60) outputs all of the input surfaces in Stratal-Domain coordinates. All types of surfaces are output as listed previously. Horizons are output as planar features between the intervals that they separate in the Stratal Domain. Reef Tops are output with the same shape as they were input, but with their position following the interface between the extracted reef values and the null values that exist above the valid values. Similarly, salt boundaries and erosive surfaces are output along the interface of the valid data they bound and the null regions they define. These transformed surfaces act as a cue for the interpreter, indicating how the Stratal Domain volume relates to the input volume.

When sufficient structural control in the form of interpreted horizons, faults, salt boundaries, canyon boundaries, and other possible geological surfaces is used, the Domain Transformation produces a stratal-slice volume that is substantially free of any deformation. This deformation may have been caused by post or syn-depositional folding or faulting, differential compaction and/or differential sedimentation.

Figure 24A:
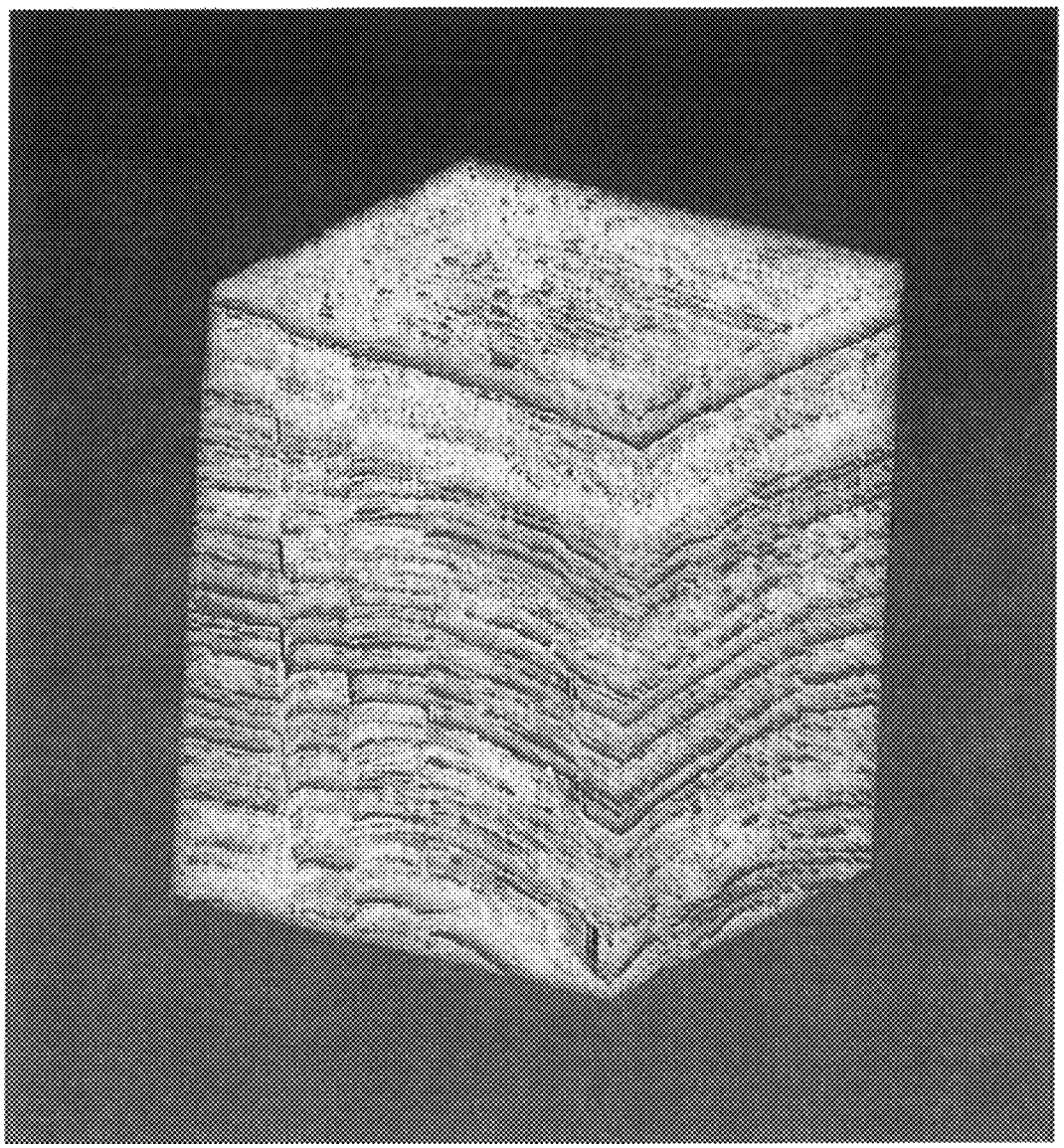
FIG. 24 illustrates an exemplary seismic volume before Domain Transformation (a), interpreted horizons and faults used in the transformation (b), and the Domain Transformed stratal-slice volume (c). The input seismic volume in (a) has deformation associated with syn and post depositional faulting. The output Domain Transformed volume (c) is substantially free of deformation.
Figure 24B:
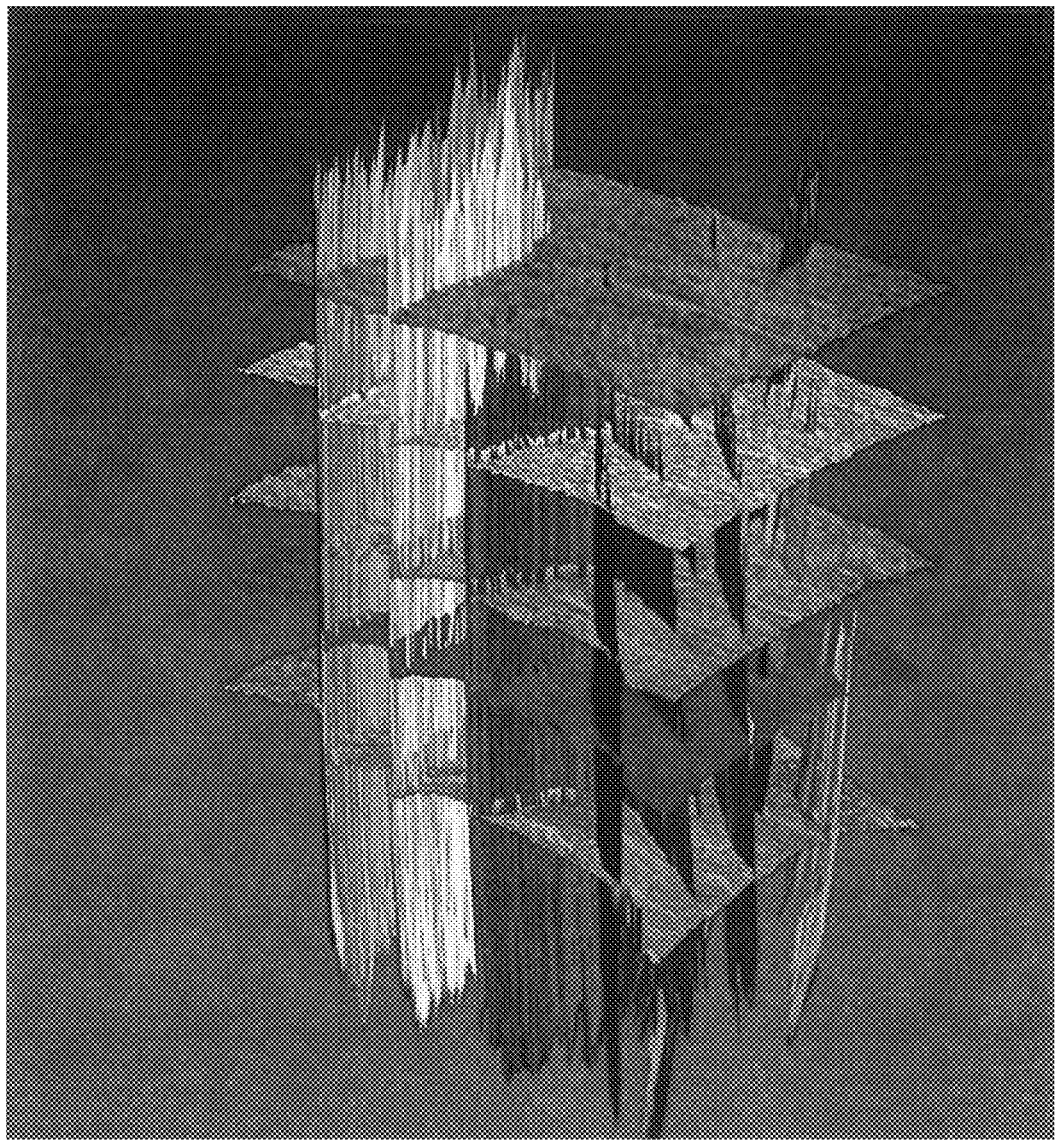
Figure 24C:
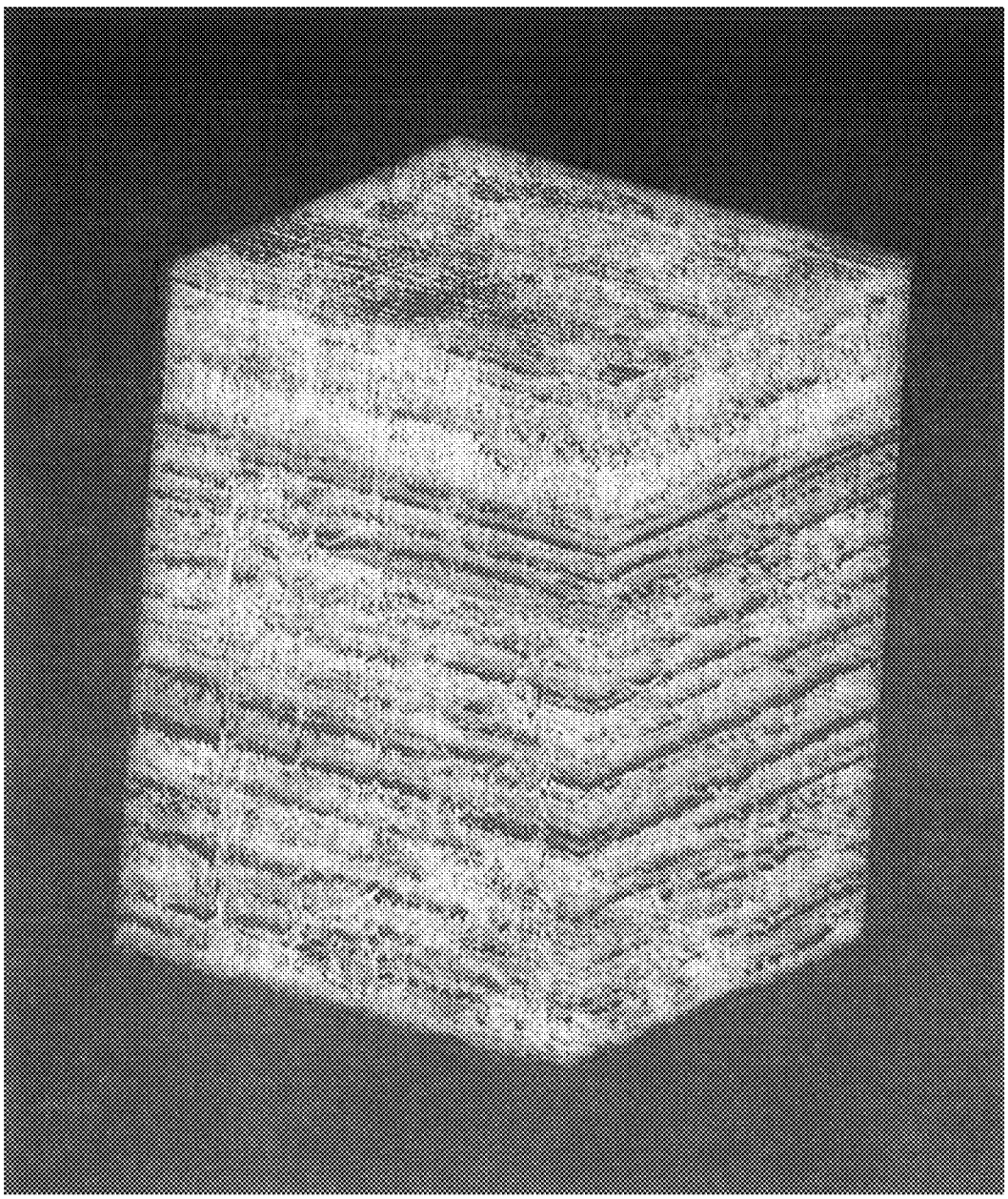

FIG. 24a shows an input seismic volume in (x,y,t) space. The set of horizons and faults that were interpreted in the volume are shown in FIG. 24b, and the stratal-slice volume output by the Domain Transformation process in shown in FIG. 24c. A total of five horizons and 24 faults were used in this transformation. The input volume shows substantial deformation from faulting, and from differential sedimentation (note the increasing thickness between interpreted horizons moving from the left edge of the image to the right edge.

The output volume is substantially free of deformation, in that there are no significant remnant effects from the faulting or from the differential sedimentation. The reflection events in the stratal-sliced volume are all flat.

Refine Structural Interpretation

One key feature of the Domain Transformed volume is that if there are any errors or omissions in the interpretation of horizons or faults in process 32 (FIG. 6), those errors and omissions are highlighted or emphasized in the Domain Transformed volume that is output from process 34.

Figure 25:
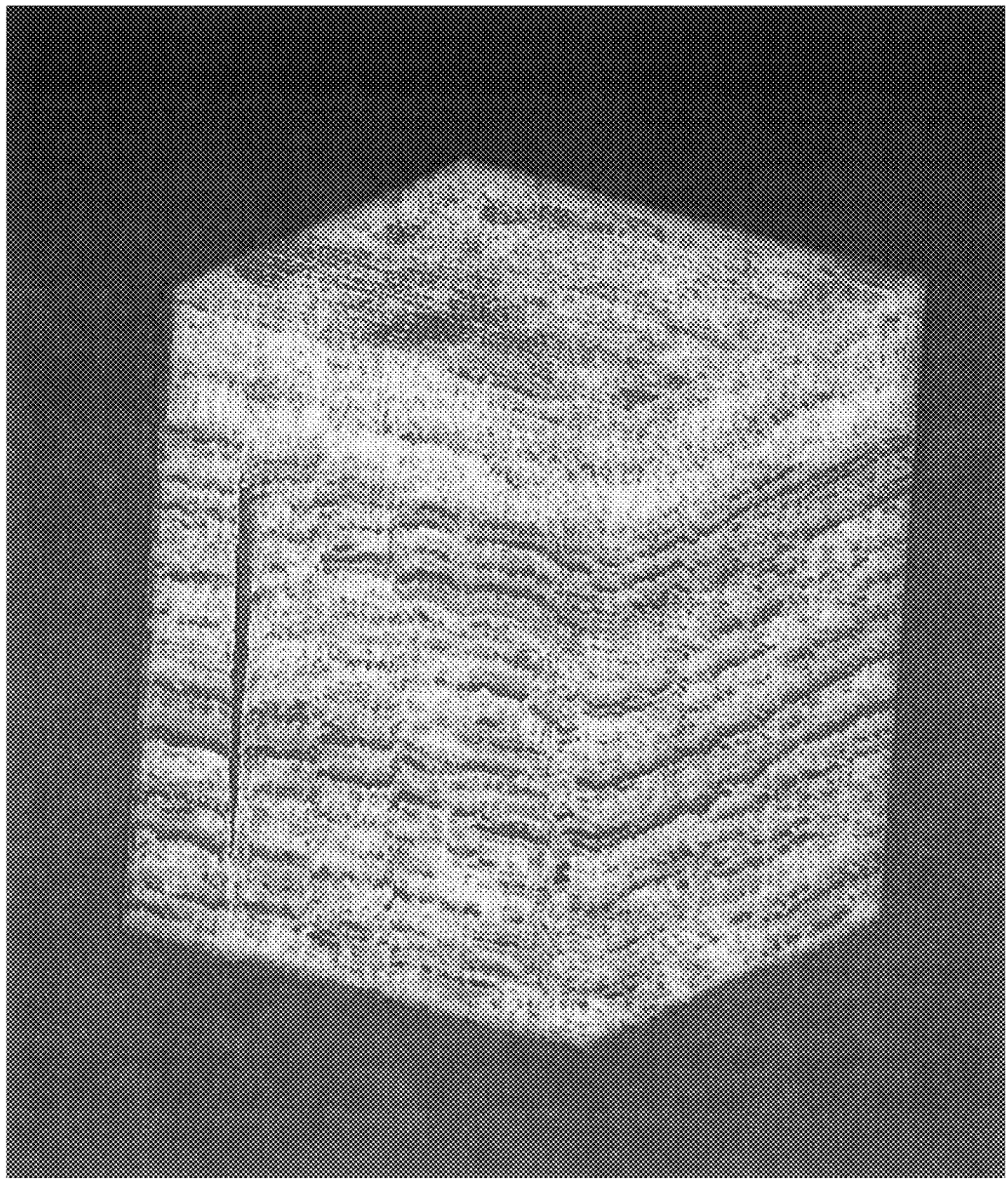
FIG. 25 illustrates an exemplary Domain Transformed volume created from the volume in FIG. 24a, using all of the 24 faults in FIG. 24b, but using only two of the five horizons (the top-most and bottom-most horizons). With insufficient interpretive control, there is substantial deformation remaining in the volume.

FIG. 25 shows a Domain Transformed volume, created from the input volume shown in FIG. 24a using all of the interpreted faults, but only two of the five interpreted horizons shown in FIG. 24b. This Domain Transformed volume is not a stratal-sliced volume, in that it still retains a substantial amount of deformation from both faulting and from differential sedimentation. This deformation is most evident in the middle of the volume at the points that are farthest from the two bounding horizon surfaces that were used in the transformation. This volume clearly requires refinement of the structural interpretation (inclusion of additional interpreted horizons in this case). With insufficient interpretive control, there is substantial deformation remaining in the volume.

In decision 35 (FIG. 3a), the Domain Transformed volume is examined for any of these errors and/or omissions. If Structural Refinement is needed (if decision 35 is "Yes") then process 36 is used to Refine the Structural Interpretation, thus correcting those errors and/or omissions. After this refinement process, the Domain Transformation (process 34) must be applied again in order for the refined structural interpretation to be applied in the transformation process.

Figure 26:
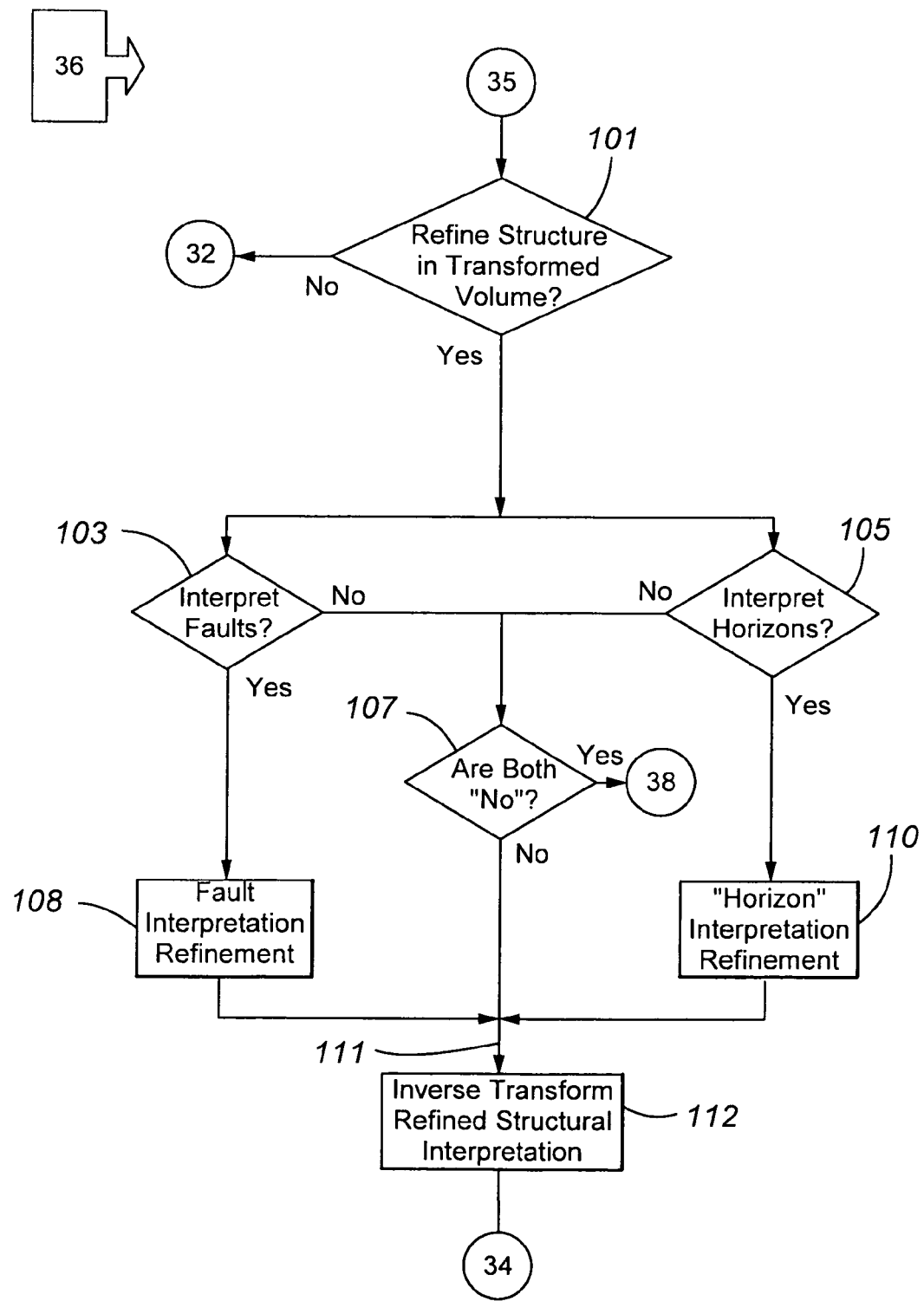
FIG. 26 illustrates an exemplary flow diagram illustrating the process of refining the structural interpretation after initial domain transformation of the seismic volume.

The details of the Refine Structural Interpretation process (36) are shown in FIG. 26. If decision (35) has been evaluated as "Yes", that Structural Refinement is needed, process 36 begins with a decision (101) to determine whether to Refine Structural in the Transformed Volume or in the original seismic volume. If decision 101 is evaluated as "No", then control is passed to process 32 Structural Interpretation, and the structural refinement occurs in the original seismic volume using process 32. If decision 101 is evaluated as "Yes", the structural refinement will be performed in process 36 on the domain transformed seismic volume.

Data passed into process 36 from process 34 and decision 35 includes the domain transformed volume, the domain transformed surfaces (horizons, faults, etc.), and the Transform Displacement Volume. Structural refinement may involve the interpretation of additional horizons and/or faults, and may also include editing or changing the horizons or faults that were initially interpreted in process 32. This interpretation and editing may be conducted manually, accomplished using automatic processes, or by any combination of manual and automatic techniques. The interpretation of horizons and faults may be conducted by interpreting horizons first, faults first, or by intermingling the interpretation of horizons and faults. Thus, the processes of refining the interpretation of horizons and faults are shown in parallel in FIG. 26.

Decision 103 represents the decision by the interpreter to interpret faults ("Yes") or not interpret faults ("No"). Decision 105 represents the decision by the interpreter to interpret horizons ("Yes") or not interpret horizons ("No"). If both decisions 103 and 105 are "No", then decision 107 is "Yes" and the refinement process is stopped, and the transformed data and workflow passes on to process 38, Stratigraphic Interpretation. The workflow described here does not require that the interpretation be refined, even if a need for additional refinement of the structural interpretation is indicated by decision 35.

If decision 103 is "Yes", then faults are interpreted and/or edited in the domain transformed seismic volumes (from 35) using any fault interpretation technique of the interpreter's choosing—either manual, automatic, or a combination of manual and automatic. If decision 105 is "Yes", then horizons are interpreted and/or in the domain transformed seismic volumes (from 35) using any horizon interpretation technique of the interpreter's choosing—either manual, automatic, or a combination of manual and automatic.

Inverse Transform Refined Structural Interpretation

Once the interpreter has completed the refinement of the interpretation of the horizons and faults of interest in processes 108 and/or 110 in FIG. 26, then the domain transformed horizons and faults, and the refined structure (horizons and faults) interpreted in the domain transformed volume are then passed (111) into the Inverse Transform Refined Structural Interpretation process (process 112).

Figure 27:
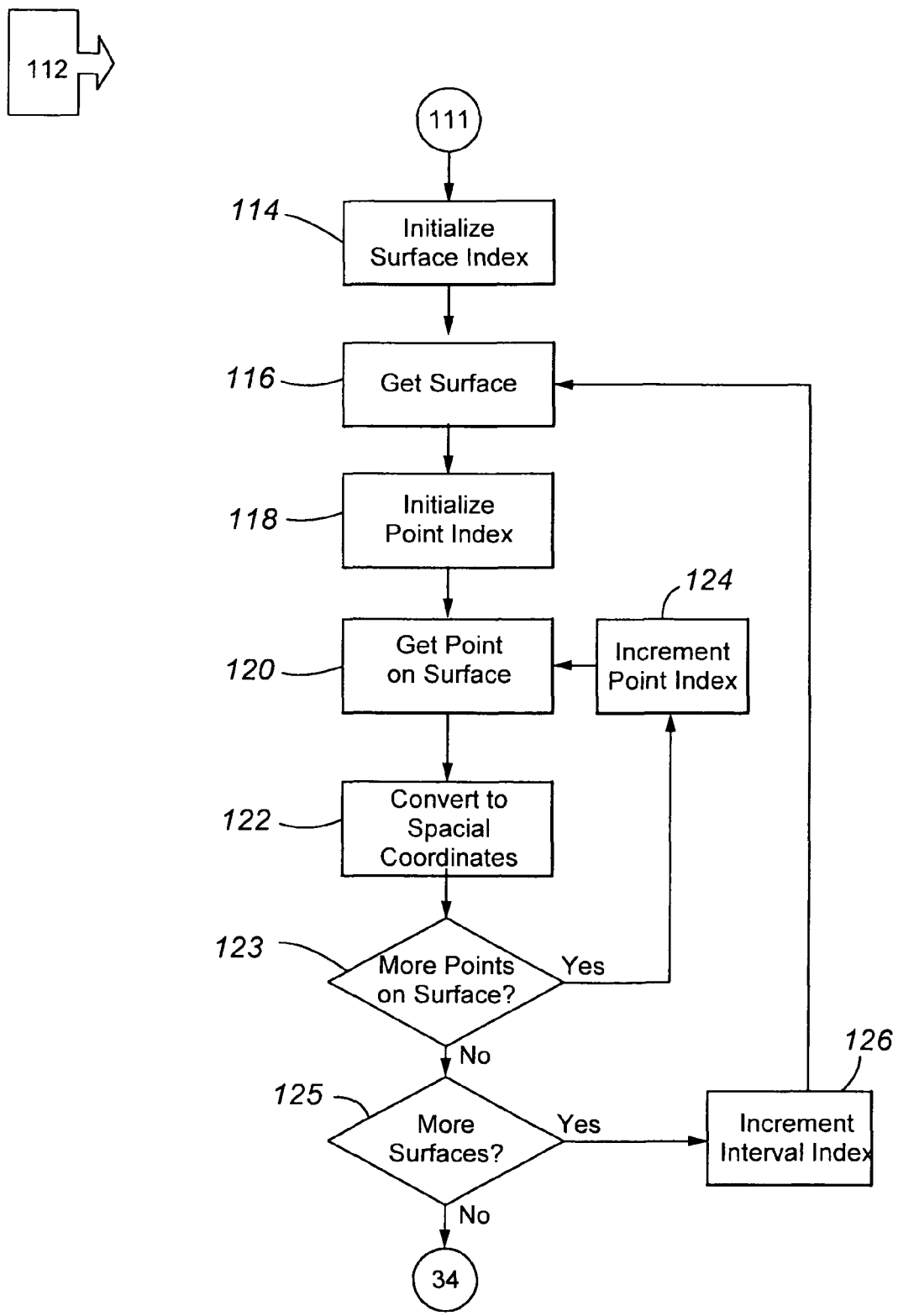
FIG. 27 illustrates an exemplary flow diagram illustrating the process of inverse transformation of the refined structural interpretation from the transform domain to the domain of the original seismic volume. This process is part of the refinement of the structural interpretation illustrated in FIG. 26.

The refined structural interpretation, if it is performed in the transformed volume in process 36, must be inverse transformed and merged with the original structural interpretation in process 32. The Inverse Transform of the Refined Structural Interpretation (process 112) is shown in detail in FIG. 27.

The input to process 112 is the refined interpretation of faults and horizons (111), and the Transform Displacement Volume. Process 114 initializes the Surface Index, and the first Surface is obtained by process 116. Process 118 initializes the Point Index for points on the selected surface, and the first Point on the Surface is obtained by process 120. Process 122 is then used to convert the coordinates of the Point on the Surface from the transformed or stratal slice domain to the corresponding coordinates in the original domain of the seismic volume from 30. Decision 123 is then evaluated to determine whether there are More Points on the Surface. If decision 123 is evaluated as "Yes", then the Point Index is incremented by process 124, and the next Point on the Surface is obtained by process 120. If decision 123 is evaluated as "No" (there are no more points on the current surface), then decision 125 is then evaluated to determine whether there are more surfaces. If decision 123 is evaluated as "Yes", then process 126 increments the Surface Index, and the next Surface is obtained by process 116. If decision 123 is evaluated as "No", then process 112 is completed and passes control back to process 34, to repeat the Domain Transformation of the original seismic volume using the refined structural interpretation.

Stratigraphic Interpretation

Once the interpreter decides that no more Structural Refinement is required (i.e., decision 35 in FIG. 3a is "No") either because the structural interpretation is complete, or because the interpreter has chosen to proceed with an incomplete structural interpretation, then process 38, Stratigraphic Interpretation, is applied to the Domain Transformed volume. The purpose of the Stratigraphic Interpretation process is to assist the interpreter in the identification and interpretation of elements of depositional systems, or other seismic stratigraphic features represented in the Domain Transformed volume. The identification of these elements of depositional systems is accomplished by calculation of a variety of seismic attribute volumes within process 38. Once these elements of depositional systems have been identified in the attribute volumes, the bounding surfaces of these elements are also created in process 38.

FIG. 28 shows a comparison of slices extracted from an input seismic volume and a domain transformed volume. Five horizons and more than twenty faults were used in the domain transformation process applied to this volume. FIG. 28*a* shows a vertical section extracted from the input seismic volume, with the fault surfaces and bounding horizons that intersect that section. FIG. 28*b* shows the corresponding section extracted from the domain transformed volume. The arrows on FIG. 28*a* show the points that correspond to the four corners of the section extracted from the domain transformed volume.

FIGS. 28*c* and 28*d* respectively show 3-D views of horizontal slices taken through the input seismic volume and the domain transformed volume. The arrows indicate a channel on the two slices. In the input volume, only a small portion of the channel is visible on the horizontal slice because of the growth and faulting that is present in the volume. The entire channel is visible on the horizontal slice from the domain transformed volume because the effects of growth and faulting have been removed by the domain transformation process.

The Domain Transformed seismic volume and Domain Transformed interpreted surfaces are input to process 38 (Stratigraphic Interpretation) from process 34 and decision 35 (FIG. 3*a*). Process 38 is shown in detail in FIG. 29. Once data are input into process 38, decision 127 is evaluated to determine if the transformed data (both the transformed seismic volume and the interpreted surfaces) need to be conditioned prior to stratigraphic interpretation. If decision 127 is "Yes", then the input transformed data volume and surfaces may be filtered to remove or minimize a variety of types of noise which may improve the stratigraphic interpretation (process 128, Stratigraphic Data Conditioning). This conditioning may include processes to remove random noise, coherent noise, or any artifacts from the volume that were introduced or resulted from the seismic acquisition and processing steps, or any noise or artifacts introduced in the Domain Transformation process (34). Examples of such processes would include, but are not limited to, mean, median or wavelet filtering to the volume, and acquisition footprint removal.

Once the input domain transformed seismic volume and surfaces have been conditioned (128), or if no conditioning was necessary (i.e., the answer to decision 127 is "No"), then a number of Stratigraphic Attribute Volumes may be calculated in process 130. The goal of calculating these attribute volumes is to produce through a single volume, or through a combination of volumes, a data volume or volumes that provide improved imaging of depositional systems when compared to the domain transformed seismic volume. Individuals practiced in the art of stratigraphic interpretation from 3-D seismic data are familiar with these attribute volumes.

Figure 29:
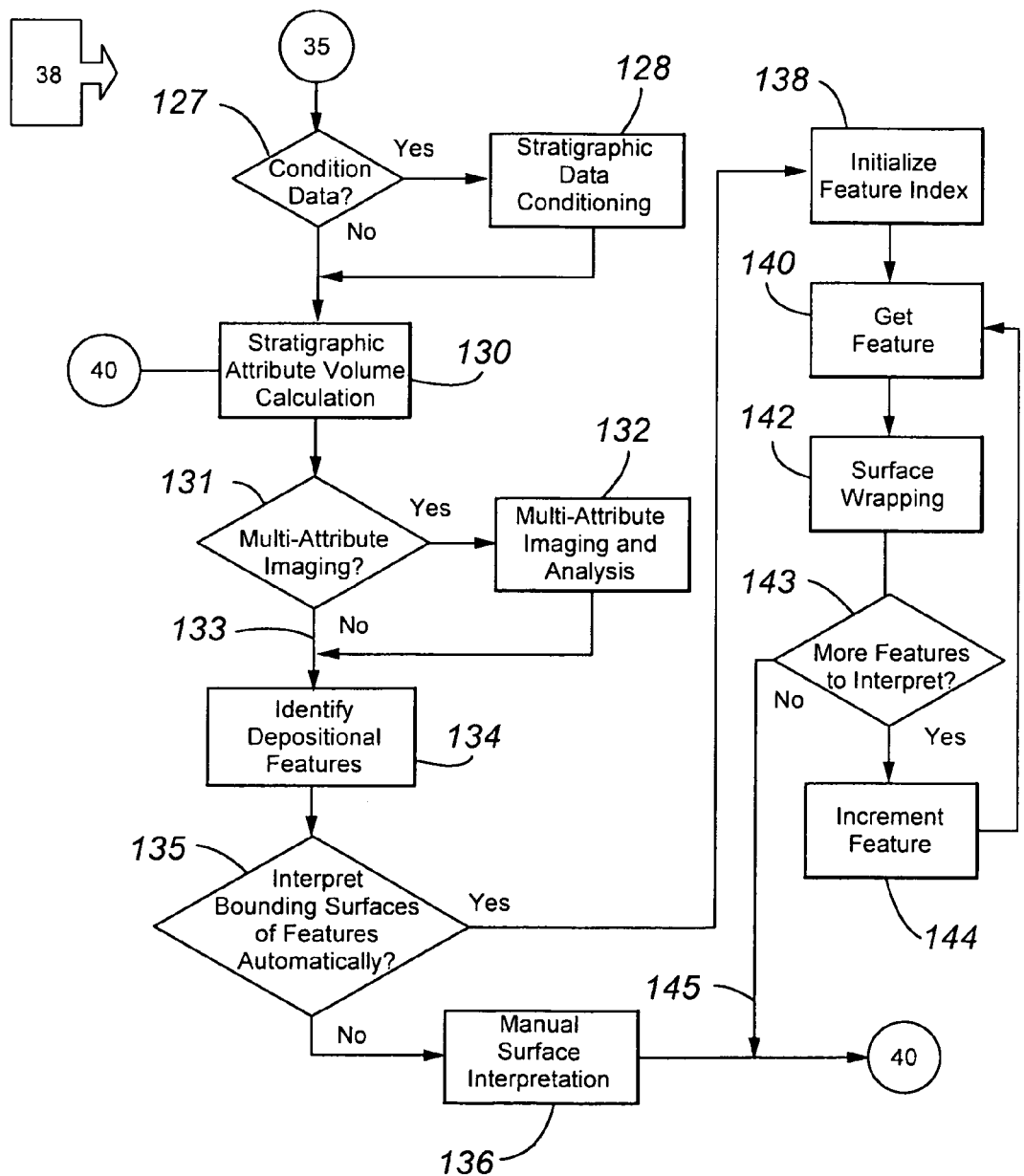
FIG. 29 illustrates an exemplary flow diagram illustrating the process of stratigraphic interpretation of the domain transformed volume.

Attribute imaging of stratigraphy is improved by first transforming the seismic volume, and by then calculating the attribute volume in the transformed domain. This can be seen when compared to the typical practice of calculating the attributes directly on the input seismic volume without using domain transformation. Because of this, it is advantageous to provide the attribute volumes created by this workflow in the transform domain as output from process 38 to be inverse transformed in process 40, as is shown in FIG. 29.

Once the Stratigraphic Attribute Volumes have been calculated by applying process 130 to the transformed seismic volume, decision 131 is evaluated to determine whether Multi-Attribute Imaging is going to be used to aid in the imaging of depositional systems using the attribute volumes. If decision 131 is evaluated as "Yes", then process 132 is applied to identify optimum combinations of attributes to image the elements of depositional systems in the transformed space. There are a number of techniques in the industry that would be familiar to one who is practiced in the art of stratigraphic interpretation. These include, but are not limited to, neural network and neural network related techniques to analyze combinations of attributes for clusters that might identify elements of depositional systems (e.g., Kohonen Self-Organizing Maps and Growing Neural Gas), direct cluster analysis techniques (e.g., K-Means clustering), and techniques such as attribute cross-plot matrices and multi-dimensional attribute crossplot visualization techniques. Any of these techniques could be used in process 132 to image and analyze the multiple attribute volumes created by process 130 to image the depositional systems in the data.

Surface Wrapping

As elements of depositional systems are imaged in individual attribute volumes, or combinations of attribute volumes, these elements are then "interpreted" by obtaining their bounding surfaces (i.e., the surface that completely encloses the depositional feature). Decision 135 is evaluated to determine how the bounding surfaces of the depositional systems will be interpreted. If decision 135 is evaluated as "No", the interpreter will manually interpret the bounding surface of the depositional system or depositional system element manually (136). If decision 135 is evaluated as "Yes", then process 142 (Surface Wrapping) will be used to semi-automatically interpret the bounding surface of the depositional system or depositional system element.

Surface Draping (Dorn, 1999) is an effective technique for creating polygonal representations of surfaces that are essentially planar, but it cannot be applied directly to the problem of finding the bounding surface of a geobody. The Surface-Wrapping algorithm creates a 3-D polygonal mesh that entirely surrounds 3-D objects.

Surface Wrapping is a semi-automatic approach for segmentation of a geobody bounding surface within volumetric data. The approach is metaphorically based upon the concept of collapsing an elastic surface onto a physical object. The desired output of the process is a polygonal mesh that may be stored as data, displayed to the end user, or used in further data processing techniques. This approach has advantages over fully automated segmentation algorithms in that it may be applied to data where the volume to be segmented is not fully imaged, or where a high level of noise is present. This approach is also significantly less time consuming for the human analyst than fully manual segmentation techniques, in that the user need only define an approximate initial bounding surface prior to application of the algorithm which determines a more detailed and accurate bounding surface.

In the preferred embodiment, an interpreter first specifies a range of voxel values that best isolates the voxels that correspond to the boundary of the intended geobody in the volume. The interpreter then defines an initial 3-D bounding surface which completely encloses the intended geobody and approximates its contours, isolating the voxels belonging to the geobody boundary from the rest of the volume.

Figure 30:
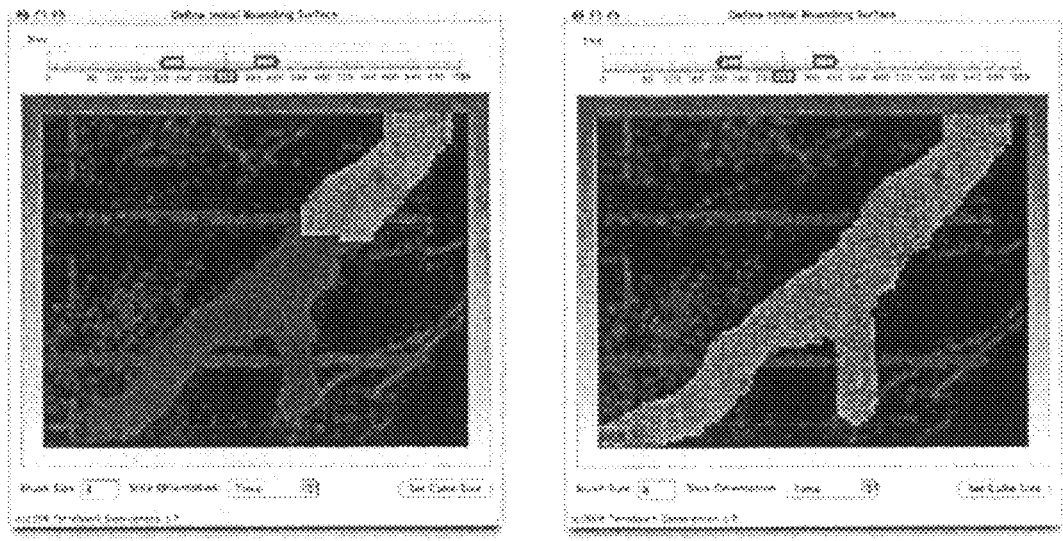
FIG. 30 illustrates an exemplary defining of the initial bounding mesh (light grey) on a horizontal slice through the seismic volume. A channel-like object is imaged in the volume in darker grey.

The initial bounding surface may be constructed using manual, automatic, or semi-automatic methods, or any combination thereof. In the preferred embodiment, the method for defining the initial bounding surface is based on a technique described by Kobbelt et. al. (1999). In this method, which is similar to graphical user interfaces that are commonly found in fully manual volume segmentation software, one slice of the volume is displayed on the screen, and the user defines the region contained by the initial bounding surface using a virtual brush to "paint" the region on the screen, as shown in FIG. 30. Though similar to manual segmentation interfaces, the interface used in Surface Wrapping is different in two ways. First, the painted region must fully enclose the boundary of the intended geobody (alternatively it must almost fill the boundary of the intended geobody), but need not precisely track the contour of the volume. Second, the brush defines the same 2-D region on a user-defined range of slices simultaneously, thus extending the approximate bounding region into 3-D.

Figure 31:
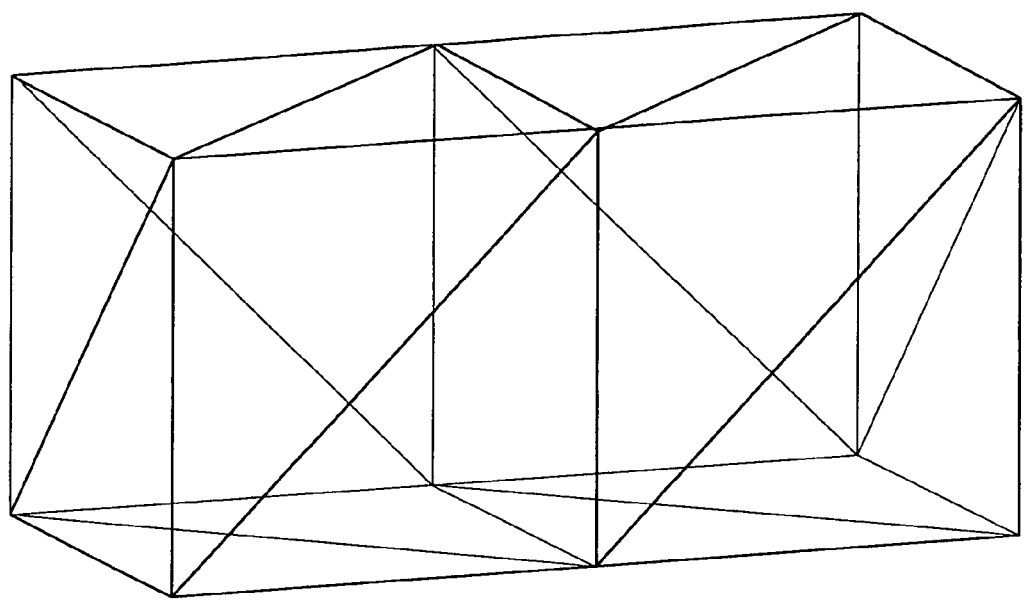
FIG. 31 illustrates an example of a very simple initial bounding surface mesh consisting of two abutting cubes. The exterior faces have been tessellated, while the two interior faces have been discarded.
Figure 32:
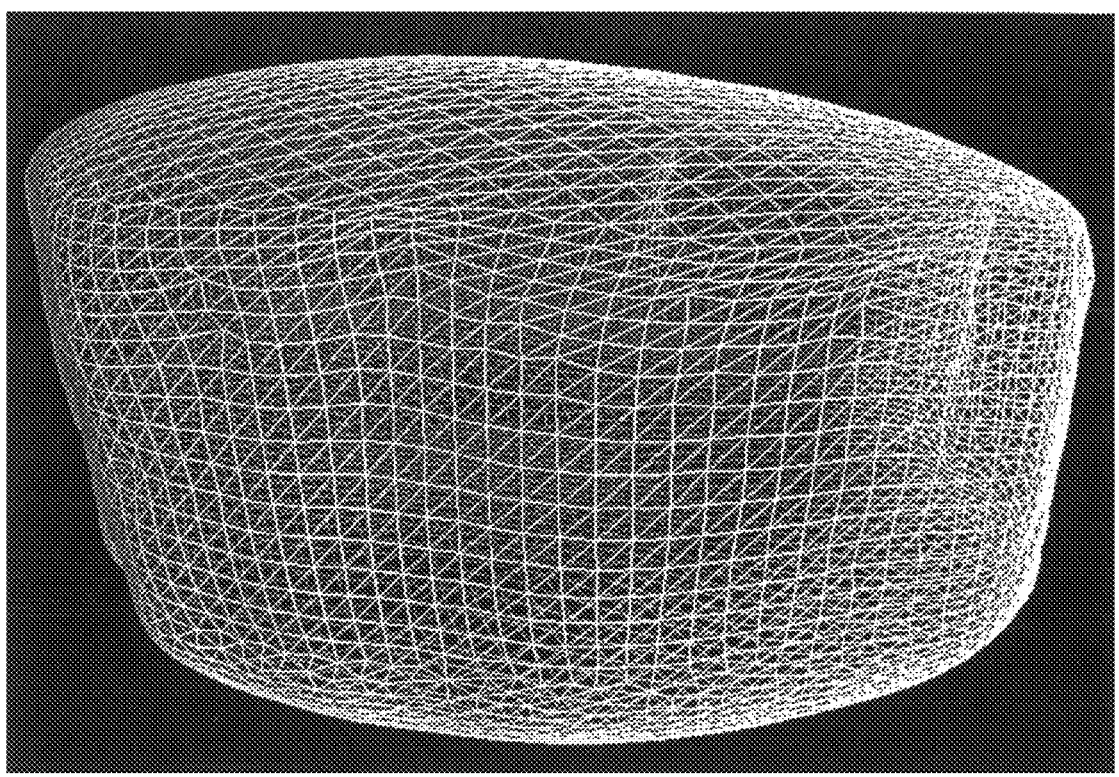
FIG. 32 illustrates an example of an initial connected mesh defined by the surface wrapping process. Note that this mesh is from a different example than that used in FIG. 30.

Internally, the painted region is represented as a collection of cubes of equal dimensions, where each cube corresponds to a small portion of the volume that is contained within the initial bounding surface. FIG. 31 shows two such adjacent cubes. The size of the cubes is globally adjustable by the user; the smaller the cube size, the denser the bounding surface mesh. To construct the initial bounding surface mesh, the hull of the painted region is found by discarding cube faces that share the same spatial coordinates. The remaining faces are tessellated into two triangles per face, which collectively form the visible polygons of the bounding surface mesh (FIG. 31). An example of an initial mesh constructed from a large number of cubes is shown in FIG. 32.

In order to allow the Surface Wrapping algorithm to process the bounding surface mesh as if it were an elastic material, each vertex in the mesh maintains a record of its neighboring vertices, where a neighboring vertex is defined as any vertex to which it is directly connected by an edge of a triangle. Each vertex also maintains a record of all triangles of which it is a part. Vertex locations correspond to index coordinates relative to the data volume, and there may be at most one vertex data structure in the mesh at any given spatial coordinate, thus ensuring connectivity of vertices over the entire mesh.

Figure 33A:
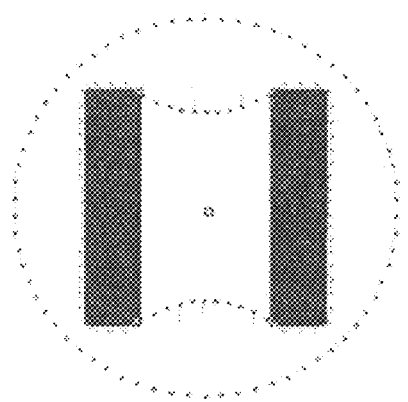
FIG. 33 illustrates two 2-D examples demonstrating the Surface Wrapping algorithm, showing an initial ring of connected vertices collapsing onto: (a) two rectangular objects; (b) a slice from an MRI (Magnetic Resonance Imaging) volume of a person's head.
Figure 33B:
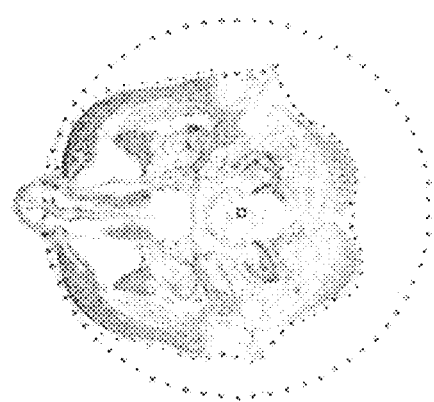

Once the initial bounding surface has been defined, the Surface Wrapping process iteratively moves each vertex in the mesh toward the boundary of the intended geobody, as illustrated in 2-D in FIGS. 33a and 33b, wherein an initial ring of connected vertices collapses onto: (33a) two rectangular objects; (33b) a slice from an MRI (Magnetic Resonance Imaging) volume of a person's head.

The process by which the vertices are moved is detailed below.

Each iteration of the surface wrapping algorithm begins with the calculation of the outward vertex normal vector for the first vertex in the mesh. The vertex normal is calculated as the normalized mean of the adjacent face normals, with a unit length corresponding to the grid spacing of the voxels in the data volume. A face normal, $N_s$, is calculated as the cross product of vectors A and B, which are vectors lying on the local "plane" of the surface.

$$N_s = A \times B$$

The vertex normal $N_w$ is calculated as the ratio:

$$N_w = N_v / |N_v|$$

where the vector $N_v$ is defined as the sum of face normals $N_{si}$ divided by the total number of adjacent faces, n:

$$N_v = \frac{\sum_{i=1}^{n} N_{si}}{n}$$

and where $|N_v|$ is the magnitude of vector $N_v$.

If the initial mesh has been created everywhere outside the object whose boundary is sought, a projected location for that vertex is then calculated to be at a point one unit length from the vertex's current position in the direction opposite to the outward unit normal at that vertex. If the initial mesh has been created everywhere inside the object whose boundary is sought, a projected location for that vertex is then calculated to be at a point one unit length from the vertex's current position in the direction of the outward unit normal at that vertex.

Figure 34:
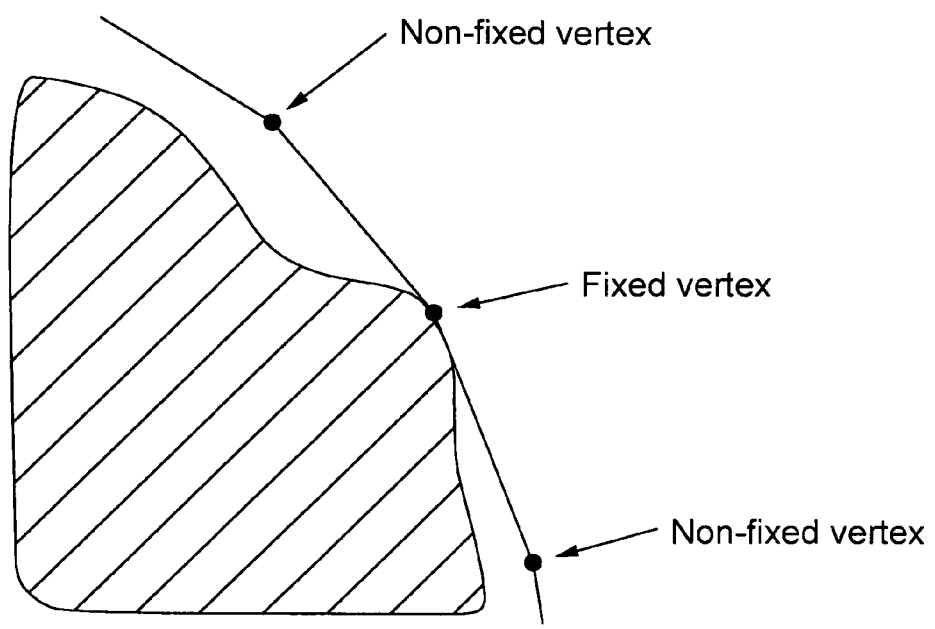
FIG. 34 illustrates a 2-D diagram of fixed vertex determination in the Surface Wrapping algorithm.

If the voxel value at the projected location falls within the range specified by the interpreter as corresponding to the boundary of the body being wrapped, then the vertex is flagged as "fixed" (FIG. 34) and the projected location is not recorded. If the voxel value at the projected location does not fall within the specified range, the projected location is stored in the vertex data structure. This process is repeated for each vertex in the mesh, and is not order-dependent.

Following the calculation of the projected location for each non-fixed vertex, a second location is computed for each non-fixed vertex, referred to here as the centralized location. For a given vertex, the centralized location is determined to be the mean of the current locations of its neighboring vertices, as illustrated in FIG. 35. This process is repeated for each vertex in the mesh, and is not order-dependent.

When both the projected and centralized locations have been computed for a non-fixed vertex, its actual updated location corresponds to a point partway along the line segment between the projected location and centralized location. The proximity of the updated location to either end of the line segment is determined by a user-adjustable elasticity factor, which is defined as a percentage of the distance from the centralized location to the projected location. A higher elasticity factor causes the mesh to be treated as a more pliant material, while a lower elasticity factor simulates the effect of increased surface tension. FIG. 36 shows a 2-D illustration of calculating a final vertex location based on a vertex's projected location and centralized location, using an elasticity factor of 0.8.

Figure 37:
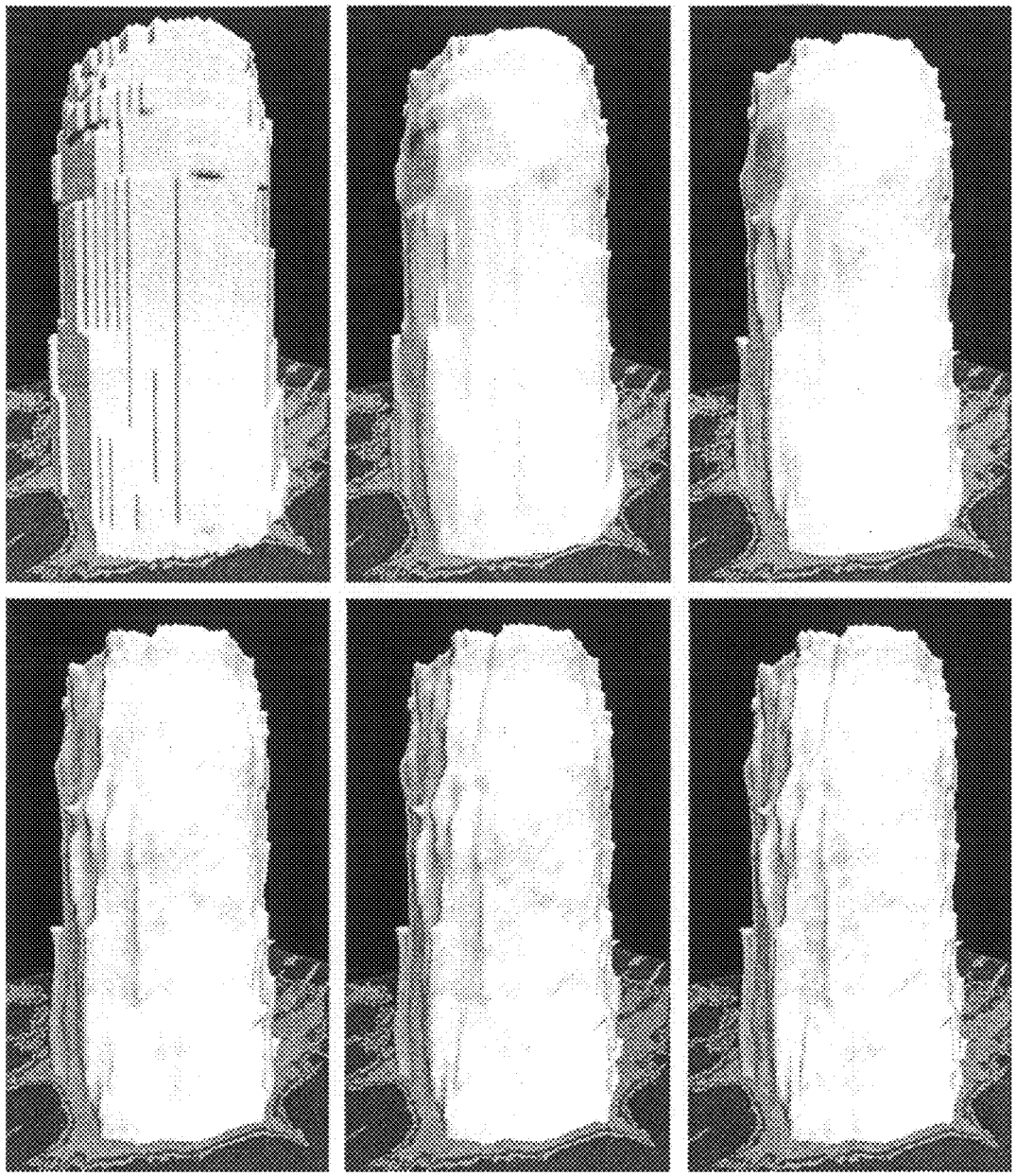
FIG. 37 illustrates a demonstration of the progression of several iterations of the surface wrapping algorithm, beginning with the initial bounding surface (upper left) and continuing to the detailed segmentation of the geobody (lower right).

If at this point the mesh must be processed further, as determined either automatically or by the interpreter, the above process is then repeated until the interpreter is satisfied that the desired bounding surface has been achieved. FIG. 37 illustrates the progression from top left to bottom right of successive iterations of this process as used to create a bounding surface mesh of a salt dome. In order to provide the user with real-time feedback for the result of successive iterations of the Surface Wrapping algorithm, vertex positions at each iteration may be pre-calculated prior to yielding control of the graphical interface to the user. Using, for example, a scroll bar, a user can reveal the results of various vertex calculations and display them graphically. For example, by adjusting a scroll bar, a user could be presented with the series of images displayed in FIG. 37.

Figure 38:
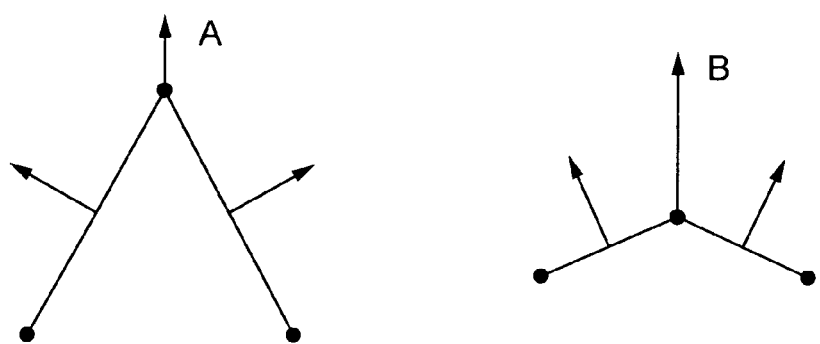
FIG. 38 illustrates determining the "sharpness" of a vertex for simulation of a permeable surface in the Surface Wrapping algorithm. The magnitude of the sum of the surface vectors for a sharp vertex (left) is smaller than that of a blunt vertex (right).

An additional feature that may be incorporated into the Surface Wrapping algorithm is the simulation of a semi-permeable surface, which allows outlying voxels to "push through" the mesh while maintaining the overall desired structure of the bounding surface. In the preferred implementation, this is accomplished by the use of an additional predicate immediately prior to the calculation of a vertex's projected location which determines if the vertex is creating a sharp point in the mesh. This predicate sums the surface normal vectors of the triangles that connect to the vertex and calculates the magnitude of the resulting vector. This calculation is illustrated in 2-D in FIG. 38, which shows the difference in the magnitude of the summed surface vectors for a sharp vertex versus a blunt vertex. If the magnitude is below a user-definable threshold, the vertex is flagged as non-fixed for the current iteration of the Surface Wrapping algorithm, which has the effect of smoothing out the spike in the mesh.

The Surface Wrapping algorithm may also be applied to a subset of the vertices in the bounding surface mesh, allowing localized editing operations. A typical mechanism for selecting the affected vertices is any picking operation in a 3-D rendered view of the mesh, but the selection of vertices can be accomplished via any combination of manual or automatic techniques.

Figure 39:
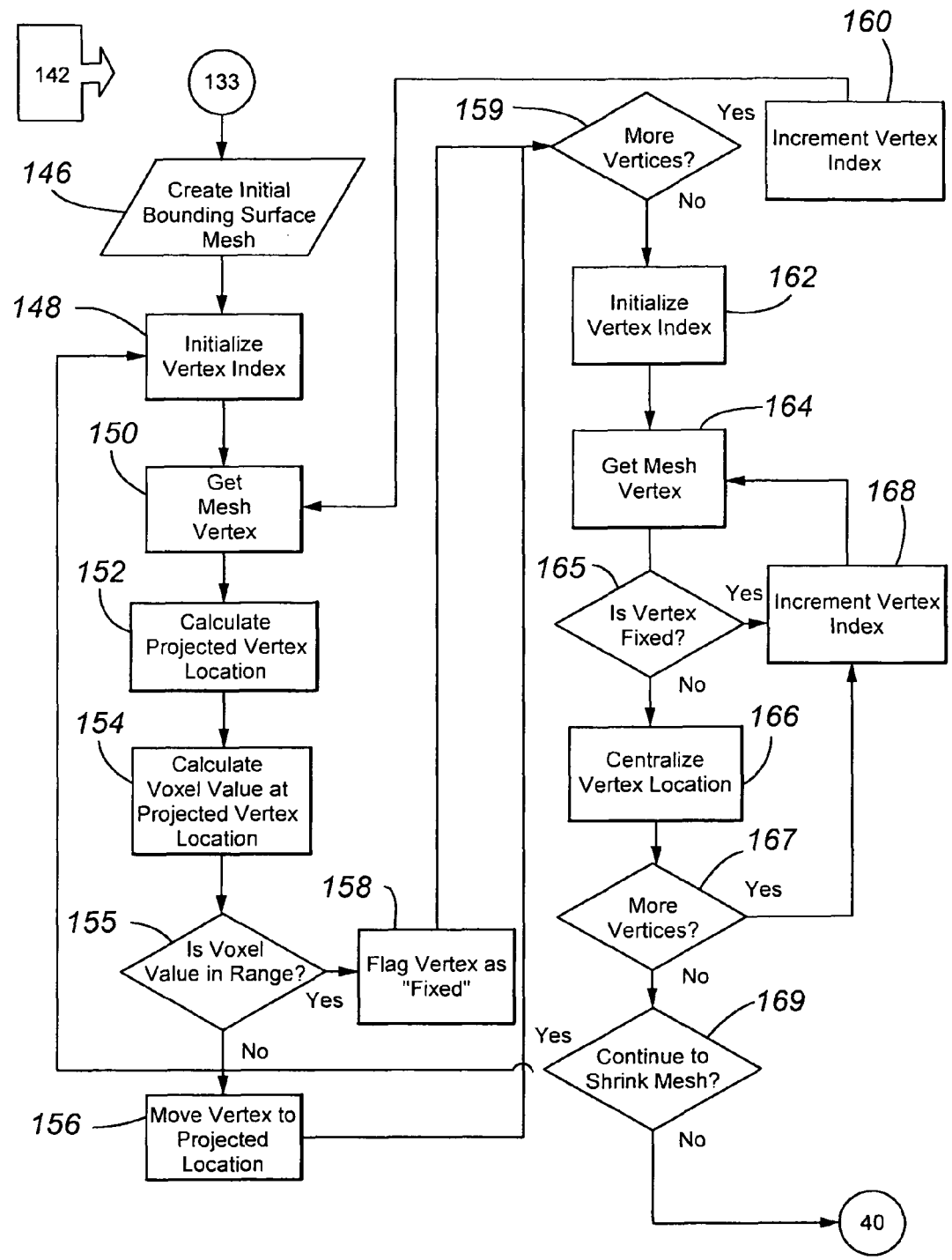
FIG. 39 illustrates an exemplary a flow diagram illustrating the process of surface wrapping of the elements of depositional systems. This process is part of the stratigraphic interpretation of the domain transformed volume illustrated in FIG. 29.

Surface Wrapping (process 142) is shown in detail in FIG. 39. In Surface Wrapping, the interpreter Creates an Initial Bounding Surface Mesh (146), which is a very approximate connected three-dimensional mesh which either completely surrounds the depositonal system or system element of interest (Case A), or is completely included within the depositional system or system element of interest (Case B). The Surface Wrapping process will shrink the initial mesh inward to the boundary of the depositional system or system element in Case A, or will expand the initial mesh outward to the boundary of the depositional system or system element in Case B.

Once the Initial Bounding Surface Mesh has been created by the interpreter, process 148 Initializes the Vertex Index, and process 150 gets the initial Mesh Vertex. Process 152 calculates the Projected Vertex Location based on a movement of the vertex from its initial position along the direction of its unit normal toward the element of the depositional system. Process 154 then calculates an estimate of the Voxel Value at the Projected Vertex Location. Decision 155 (Voxel Value in Range) is evaluated to determine if the voxel has encountered the boundary of the depositional system or system element. If the Voxel Value is in the interpreter specified range (decision 155 evaluated as "Yes") then the vertex is Flagged as Fixed by process 158. If the Voxel Value is outside the interpreter specified range (decision 155 evaluated as "No") then process 156 Moves the Vertex to the Projected Location.

After either process 156 or 158 is complete, decision 159 is evaluated to determine if there are More Vertices. If decision 159 evaluates as "Yes", then process 160 Increments the Vertex Index, and process 150 gets the next Mesh Vertex. If decision 159 evaluates as "No", then process 162 re-initializes the Vertex Index, and process 164 Gets the Mesh Vertex. Decision 165 is then evaluated to determine if the Vertex is Fixed. If decision 165 is evaluated as "Yes" (i.e., the vertex has been flagged as fixed) then process 168 Increments the Vertex Index, and process 164 Gets the next Mesh Vertex. If decision 165 is evaluated as "No" (i.e. the vertex has not been flagged as fixed) the process 166 Centralizes the Vertex Location with respect to the neighboring vertices in the mesh.

After process 166, decision 167 is evaluated to determine whether there are More Vertices in the mesh. If decision 167 is evaluated as "Yes" (i.e., there are more vertices), then process 168 Increments the Vertex Index, and process 164 Gets the next Mesh Vertex. If decision 167 is evaluated as "No" (i.e., there are no more vertices), then decision 169 is evaluated to determine whether to Continue Shrinking the Mesh. If decision 169 is evaluated as "Yes", then process 148 Initializes the Vertex Index for the next shrinking step, and process 150 gets the Mesh Vertex. Note that once a vertex has been flagged as fixed in process 158, its projected position in process 154 remains fixed. If decision 169 is evaluated as "No", then the surface mesh represents the bounding surface of the depositional system or system element to the conditions set by the interpreter at the beginning of the Surface Wrapping process (142).

Referring back to FIG. 29, once the bounding surface or surfaces have been obtained using process 136 or process 142, then the resulting surface or surfaces are output from process 38 to process 40.

Inverse Domain Transformation

Referring to FIG. 3a, as individual elements of depositional systems are identified, interpreted and their bounding surfaces are created in process 38, the attribute volumes, and/or the bounding surfaces are transformed back into the spatial domain of the input seismic volume (30) by applying process 40, the Inverse Domain Transformation. Alternatively, the interpreter may choose not to apply process 40 until several, or all, of the elements of depositional systems have been identified and interpreted. Process 40 requires as input information from the original seismic volume (30), from the Domain Transformation (34 through 35), and from the Stratigraphic Interpretation process (38).

Data input into process 40 include the Domain Transformed Volume, attribute volumes calculated from the Domain Transformed Volume, the Domain Transformed Surfaces, all interpreted stratigraphic surfaces (either from manual interpretation or from Surface Wrapping), and the Transform Displacement Volume.

Figure 40:
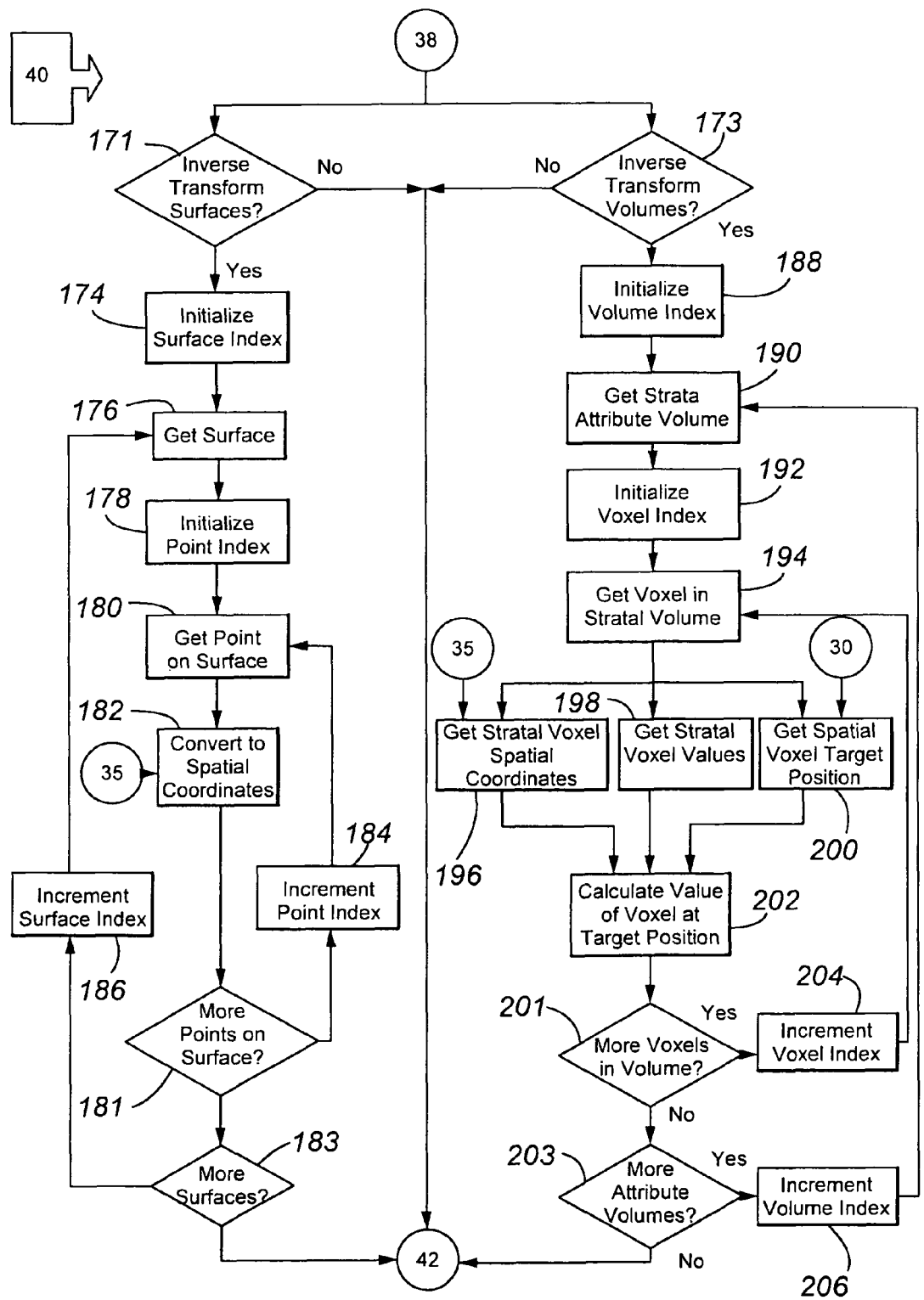
FIG. 40 illustrates an exemplary flow diagram of the process of inverse transformation from (x,y,s) to (x,y,z or t) of the surfaces and attribute volumes created in the stratigraphic interpretation process illustrated in FIGS. 29 and 39.

The Inverse Transform process (40) is shown in detail in FIG. 40. Both attribute volumes and surfaces may be inverse transformed from the stratal slice domain into the spatial domain of the original input seismic volume (30). The workflows for surfaces and volumes are shown in parallel in FIG. 40 for process 40. Upon entry into process 40, decisions 171 and 173 are evaluated. If decision 171 (Inverse Transform Surfaces) is evaluated as "Yes", then the workflow for Inverse Transform of Surfaces is invoked. If decision 173 (Inverse Transform Volumes) is evaluated as "Yes", then the workflow for Inverse Transform Volumes is invoked. If both decision 171 and decision 173 are evaluated as "No", then all desired surfaces and volumes have been inverse transformed, and control is passed to process 42.

The Inverse Transform process (40) allows interpretation produced in the Stratal Domain to be inverted back to the coordinates of the original volume. It also allows attributes that are produced with superior quality in the Stratal Domain to be inverted to the original coordinates. In process 38, if decision 171 is evaluated as "Yes" (Inverse Transform Surfaces), each point of the surfaces in the interpretation is inverted by finding its nearest neighbors in the Transform Displacement Volume. The original positions (in spatial coordinates) of these nearest neighbors are used to invert the position of that point. In process 38, if decision 173 is evaluated as "Yes", (Inverse Transform Volumes), each trace is re-sampled (stretched) back to the original coordinate using similar interpolation schemes to those described for the Forward Transform.

If decision 171 (Inverse Transform Surfaces) is evaluated as "Yes", then process 174 initializes the Surface Index, and the first Surface is obtained by process 176. Process 178 initializes the Point Index for points on the selected surface, and the first Point on the Surface is obtained by process 180. Process 182 is then used to convert the coordinates of the Point on the Surface from the transformed or stratal slice domain to the corresponding coordinates in the original domain of the seismic volume from 30. Decision 181 is then evaluated to determine whether there are More Points on the Surface. If decision 181 is evaluated as "Yes", then the Point Index is incremented by process 184, and the next Point on the Surface is obtained by process 180. If decision 181 is evaluated as "No" (there are no more points on the current surface), then decision 183 is then evaluated to determine whether there are more surfaces. If decision 183 is evaluated as "Yes", then process 186 increments the Surface Index, and the next Surface is obtained by process 176. If decision 183 is evaluated as "No", the workflow for inverse transformation of surfaces is completed.

If decision 173 (Inverse Transform Volumes) is evaluated as "Yes", then process 188 initializes the Volume Index, and the first Volume is obtained by process 190. Process 192 initializes the Voxel Index for points in the selected volume, and the first Voxel in the Volume is obtained by process 194. Process 196, with additional input from process 35, Gets the Stratal Voxel Spatial Coordinates. Process 198 Gets the Stratal Voxel Value, and process 200, with additional input from process 30, Gets the Spatial Voxel Target Position in the inverse transformed volume. The results of processes 196, 198, and 200 are input into process 202, which then calculates the Voxel Value at the Target Position.

Decision 201 is then evaluated to determine whether there are More Voxels in the Volume. If decision 201 is evaluated as "Yes", then the Voxel Index is incremented by process 204, and the next Voxel in the Volume is obtained by process 194. If decision 201 is evaluated as "No" (there are no more voxels in the current volume), then decision 203 is then evaluated to determine whether there are more volumes. If decision 203 is evaluated as "Yes", then process 206 increments the Volume Index, and the next Volume is obtained by process 190. If decision 203 is evaluated as "No", the workflow for inverse transformation of volumes is completed.

Referring to FIG. 3, the output of the workflow (42) may include seismic attribute volumes, which were created in process 38 in the Domain Transformed coordinate system, and which have been Inverse Transformed by process 40 into the coordinate space of the input seismic volume (30). The output of the workflow (42) may also include the bounding surfaces of the interpreted elements of depositional systems, transformed by process 40 from surfaces in the coordinate space of the Domain Transformed volume, to the coordinate space of the input seismic volume (30).

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. Additionally, the exemplary techniques illustrated herein are not limited to the specifically illustrated embodiments but can also be utilized with the other exemplary embodiments and each described feature is individually and separately claimable.

The systems, methods and techniques of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any means, or the like. In general, any device capable of implementing a state machine that is in turn capable of implementing the methodology illustrated herein can be used to implement the various communication methods and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The systems, methods and techniques illustrated herein can be readily implemented in hardware and/or software using any known or later developed systems or structures, devices and/or software by those of ordinary skill in the applicable art from the functional description provided herein and with a general basic knowledge of the computer and geologic arts.

Moreover, the disclosed methods may be readily implemented in software that can be stored on a storage medium, executed on programmed general-purpose computer with the cooperation of a controller and memory, a special purpose computer, a microprocessor, or the like. The systems and methods of this invention can be implemented as program embedded on personal computer such as an applet, JAVA® or CGI script, in C or C++, Fortran, or the like, as a resource residing on a server or computer workstation, as a routine embedded in a dedicated system or system component, or the like. The system can also be implemented by physically incorporating the system and/or method into a software and/or hardware system, such as the hardware and software systems of a dedicated seismic interpretation device.

It is therefore apparent that there has been provided, in accordance with the present invention, systems and methods for interpreting data. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A method for creating a stratal-slice volume comprising:
    performing, by a processor, a domain transformation process to create the stratal-slice volume, wherein the stratal-slice volume includes a plurality of artificial horizontal surfaces, each horizontal surface representing a paleo-depositional surface, wherein at least one of the plurality of artificial horizontal surfaces crosses at least one corrected fault, wherein the corrected fault has been aligned at least horizontally and vertically; and
    storing, on a storage media, the stratal-slice volume.

2. The method of claim 1, wherein the fault can be one or more of a dip-slip, strike-slip, shallow dipping, steeply dipping, normal, reverse, thrust, lystric and edge-to-edge fault.

3. A non-transitory computer-readable information storage media having stored thereon instructions, that if executed by a processor, cause to be performed a method for creating a stratal-slice volume comprising:
    performing, by a processor, a domain transformation process to create the stratal-slice volume, wherein the stratal-slice volume includes a plurality of artificial horizontal surfaces, each horizontal surface representing a paleo-depositional surface, wherein at least one of the plurality of artificial horizontal surfaces crosses at least one corrected fault, wherein the corrected fault has been aligned at least horizontally and vertically; and
    storing, on a storage media, the stratal-slice volume.

4. The media of claim 3, wherein the fault can be one or more of a dip-slip, strike-slip, shallow dipping, steeply dipping, normal, reverse, thrust, lystric and edge-to-edge fault.

5. A system for creating a stratal-slice volume comprising:
   means for performing, by a processor, a domain transformation process to create the stratal-slice volume, wherein the stratal-slice volume includes a plurality of artificial horizontal surfaces, each horizontal surface representing a paleo-depositional surface, wherein at least one of the plurality of artificial horizontal surfaces crosses at least one corrected fault, wherein the corrected fault has been aligned at least horizontally and vertically; and
   means for storing, on a storage media, the stratal-slice volume.

6. The system of claim 5, wherein the fault can be one or more of a dip-slip, strike-slip, shallow dipping, steeply dipping, normal, reverse, thrust, lystric and edge-to-edge fault.

7. A system for creating a stratal-slice volume comprising:
   a domain transformation module and processor that perform a domain transformation process to create the stratal-slice volume, wherein the stratal-slice volume includes a plurality of artificial horizontal surfaces, each horizontal surface representing a paleo-depositional surface, wherein at least one of the plurality of artificial horizontal surfaces crosses at least one corrected fault, wherein the corrected fault has been aligned at least horizontally and vertically; and
   a storage media that stores the stratal-slice volume.

8. The system of claim 7, wherein the fault can be one or more of a dip-slip, strike-slip, shallow dipping, steeply dipping, normal, reverse, thrust, lystric and edge-to-edge fault.

* * * * *

(12) INTER PARTES REEXAMINATION CERTIFICATE (971st)
United States Patent
Dorn et al.

(10) Number: US 8,010,294 C1
(45) Certificate Issued: Oct. 16, 2014

(54) EXTRACTION OF DEPOSITIONAL SYSTEM

(75) Inventors: Geoffrey A. Dorn, Broomfield, CO (US); William S. Hammon, III, Boulder, CO (US); James A. Carlson, Boulder, CO (US)

(73) Assignee: Terraspark Geosciences, LLC, Wilmington, DE (US)

Reexamination Request:
No. 95/002,277, Sep. 14, 2012

Reexamination Certificate for:
Patent No.: 8,010,294
Issued: Aug. 30, 2011
Appl. No.: 12/772,634
Filed: May 3, 2010

Related U.S. Application Data

(62) Division of application No. 11/766,287, filed on Jun. 21, 2007, now Pat. No. 8,065,088.

(60) Provisional application No. 60/815,630, filed on Jun. 21, 2006, provisional application No. 60/815,625, filed on Jun. 21, 2006, provisional application No. 60/815,961, filed on Jun. 21, 2006.

(51) Int. Cl.
*G01V 1/00* (2006.01)

(52) U.S. Cl.
USPC .......................................................... 702/14

(58) Field of Classification Search
None
See application file for complete search history.

(56) References Cited

To view the complete listing of prior art documents cited during the proceeding for Reexamination Control Number 95/002,277, please refer to the USPTO's public Patent Application Information Retrieval (PAIR) system under the Display References tab.

*Primary Examiner* — Luke S Wassum

(57) ABSTRACT

A process that assists with the identification of potential hydrocarbon deposits that includes performing a structural interpretation of a three-dimensional seismic volume, transforming the three-dimensional seismic volume into a stratal-slice volume, performing a stratigraphic interpretation of the stratal-slice volume which includes the extracting of bounding surfaces and faults and transforming the stratal-slice volume into the spatial domain. As illustrated in FIGS. 24a, b and c, an exemplary seismic volume before Domain Transformation is presented in FIG. 24a, interpreted horizons and faults used in the transformation are presented in FIG. 24b, and the Domain Transformed stratal-slice volume is presented in FIG. 24c. The input seismic volume in FIG. 24a has deformations associated with syn- and post-depositional faulting. The output Domain Transformed volume (FIG. 24c) is substantially free of deformations.

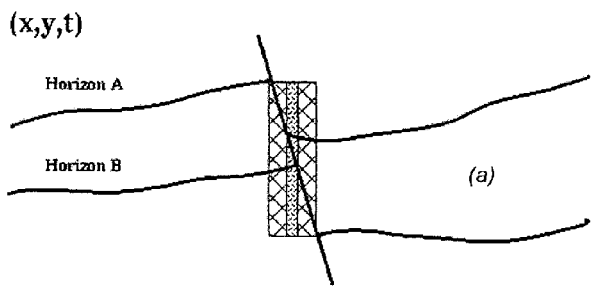

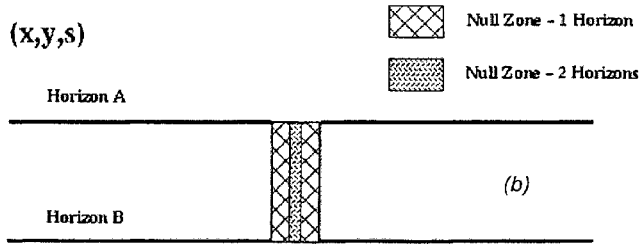

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5 and 6 is confirmed.

Claims 1-4, 7 and 8 are cancelled.

New claims 9-15 are added and determined to be patentable.

*9. The system of claim 5, wherein a plurality of the plurality of artificial horizontal surfaces cross at least one corrected fault.*

*10. The system of claim 5, wherein the stratal-slice volume includes no significant remnant effects from faulting.*

*11. The system of claim 5, wherein the domain transformation process is a three-dimensional domain transformation of a three-dimensional seismic volume.*

*12. The system of claim 5, wherein the stratal-slice volume is based on three-dimensional seismic data.*

*13. The system of claim 5, wherein the domain transformation receives as input a conditioned three-dimensional seismic volume.*

*14. The system of claim 5, wherein the at least one of the plurality of artificial horizontal surfaces crosses more than one corrected fault, wherein the corrected faults have been respectively aligned at least horizontally and vertically.*

*15. The system of claim 5, wherein the stratal-slice volume is substantially free of deformation.*

\* \* \* \* \*